(12) United States Patent
Lee

(10) Patent No.: US 12,284,276 B2
(45) Date of Patent: Apr. 22, 2025

(54) CUSTOMIZABLE CRYPTOCURRENCY CARD

(71) Applicant: Ballet Global Inc., Las Vegas, NV (US)

(72) Inventor: Bobby Christopher Lee, Las Vegas, NV (US)

(73) Assignee: Ballet Global Inc., Las Vegas, NV (US)

( * ) Notice: Subject to any disclaimer, the term of this patent is extended or adjusted under 35 U.S.C. 154(b) by 204 days.

(21) Appl. No.: 18/081,521

(22) Filed: Dec. 14, 2022

(65) Prior Publication Data

US 2023/0121749 A1 Apr. 20, 2023

Related U.S. Application Data

(63) Continuation-in-part of application No. 17/561,060, filed on Dec. 23, 2021, now Pat. No. 11,799,647, (Continued)

(51) Int. Cl.
*G06F 21/70* (2013.01)
*G06K 7/14* (2006.01)
(Continued)

(52) U.S. Cl.
CPC .......... *H04L 9/0877* (2013.01); *G06K 7/1417* (2013.01); *G06K 19/06037* (2013.01);
(Continued)

(58) Field of Classification Search
CPC ... H04L 9/0877; H04L 9/0618; H04L 9/0866; H04L 9/30; H04L 9/3073; H04L 9/3226;
(Continued)

(56) References Cited

U.S. PATENT DOCUMENTS

| 6,109,529 A | 8/2000 | Nelson, Jr. |
| 7,328,844 B2 | 2/2008 | Workens |

(Continued)

FOREIGN PATENT DOCUMENTS

| CN | 109784892 A | 5/2019 |
| EP | 3221827 B1 | 1/2021 |

(Continued)

OTHER PUBLICATIONS

Extended European Search Report dated Oct. 2, 2323 for European Application No. 20836065.1.
(Continued)

*Primary Examiner* — Izunna Okeke
(74) *Attorney, Agent, or Firm* — Pillsbury Winthrop Shaw Pittman LLP

(57) ABSTRACT

A physical card (in some cases without any on-board source of power or computing capabilities) is configured to maintain access information for digital bearer assets. A unique identifier visible on the card may be transmitted to a server-system to utilize functionalities corresponding to the card (e.g., based on information associated with the unique identifier) on a decentralized computing platform, like a blockchain-based decentralized computing platform. Private access information, like a secret, private key that corresponds to a public key (e.g., a public-private key-pair) or a representation of the private key (like a ciphertext thereof) and corresponding encryption key, may be physically concealed with tamper-evident components such that a user can readily determine whether the private access information was divulged. In some examples, a user is required to activate one or more tamper-evident features, thereby altering a visible state of the card, to utilize functionalities corresponding to the card.

19 Claims, 18 Drawing Sheets

Related U.S. Application Data which is a continuation of application No. 16/945,240, filed on Jul. 31, 2020, now Pat. No. 11,240,021, which is a continuation of application No. 16/739,998, filed on Jan. 10, 2020, now Pat. No. 10,917,238, which is a continuation of application No. 16/568,185, filed on Sep. 11, 2019, now Pat. No. 10,554,401.

(60) Provisional application No. 62/870,866, filed on Jul. 5, 2019.

(51) Int. Cl.
| | |
|---|---|
| *G06K 19/06* | (2006.01) |
| *G06Q 20/06* | (2012.01) |
| *G06Q 20/34* | (2012.01) |
| *G06Q 20/36* | (2012.01) |
| *G09F 3/00* | (2006.01) |
| *G09F 3/02* | (2006.01) |
| *G09F 3/10* | (2006.01) |
| *H04L 9/06* | (2006.01) |
| *H04L 9/08* | (2006.01) |
| *H04L 9/30* | (2006.01) |
| *H04L 29/06* | (2006.01) |

(52) U.S. Cl.
CPC ....... *G06Q 20/0658* (2013.01); *G06Q 20/357* (2013.01); *G06Q 20/3674* (2013.01); *G09F 3/02* (2013.01); *G09F 3/0292* (2013.01); *G09F 3/0297* (2013.01); *G09F 3/10* (2013.01); *H04L 9/0618* (2013.01); *H04L 9/0866* (2013.01); *H04L 9/30* (2013.01); *H04L 9/3073* (2013.01); *G09F 2003/0213* (2013.01); *G09F 2003/0263* (2013.01); *G09F 2003/0277* (2013.01)

(58) Field of Classification Search
CPC ..... H04L 2209/56; H04L 9/50; G06K 7/1417; G06K 19/06037; G06Q 20/0658; G06Q 20/357; G06Q 20/3674; G06Q 20/3276; G06Q 20/347; G06Q 20/351; G06Q 20/065; G06Q 20/223; G09F 3/02; G09F 3/0292; G09F 3/0297; G09F 3/10; G09F 2003/0213; G09F 2003/0263; G09F 2003/0277; G09F 2003/0276; G09F 2003/0279; G09C 5/00

See application file for complete search history.

(56) References Cited

U.S. PATENT DOCUMENTS

| | | | |
|---|---|---|---|
| 2013/0166455 | A1 | 6/2013 | Douglas |
| 2015/0220914 | A1 | 8/2015 | Purves et al. |
| 2016/0260091 | A1* | 9/2016 | Tobias ............... G06Q 20/3678 |
| 2017/0344988 | A1 | 11/2017 | Cusden et al. |
| 2018/0225638 | A1 | 8/2018 | Ryann et al. |
| 2018/0240086 | A1 | 8/2018 | Petr |
| 2019/0001734 | A1 | 1/2019 | Meier |
| 2019/0197378 | A1 | 6/2019 | Garner |
| 2019/0370847 | A1* | 12/2019 | Khan .................. G06Q 20/204 |

FOREIGN PATENT DOCUMENTS

| | | |
|---|---|---|
| KR | 2016-0119296 A | 10/2016 |
| WO | 20140091252 A1 | 6/2014 |
| WO | 2015187830 A1 | 12/2015 |

OTHER PUBLICATIONS

Extended European Search Report dated Oct. 2, 2523 for European Application No. 20837540.2.
Nyairo Daniel et al: "How to use Exodus Wallet—Step-by-step Guide", Dec. 3, 2018 (Dec. 3, 2018), pp. 1-8, XP093064112, Retrieved from the Internet: URL:https://www.chainbits.com/wallets/how.to-start-using-the-exodus-wallet/.
European Office Action dated Mar. 13, 2024 for European Application No. 20837753.1, pp. 1-7.
Chinese Office Action dated Sep. 14, 2024 for Application No. 202080062467.2.
United Arab Emirates Office Action dated Oct. 15, 2024 for Application No. P6000027/2022.
Office Action for Chinese Application No. 202080062425.9 dated Jan. 25, 2025, pp. 1-5.
Intention to Grant for European Application No. 20837753.1 dated Jan. 9, 2025, pp. 1-9.

* cited by examiner

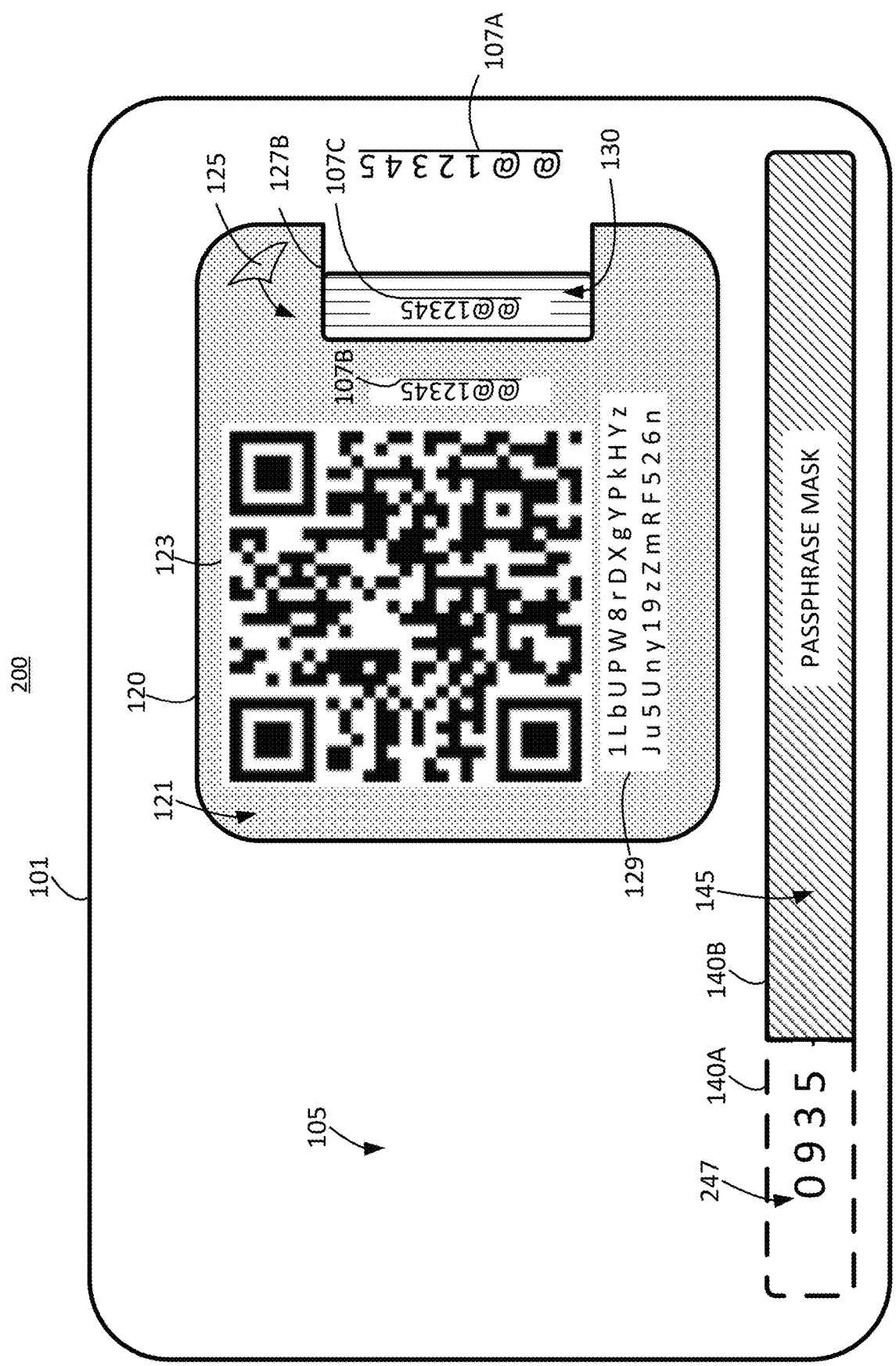

CUSTOMIZABLE CRYPTOCURRENCY CARD

CROSS-REFERENCE TO RELATED APPLICATIONS

This patent application is a continuation-in-part of U.S. patent application Ser. No. 17/561,060, filed 23 Dec. 2021, which is a continuation of U.S. patent application Ser. No. 16/945,240, filed 31 Jul. 2020, which is a continuation of U.S. patent application Ser. No. 16/739,998, filed 10 Jan. 2020, which is a continuation of U.S. patent application Ser. No. 16/568,185 11 Sep. 2019, which claims the benefit of U.S. Provisional Patent Application No. 62/870,866, titled PHYSICAL, TAMPER-EVIDENT CRYPTOCURRENCY CARD, filed on 5 Jul. 2019. The entire contents of each aforementioned filing is incorporated herein by reference.

BACKGROUND

1. Field

The present disclosure relates generally to hardware accessories for managing digital bearer assets and more specifically to a physical, tamper-evident card for storing credentials by which wallet accounts are accessed for cryptographic currency and other digital bearer assets.

2. Description of the Related Art

Decentralized computing systems are used to generate assets, like a digital currency or, more generally, digital assets that may include coins, tokens, and the like, often within a complicated multi-actor online ecosystem. Like physical currencies and commodities, some digital assets may exhibit similar properties including having an associated value, rivalrousness, and fungibility (or in some cases, like ERC 721 tokens, non-fungibility). Often, decentralized computing platform can allow for investment and transfer-of-ownership of assets between participants. Although many people currently engage with such platforms, the barrier to entry is relatively high due to the complicated nature of the systems and the absence of mature, well designed user interfaces to abstract away that complexity. Specifically, current currency (a term used herein to refer generally to digital bearer assets, like cryptocurrency, utility tokens, and the like) management systems are relatively technical in nature and their failure modes deter many less sophisticated users who would otherwise wish to access decentralized computing platforms.

Examples of existing currency management systems include powered hardware devices with integrated logic, such as a mobile phone or USB key-like device for storing secret keys backing user cryptographic currency accounts. Such schemes are commonly known as hardware wallets, which often store private and public (or other or addresses) cryptographic keys of accounts on various decentralized computing platforms, often also referred to as wallets (but without the "hardware" qualifier). With these wallets, users of a platform transact (e.g., send, receive, loan, borrow, subject to security interests, release security interests) in digital bearer assets (e.g., exchange ownership of an asset or amount of an asset). Users often backup their secret key(s), such as on an RFID backup card or physical sheet of paper, which provides a volatile failure point. Other backups, such as online, or other redundant measure, increases the attack surface for nefarious actors to gain access to secret keys. Should a nefarious user gain access to a secret key backing a cryptographic currency account, that nefarious user may liquidate the totality of that account without user recourse. Accordingly, there are complicated considerations and tradeoffs concerning the security and back-up of those secret keys. Unsophisticated users face difficulty in navigating these challenges and often choose not to participate in crypto current platforms as a result.

SUMMARY

The following is a non-exhaustive listing of some aspects of the present techniques. These and other aspects are described in the following disclosure.

In some aspects, a sticker or other components described below are affixed or marked on a side of a card in a secure manner. For example, different entities participant in a manufacturing process may have limited access to informational components by which a private key may be accessed in plain text. Tamper-evident features may prevent an actor from ascertaining information about the private key without another party noticing. Thus, for example, a company, vendor, or user receiving a card may be assured of its authenticity and that the information by which an asset held by a wallet address of the card can be transferred to another wallet address has not been obtained by some other (e.g., unauthorized) party. Embodiments may include an application and techniques by which a user may scan a card, such as by capturing the QR code with a device executing the application, to verify that information has not been used by another party.

In some aspects, a card, after the sticker or other components described below are affixed or marked on a side of the card, may be provided to a branding entity, which may print a graphic or otherwise modify a side (e.g., front or back) opposite of the side including the sticker or other information as desired. Additionally, the branding entity may request configuration of the wallet address associated with the card from the computing system or be provided with the public key or the wallet address associated with the card by which the branding entity may transfer an asset to the wallet address. Deletion of the public key may prevent assets of other types (e.g., other cryptographic currencies or tokens) from being transferred to the wallet address as the public key may not derived (e.g., in reverse to the one-way hashing function) from the wallet address corresponding to the asset or asset type.

In some aspects, an identifier encoded by, and readable from, an optical code of the sicker (e.g., a QR code) resolves (e.g., deterministically, or by association within a database) to a wallet address or public key from which a wallet address on a decentralized computing platform can be derived. Cryptographic currency or tokens may be transferred to the wallet address and later transferred from the wallet address using the private key. For example, in some embodiments, the optical code may correspond to a cryptographic hash or value that uniquely identifies the card. In some examples, the cryptographic hash may be based on information included on the card (or sticker, or card and sticker), and a computing platform, may store an association between that cryptographic hash and a public key, and the public key may be processed by the computing platform to return a wallet address compatible with a given cryptocurrency or cryptographic token. The cryptographic hash address may be generated from the public key (e.g., via a protocol of a decentralized computing platform, like a blockchain based computing platform, for generating a cryptographic hash address operable on the platform) and the address associated by a computing system with the card. In some examples, the public key may be deleted upon address generation, thereby tying the card to a single cryptographic currency or token or blockchain-based computing platform. The wallet address may be associated by the computing system with the encoded identifier visible in the un-accessed state such that digital bearer assets, like cryptographic currency, tokens, or other assets (e.g., resident or tracked on the platform to which the cryptographic hash address corresponds), may be transferred to the address.

Some aspects include a card with the form factor of a credit card. The card has a tamper-evident sticker with at least two physical layers, one of which is partially concealed by the other. The top, exposed layer includes an optical code (e.g., a QR code, bar code, or the like). The optical code, in some cases, includes a redundancy of encoded information (e.g., such as in the form of parity bits, Reed-Solomon error correction, Turbo codes, Hamming codes, or the like). Some embodiments of an optical code may include sufficient redundancy to recover a damaged bit or byte of encoded information. Example embodiments of an optical code may encode an identifier of an address that corresponds to a public key of a public-secret (e.g., public-private) key-pair of an asymmetric encryption algorithm. Examples of a key-pair may be generated, in some embodiments, with one of the following classes of asymmetric encryption techniques: Diffie-Hellman; Digital Signature Standard; ElGamal; elliptic curve techniques; Rivest-Shamir-Adleman ("RSA"), lattice-based cryptography, and the like.

Some aspects of a sticker, like a tamper-evident sticker, include a top layer of the sticker that includes a window to an underlying layer. Through the window a unique identifier of a key-pair/card from the underlying layer may be exposed. The top layer may include a corresponding unique identifier, the identifier being displayed to permit a user to verify the unique identifier of the top layer matches the unique identifier of the exposed portion of the underlying layer. The unique identifier may correspond to a serial number within a namespace of an issuer of a card or other substrate (or object) to which the sticker is affixed. In some embodiments, additional unique identifiers (like keys for key-value pairs) are utilized server-side by the issuer, such as to uniquely associate an informational component or combination of information included on a card, which may be cryptographically hashed, with other information in a database. The lower layer of the sticker may include content that is concealed by the top layer and removal of the top layer to reveal the content of the lower layer may be rendered physically evident.

Some aspects of a sticker, like a tamper-evident sticker, may include a top layer of the sticker that includes a tamper-evident adhesive substrate, lifting of which from a surface the substrate adheres to creates a tamper-evident effect which, by visual inspection, a user can ascertain whether the top layer has been lifted to expose at least a corresponding part of the surface. In some aspects, a portion of the surface adhered to includes the concealed portion of the lower layer. In some aspects, a portion of the surface adhered to includes the concealed portion of the lower layer. In some aspects, a portion of the surface adhered to includes a front or back of the card, which substantially surrounds the lower layer. The concealed portion has printed thereon another optical code encoding a cipher text, the plaintext of which is the secret key of the key pair. The ciphertext may be encrypted with a symmetric encryption protocol using an encryption key. In some examples, the card may include the encryption key, which may be marked (e.g., engraved) on the card. In some aspects, the encryption key is concealed in a tamper-evident manner, such as by a tamper-evident adhesive substrate. The card may include a corresponding unique identifier, which may be marked (e.g., engraved, etched, or printed on the card) on the card, the identifier being displayed to permit a user to verify the unique identifier of the card matches the unique identifiers of both physical layers of the sticker.

Some aspects include computing infrastructure that works with the card to afford a number of features. Some aspects uniquely associate, server-side, in memory, the unique identifier (or hash thereof) and a portion of the symmetric encryption key (or hash thereof) (e.g., the first four digits). In some aspects the server exposes an API by which cards can be verified. Some aspects include receiving the portion of the key, the unique identifier, or both, as a request to the API from a user device. In some aspects, the server performs a first verification based on local data. In some aspects, the server performs a second verification based on a decentralized computing platform data. The server may generate a response which reports a verification value. For example, a response to the API request may include a value indicative of whether the values match the set on the card (e.g., returning a binary determination where both are submitted, returning the unique identifier if the portion of the key is submitted, or returning the portion of the key if the unique identifier is submitted). In some cases, the server may write the result of a verification to the blockchain or to a local database for the card and initialize a count. The count for verification of a card may be incremented upon each verification request for the card received via the API. In some aspects, for a new card, the count may indicates that the user is the first to verify the card and, as a result, cannot present the card as new even if a tamper-evident adhesive substrate over the encryption key is replaced.

Additional aspects may include obtaining, with a computing system, card data corresponding to a set of physical cards, the card data associating, for each of the physical cards, a respective public cryptographic key with a respective unique identifier, each physical card comprising: an optical code encoding a respective unique identifier, and concealed information corresponding to a respective private cryptographic key of a private-public cryptographic key pairing of which a respective public cryptographic key is a member; deterministically generating, with the computer system, a set of cryptographic hash addresses based on a protocol corresponding to a selected decentralized computing platform from the public cryptographic keys; storing, with the computer system, within a database, for each of the physical cards, a record associating the respective unique identifier with a respective cryptographic hash address generated from the respective public key; requesting, with the computer system, based on a selected record, a transaction on the selected decentralized computing platform, the transaction specifying a transfer of a digital bearer asset to a cryptographic hash addresses of the selected record; storing, with the computer system, within the database, an indication of the digital bearer asset in association with the selected record; receiving, with the computer system, a request from a user computing device, the request including a unique identifier of a physical card in the set of physical cards; identifying, with the computer system, the selected record based on the unique identifier included with the request matching the unique identifier of the selected record; and transmitting, with the computer system, to the user computing device, a response based the indication of the digital bearer asset.

Some aspects include a native application for execution on a user mobile device. The native application may interface with an image sensor of the mobile device to scan an optical code. In some aspects, the optical code is the top-layer QR code (e.g., of a sticker or card) that encodes an identifier associated with a wallet address in a database, or a wallet address, based on a corresponding public key. In some aspects, the native application queries an API of the server based on the QR code to obtain information about assets corresponding to the physical card, such as based on wallet addresses associated with the identifier or based on the wallet address. In some aspects, the native application may display, within a user interface, information about the assets corresponding to the wallet address. Some example embodiments may permit a user to indicate possession of the wallet address.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements:

FIG. 2 illustrates an example of a card including a verification code component of a cryptographic passphrase and corresponding tamper-evident mask, according to some embodiments.

Figure 1A:
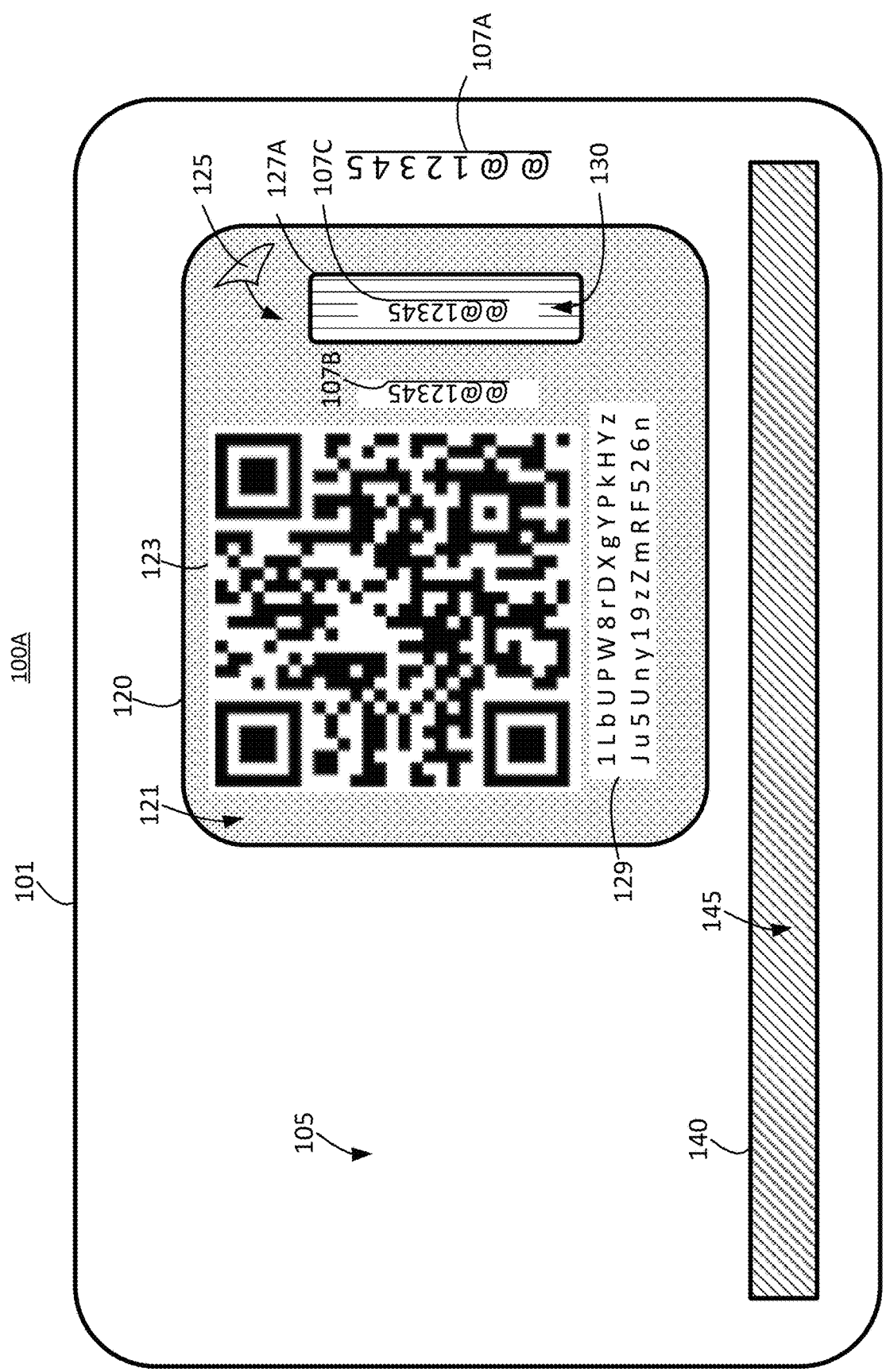
FIG. 1A and FIG. 1B illustrate examples of cards including example tamper-evident features and example authenticity verification features, according to some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of decentralized computing platforms and digital bearer assets. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

In some embodiments, a physical card (in some cases without any on-board source of power or computing capabilities) is configured to maintain access information for digital bearer assets. Examples of access information may include a secret, private key having a corresponding public key, like a cryptographic key-pair of an asymmetric encryption algorithm, or representations thereof (like a ciphertext thereof). Access information may further include one or more other encryption keys operable to decrypt a representation of a key of a key pair (like decryption with a symmetric key of a symmetric encryption algorithm). In some example embodiments, access information may include a cryptographic hash address, such as a cryptographic hash address operable to receive digital bearer assets, like a wallet (or account) address. Thus, for example, access information may include an encrypted representation of a private key, such as a private key having a corresponding public key from which a cryptographic hash address is derived, an encryption key by which the private key is encrypted to generate the encrypted representation thereof, and the cryptographic hash address (or the public key or information by which the public key or the cryptographic hash address can be derived). Thus, the access information may include private access information (e.g., a private key of a key-pair or information by which the private key can be derived) by which the holder of the card may transfer digital bearer assets from an account corresponding to the card (e.g., by signing a transaction using the private key) and may include public access information (e.g., a cryptographic hash address or information by which the cryptographic hash address can be derived, like a public key of the key pair) by which digital bearer assets may be transferred to the account corresponding to card. Other variations are discussed herein, for example, in some embodiments, public access information be omitted from the card, but may be associated with the card, like within a database of an issuer (or another entity) based on one or more identifiers of the card (e.g., like a unique identifier) different from the private access information that may be included on the card or one or more components of the card. In some examples, the card and other components may each include a first unique identifier, such as to indicate that the card and components match, and second unique identifier that relates to corresponding public access information within a database may also be provided.

Various embodiments of a physical card are devised to provide a robust mechanism for maintaining access information. Some embodiments of a physical card include a card, like a plastic card, metal card, or other rigid, semi-rigid, flexible, or semi-flexible material, with the form factor of a credit card or gift card, although other form factors may be used. Accordingly, some embodiments include a rectangular physical card approximately 86 mm (~3 and ⅜ inches)×54 mm (~2 and ⅛ inches), such as 85.60 mm×53.98 mm, and which may have rounded corners with a radius of approximately 2.88-3.48 mm, such as to conform to the ISO/IEC 7810 ID-1 standard (described dimensions may be varied plus-or-minus 10% or plus-or-minus 20%, in addition to other expressed ranges). Other example form factors may be a ratio or portion (e.g., half, widthwise or lengthwise) of a form factor of a credit card. In some embodiments, a physical card, such as card having dimensions similar to those described above, is physically intuitive and familiar. In addition, a physical card is unlikely to be accidentally discarded or lost. In some cases, the card has a thickness of between 0.1 and 2 mm, like between 0.2 and 1 mm. Other examples of physical cards may have different dimensions, whether in various different shapes or sizes, and may range from approximately the size of a stamp to the size of a credit card, or larger. In some example use cases, a physical card may be, as a design choice, less robust than a plastic or metal card, and constructed of poster stock or other material having a durability similar to that of a business card. For example, it may be desirable that a physical card be configured as a one-time use (or access) item to be used within a relatively short timeframe (e.g., within a week, month, or a few years) and more readably disposable than a plastic or metal counterpart (which is not to suggest that plastic or metal cards may not be similarly configured).

In some embodiments, a physical card has a tamper-evident sticker (or paring of stickers) with at least two physical surfaces (e.g., top and bottom surfaces of a single sticker, or top surfaces of a pair of overlaid stickers), one of which is partially concealed by the other. Each surface may have a different, but related code, like a human-readable code or optical code (e.g., a QR code, bar code, or the like, in some cases with redundancy of encoded information, such as in the form of parity bits, Reed-Solomon error correction, Turbo codes, Hamming codes, or the like, in some implementations with sufficient redundancy to recover a damaged bit or byte of encoded information). The top surface may be exposed when the card is an un-accessed state (i.e., before access information corresponding to a private key has been rendered viewable or otherwise accessible to the user) and may include an optical code (e.g., a QR code) that encodes, for example, account or wallet address information, or another identifier, which may correspond to an account or wallet address (e.g., by association within a database). An account or wallet address may be generated based on a public key of a key-pair that includes the private key. For example, a wallet address may be generated based on a public key in accordance with a schema specified by a protocol of a decentralized computing platform.

An example of a wallet address may be a cryptographic hash address generated based on the public key (e.g., via a protocol of a decentralized computing platform, like a blockchain based computing platform, where the protocol specifies a schema for generating cryptographic hash addresses operable on the platform). Thus, for example, an optical code visible (e.g., on a surface of a sticker) in the un-accessed state of the physical card may correspond to a cryptographic hash address such that digital bearer assets, like cryptographic currency, tokens (e.g., NFTs), or other assets (e.g., resident or tracked on the platform to which the cryptographic hash address corresponds), may be transferred to the address. In another example, the optical code visible in the un-access state of the physical card may be an identifier by which a cryptographic hash address or public key may be identified within a database (e.g., of the issuer of the card or other entity). In the un-accessed state, at least part (e.g., all, or more than 20%, more than 50%, or more than 90%) of a bottom or underlying surface depicting another optical code thereon is concealed (e.g., obfuscated, not visible, not readable, or otherwise inaccessible) by the top surface. The obfuscated optical code may be a different optical code from the un-concealed optical code. In some cases, the optical code on the top surface (also called a top-component of a multi-component sticker herein) encodes a representation (e.g., like a cryptograph hash address in plain text or ciphertext form) based on a public key of the key-pair (e.g., a public key that uniquely corresponds to wallet addresses on one or more decentralized computing system implementations, which may be implemented with blockchain-based protocols), or information by which the representation or public key may be identified within a database (e.g., of an issuer of the card or other entity). In some cases, the optical code on the concealed surface encodes a representation (e.g., in plain text or ciphertext form) based on or of a private key that corresponds to the public key, e.g., from a key-pair generated with one of the following classes of asymmetric encryption techniques: Diffie-Hellman; Digital Signature Standard; ElGamal; elliptic curve techniques; Rivest-Shamir-Adleman ("RSA"); lattice-based cryptography; and the like.

In some embodiments, digital bearer assets, like tokens (e.g., NFTs) or cryptographic currency, may be transferred (e.g., based on a protocol of a decentralized computing platform) to an account associated with the card (or sticker) based on public access information of the exposed top-component, or by identifying the public access information corresponding to the card (or sticker) within a database (e.g., by association of an identifier on the card (or sticker) with the public access information in the database). Thus, for example, while the top-component is in an un-accessed state, digital bearer assets may be transferred to the account without the transferrer viewing or otherwise accessing private access information of the concealed bottom-component. Accordingly, in some examples, digital bearer assets may be transferred to an account associated with a card (or sticker) prior to a user obtaining the card (or the sticker) and without the transferrer (or other entity) having access to private access information disposed on the bottom-component. Example use cases may include branded cards which an issuer (that is a different entity from the manufacturer of the sticker) may transfer digital bearer assets to prior to distribution of the branded cards to users. A user having possession of a branded card then possess (and, e.g., only that user) the private access information by which the digital bearer asset may be used (e.g., transferred from the account to some other account) or ownership of the digital bearer asset asserted. Later, when a user wishes to access (e.g., transfer to a recipient wallet or address) a digital bearer asset held by an account associated with a card (or the sticker), the exposed top-component may be removed to reveal the concealed bottom-component, which includes the private access information (or portion thereof) operable to transfer those digital assets (e.g., via a protocol of a decentralized computing platform).

In accordance with various embodiments disclosed herein, user experience is managing branded materials (e.g., promotional materials, gift cards, or other examples discussed herein) is drastically simplified over previous implements as a top-component of a multi-component sticker is physically peeled back to reveal a bottom-component of the multi-component sticker including a secret. And, by virtue of disclosed embodiments of tamper-evident sticker configurations, loss of secrecy is physically apparent by visual inspection with the naked eye. Moreover, there is no need for a user to remember a set of key recovery passphrases, account information, or other information like those often used with traditional approaches. Additionally, in some example embodiments, a user may conveniently transfer a digital bearer asset (or amount thereof) from a first account to a second account, such as by accessing the secret by which the first account is protected and submitting a transaction on a distributed computing platform that specifies a transfer from the first account (e.g., with ownership thereof being verifiable based on possession of the secret) to the second account (e.g., identifiable based on information disposed on the top-component) without any requirement to access the secret by which the second account is protected.

Security concerns may be mitigated in various configurations of the tamper-evident sticker and physical card. For example, a top-component of a multi-component sticker may include a hole, channel, or other type of window to an underlying layer, like a bottom-component of the multi-component sticker. Through the window a unique identifier of the access information-card combination disposed on the underlying layer may be visible upon inspection. A corresponding unique identifier may also be disposed on the top-component and visible upon inspection, the identifier being displayed to permit a user to verify the unique identifier corresponding to the top-component matches the unique identifier of the exposed portion of the bottom-component, thereby ensuring a match of public access information to private access information disposed on the respective components. The bottom-component of the multi-component sticker also includes content, like private access information, that is concealed by the top-component and not readily visible (e.g., until the top-component is removed to reveal that content on the bottom-component).

The top-component of the multi-component sticker may be configured with one or more tamper-evident features, such as one or more tamper-evident layers and an adhesive to promote activation of the tamper-evident features. For example, lifting of the top-component from a surface to which it adheres may promote a tamper-evident effect in a feature which, by visual inspection, a user can ascertain whether the top-component has been lifted to expose at least a corresponding part of an underlaying surface.

In some embodiments, the tamper-evident effect of a feature is selectively promoted based on the surface to which it adheres. For example, a first portion of the surface to which the top-component is adhered may be a portion of the physical card that promotes adhesion, and a second portion of the surface to which the top-component is adhered may be a concealed portion of the bottom-component. In some embodiments, the adhesive adheres with a first strength to the physical card and adheres with a second strength to the concealed portion, the first strength being greater than the second strength. Thus, for example, the first adhesion strength promotes activation (e.g., activates) a tamper-evident feature when the top-component is lifted from a surface to which is adhere with the first strength. The second strength, however, may not activate any tamper-evident feature of the top-component. Accordingly, a concealed portion of the bottom-component to which the top-component adhere with the second strength may be readily visible after the top-component is lifted.

In some embodiments, the second strength is great enough to activate a first one (or more) tamper-evident feature of the top-component but weak enough to not activate a second one (or more) tamper-evident feature of the top-component. In other words, in some embodiments, the second strength may selectively activate a first tamper-evident feature but not at least one other tamper-evident feature. The first strength, by contrast, may active the first tamper-evident features and the other tamper-evident features that are activated by lifting of the top-component from a surface to which it adheres to with the first strength. In some embodiments, the second strength weak enough to substantially prevent adhesive residue resulting from the lifting of the top-component from the concealed surface of the bottom-component. In some embodiments, the second strength is great enough to activate at least a first tamper-evident feature of the top-component. In some embodiments, the second strength is great enough to activate an at least one other tamper-evident feature not activated at the first strength. In some embodiments, the second strength is great enough to substantially cause adhesive residue to remain adhered to the physical card.

In some embodiments, the concealed portion has printed thereon another optical code encoding a ciphertext, the plaintext of which is a secret key of a key pair. In some embodiments, the ciphertext is generated by encryption of the plaintext with a symmetric encryption protocol using an encryption key. Thus, for example, the encryption key is like a passphrase by which private access information in ciphertext can be decrypted to obtain private access information in plaintext. The physical card may include the encryption key, which may be marked (e.g., engraved) on the physical card. In some embodiments, such as in embodiments where the bottom-component includes ciphertext of plaintext private access information, a unique identifier (e.g., corresponding to a same unique identifier visibly disposed on a top-component and visibly, via a window of the top-component, disposed on the bottom-component) may be similarly marked (e.g., engraved) on the physical card, thereby ensuring a match of the private access information (in ciphertext) to an encryption key (e.g., like a passphrase) disposed on the physical card that is operable to decrypt the ciphertext to generate plaintext private access information. The unique identifier may correspond to a serial number within a namespace of an issuer (or manufacturer) of the card. In some embodiments, the encryption key is concealed in a tamper-evident manner, such as by a tamper-evident mask (e.g., like a sticker, which may have multiple layers) concealing the engraving of the encryption key. In some embodiments, the tamper-evident mask may include a layer that is scratched-off or one or more layers that are peeled-off to reveal, with a tamper-evident effect, the underlying encryption key on the physical card, thus visibly indicating to a user upon inspection whether the encryption key has been accessed by another party. In some embodiments, the encryption key is operable to decrypt the ciphertext by a corresponding symmetric decryption protocol to reveal the plaintext of the secret key of the keypair. Thus, in some example embodiments, a user must activate at least one tamper-evident feature corresponding to a portion of a tamper-evident top-component of the sticker to reveal the ciphertext and activate at least one tamper-evident feature corresponding to a portion of the tamper-evident mask to reveal the encryption key by which the user can ascertain the private access information (e.g., a secret key) in plaintext.

Further, in some embodiments, a physical card product for storing digital bearer assets is robust to supply chain attacks. In some embodiments, a manufacturer of a tamper-evident sticker, like a tamper-evident multi-component sticker having a top-component including public access information and a bottom-component including private access information concealed by the top-component, may be restricted from access to the plaintext of the private key. Specifically, because an encrypted representation of the private access information may be supplied to the manufacturer of the tamper-evident sticker, and not the private key (or the encryption key by which the private key can be obtained in plaintext), the manufacturer does not have access (nor does it require access) to the private key in plaintext. Similarly, a manufacturer of a card (or card blank), that is different from the manufacturer of the tamper-evident sticker, is restricted from the access to the encrypted representation of the private access information. The manufacturer of the card or card blank may receive the encryption key by which the encrypted representation of the private access information may be decrypted and does not have access (nor does it require access) to the encrypted representation of the private access information.

In other words, having access to a ciphertext representation of a private key or the corresponding encryption key alone is insufficient to obtain (e.g., access) the private key in plaintext. Moreover, the manufacturer of the sticker need not take possession of a physical card blank corresponding to a sticker, let alone a physical card blank marked with a symmetric encryption key needed to decrypt the ciphertext of the private key that is included on the bottom-component. Accordingly, the manufacturer of the sticker cannot ascertain the private access information corresponding to the public access information (or even the public key when a cryptographic hash address or other identifier is supplied as public access information). Similarly, a card blank manufacturer need not take possession of stickers and is therefore prevented from utilizing any encryption key in a nefarious manner. In some embodiments, security may be increased by a final engraving step performed by the card issuer (or even another party subsequent to application of a sticker to a card blank) rather than the card blank manufacturer. Thus, for example, in some embodiments, even collusion between both a sticker manufacturer and a card blank manufacturer may be insufficient to nefariously obtain a secret key by which permission to access an account is governed in accordance with a protocol of a decentralized computing platform. Moreover, private keys, ciphertext of private keys, and encryption keys may be maintained separately and discarded, in some cases in stages, to prevent exposure of combinations of data that a nefarious party could utilize to infer private access information (e.g., a plaintext private key).

In some embodiments, a physical card may include a corresponding unique identifier, which may be marked (e.g., engraved) on the metal card, the identifier being displayed to permit a user to verify the unique identifier of the card matches the unique identifiers of both components of a multi-component sticker. Further, an issuer of the card (or other party) may utilize the identifiers to match a sticker with a corresponding card, which, in some embodiments, may match up deterministic information. For example, in some embodiments, a public key deterministically resolves to a set of wallet addresses, each of which may corresponding to different decentralized computing platforms from which funds can be withdrawn given a corresponding private key. Once an entity derives an address (or set of addresses) to support use of the card, the public key may be discarded (in addition to the private key and encryption key) and a unique identifier (e.g., account identifier) corresponding to an optical code disposed on a component of the multi-component sticker may be associated with the address (or the set of addresses) in a database. In some examples, the unique account identifier may be an address in the set of addresses and may be associated with the other addresses in the set within a database.

In some embodiments, a physical card may have disposed thereon information by which a user can verify authenticity of the card or other information disposed thereon. For example, in some embodiments, an issuer (or other entity) may maintain a database and provide an interface by which a user who obtains a physical card may verify authenticity of the card by confirming via the database that a portion of the encryption key (e.g., a symmetric key utilized to encrypt a private key) matches the unique identifier corresponding to the card or the multi-component sticker. As described above, in some embodiments, a unique identifier may be visible on at least two components of the multi-component sticker and further visible on the physical card, mitigating the risk of counterfeit card makers supplying cards with less robust security features (or configured to divert digital bearer asset transfers to a cryptographic hash address that a nefarious party controls). In some embodiments, verification does not rely on the entire encryption key, but rather a portion thereof to preserve the remaining portion as an additional form of tamper-evidence that remains intact until access of digital bearer assets is desired.

Embodiments of a physical card may be both robust and affordable so that users or issuers can budget by allocating different digital bearer assets or amounts thereof to different disposable cards, and upon withdrawal of at least some funds, the remainder can be migrated to a new cryptographic hash address or different cryptographic hash addresses in a set of cryptographic hash addresses (e.g., a wallet) corresponding to a new, physical card. In many use cases, such as in the case of promotional materials, a disposable or recyclable material like plastic or card stock may be used for construction of physical cards. In such cases, users may be expected to redeem or otherwise use the card (e.g., by obtaining the private access information) within a relatively short period of time. However, in some embodiments, a physical card made of metal or that includes a metal backing, or metal insert, or metal face or rear of the card, or other material that impedes attacks by which scanning equipment is used to try to image information otherwise concealed by tamper-evident material may be desirable. For example, a metal card may be issued as a certificate of authenticity in association with a product, and an indication of ownership of the product may be predicated upon the current owner accessing the private access information to register the product (e.g., with the manufacturer of the product)—and verification of the card (e.g., without requirement of accessing the private access information) may indicate whether the product is authentic. In some cases, a pair of cards may be issued with a product to permit a user to record an indication of a transfer of ownership of the product to another user, such as by a transaction from one card holding an indication of the product, like a token corresponding to the product, such as a NFT, to the other card (and the manufacturer may sell or provide replacement cards to facilitate a subsequent transfer). In some embodiments, one or more stickers disposed on the physical card as described herein include metal flakes, inserts, or other material that similarly impedes such attacks.

Some embodiments include computing infrastructure configured to support one or more features pertaining to utility of a physical card that maintains access information for digital bearer assets. Some embodiments include a server system that uniquely associates, server-side, in memory, the unique identifier (or hash thereof) and a portion of a passphrase, like an encryption key, such as a symmetric encryption key or hash thereof (e.g., the first four values). In some embodiments the server system exposes an API by which issued physical cards can be verified. For example, either via an online interface or via a native application on a mobile device, a user may query the server with an API request to verify authenticity of a card and whether another party has previously checked verification of the card (e.g., which could indicate that the card has been compromised). Notably, a user may perform such a check prior to transferring digital bearer assets to the card. In some embodiments, a server system having an API is configured to receive a request including information such as the portion of the passphrase, the unique identifier, or both, as a request to the API from a user device. In some embodiments, the server performs a first verification based on local data. In some embodiments, the server performs a second verification based on a decentralized computing platform data (e.g., in some embodiments the server may publish a count indicative of verifications performed on a physical card to an immutable data store of the decentralized computing platform). For example, the server may perform a verification to determine whether a cryptographic hash address associated with the card has been previously utilized (and which a user may optionally perform based on public access information that is visible without activating a tamper evident feature).

Embodiments of the server system may generate a response to an API request which reports a verification value (or values). For example, a response to the API request may include a value indicative of whether information provided in a request matches a combination corresponding to a valid issued card (e.g., returning a binary determination where both a portion of the passphrase and unique identifier are submitted, returning the unique identifier if the portion of the passphrase is submitted, or returning the portion of the passphrase if the unique identification number is submitted). In some cases, the server may write the result of a verification performed on a physical card to an immutable data store (e.g., a blockchain) of a decentralized computing platform or to a local database and initialize a verification count or increment the verification count corresponding the physical card. For example, an existing (e.g., initialized) verification count for the physical card may be incremented upon each receipt of a subsequent verification request implicating the card that is received via the API. In some embodiments, for a new physical card when verification is requested, a count is initialized and a value indicative of the initialization is returned (e.g., 0 Verifications, Verification #1, Verified New Card, Initialized, etc.) to indicate that the user is the first to verify the card and, as a result, the card cannot later be presented as new even if a tamper-evident mask over the passphrase is replaced. For example, if a count for a card is already initialized, a value returned (e.g., 1 prior Verification, Verification #2, Previously Verified Card, etc.) for a subsequent verification request is indicative that one or more prior verification were performed for the card.

Some embodiments include a native application, which may be executed on a mobile device of a user. The native application may interface with an image sensor of the mobile device to detect and scan an optical code. The scanned optical code may be a QR code corresponding to a physical card (e.g., the QR code may be disposed on a sticker adhered to the card) that encodes an address (e.g., an address for the transfer of ownership of a digital bearer asset recorded on a decentralized computing platform, like a blockchain based decentralized computing platform, and a digital bearer asset may be a token or cryptographic currency) based on a corresponding public key or an identifier of such an address (e.g., that is associated with the identifier within a database, such as by a record or multiple records). In some embodiments, the corresponding public key resolves to various wallet addresses on various blockchain networks. The native application may be configured to query an API of a server of an issuer of the physical card with the QR code to request information about one or more such wallet addresses associated with the physical card.

In some examples, a wallet address may have associated therewith digital bearer assets, which may include one or more tokens as indicated by transactions record in a blockchain of a decentralized computing platform. Examples of tokens may include NFTs that are uniquely identifiable within a namespace of a decentralized computing platform or smart contract or other protocol by which NFTs are uniquely generated. In other examples cases, tokens may be distinguishable by type but need not be individually unique. A native application may display a user interface indicative of a listing of NFTs or a number of tokens by type corresponding to an address (or one or more addresses) associated with the card. In some examples, a token may be associated with a particular piece of content, such as an indication of what the token corresponds to, which may be displayed as a representation of a token. In some examples, a wallet address may also, or instead, have an associated balance of cryptographic currency as indicated by transactions record in a blockchain of a decentralized computing platform. A native application may display a user interface indicative of wallet balances corresponding to one or more addresses associated with the card.

The native application may be configured to scan an optical code corresponding to private access information, like a QR code encoding a private key or ciphertext of the private key. In some embodiments, the native application determines whether a scanned QR code corresponds to private access information and, when scanning of private access information is detected, the native application presents an interface by which a user may transfer digital bearer assets from an address to which the private access information corresponds to another address of a decentralized computing platform. In some embodiments, an interface may provide a field to obtain from the user, or based on a scan by the device, a passphrase corresponding to encrypted private access information, such as when the QR code encodes a ciphertext representation of a private key (the access information). The passphrase may be a symmetric encryption key operable to decrypt the ciphertext to obtain the private key in plaintext, thereby enabling transfer of digital bearer assets from an account when the private key is operable to prove ownership of the account, such as by a digital signature and verification protocol of a decentralized computing platform.

Figure 1B:
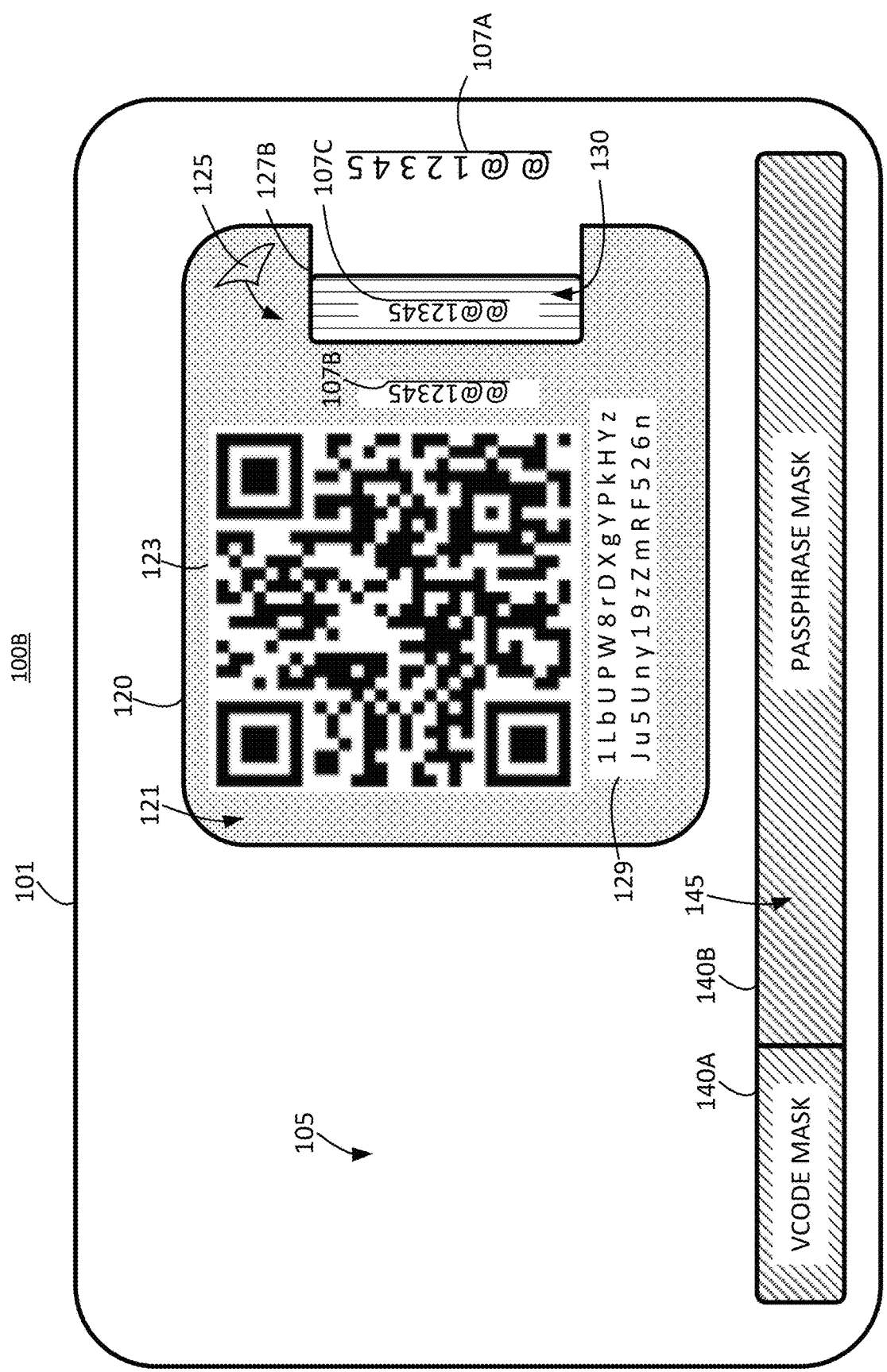

FIG. 1A and FIG. 1B illustrate examples of cards including example tamper-evident features and example authenticity verification features, according to some embodiments. Example cards described with reference to FIGS. 1A and 1B may be physical cards and include various ones of the technologies described herein. For example, the example card may include one or more tamper-evident features by which a user of the card can verify, upon inspection of the card, that private access information of the card has not been divulged to another party.

FIG. 1A illustrates an example 100A of a physical card configured to manage account access information for digital bearer assets, according to various embodiments. A physical card, like the illustrated example card 101, may have dimensions conforming or similar to the ISO/IEC 7810 ID-1 standard. Accordingly, some embodiments contemplate a physical card approximately 86 mm (~3 and ⅜ inches)×54 mm (~2 and ⅛ inches), such as 85.60 mm×53.98 mm, and which may have rounded corners with a radius of approximately 2.88-3.48 mm, and which may have a thickness of approximately 0.70-86 mm, like 0.76 mm.

The card 101 may comprise a card blank 105 having dimensions like those mentioned above and which may be wholly or partially constructed out of a material such as metal or plastic. For example, the card may be wholly metal, wholly plastic, a combination thereof (e.g., like one layer of metal of at least $⅓^{rd}$ the thickness of the card, such as a 0.20-0.25 mm metal layer, and one or two other layers of plastic that make up the other $⅔^{rd}$ of the thickness of card), or other material (e.g., like a paper product). In some embodiments, the card blank 105 has a construction permitting printing, laser engraving, etching, or other disposition of information or images on front or back surfaces of a card blank. In some examples, a unique identifier 107A may be disposed on a face of the card blank 105. Other information may also be disposed on a face of the card blank 105, such as a passphrase, like an encryption key (not shown), by which one or more ciphertexts corresponding to the card may be decrypted and which may be concealed by a mask 140 subsequent to disposition of the information.

Examples of plastics suitable for construction of a card blank 105 may include one or more of polyvinyl chloride (PVC) having a density of approximately 1.3-1.5 g/cm3, acrylonitrile butadiene styrene (ABS) having a density of approximately 1-1.1 g/cm3, polyethylene terephthalate (PET) or glycol modified PET (PET-G) having a density of approximately 1.3-1.46 g/cm3, poly(lactic acid) (PLA) having a density of approximately 1.2-1.45 g/cm3, or other suitable plastic material, which may include but is not limited to various thermoplastics.

Examples of metals suitable for construction of a card blank 105 may include one or more of Titanium, having a density of 4.506 g/cm3 or Aluminum, having a density of 2.7 g/cm3. Other example metals may be an alloy, such as an aluminum alloy, like 6061 Aluminum having a density of approximately 2.7 g/cm3 or 7075 Aluminum having a density of approximately 2.81 g/cm3. Steel (e.g., stainless 304, 409, 630 etc.) and titanium (e.g., Ti6AI4V, TI 6-4, etc.) as well as other metal alloys are also applicable.

Other example materials suitable for construction of a card blank 105 may include combinations of one or more of the above materials, like one or more layers of a metal or a plastic, or plastic including metal flakes, or another material (e.g., poster card, paper materials, fiber-based, etc.) to which a sticker can adhere. Other information may be disposed on a card blank 105 in different ways, such as by printing, etching, embossing, another sticker, or other suitable method.

In some embodiments, one or more materials used for a card blank 105 may be selected based on one or more properties of a sticker 120, or properties of the sticker are selected based on the materials used for the card blank. For example, in some embodiments, a metal or metal impregnated material may obfuscate private access information disposed on the sticker against scanning or other imaging attacks. In some examples, one or more layers of the sticker (above or below the private access information) may include reflective metal imbedded therein and may be selected based on the construction of the card or vice versa. The one or more layers of the sticker including metal imbedded therein may substantially obfuscate private access information when subjected to non-destructive attacks (e.g., scanning). A material of a card blank 105 may also be of a metal construction or plastic including metal imbedded therein to obfuscate private access information in connection with or in place of one or more of the layers of the sticker. In other words, the configuration of the card blank 105 and sticker (discussed in more detail below) may be such that a user (nefarious or otherwise) is required to activate one or more tamper-evident features of the card to obtain private access information, which thereby indicates to other users that the private access information is no longer private.

In some embodiments, different layers of a sticker 120 may have different sizes, for example, a first layer or first set of layers may have first dimensions (e.g., size) of length, width, radius, etc. that, when applied, correspond to a first area having similar dimensions or size (e.g., when applied to a face of a physical card). In some embodiments, a second layer or second set of layers may have second dements (e.g., size) of length, width, radius, etc., that, when applied, correspond to a second area having similar dimension or size (e.g., when applied to the face of the physical card). The dimensions of the second layer or second set of layers may be configured such that they extend beyond the dimensions of the first set of layers, such as beyond at least a portion of the perimeter of the first set of layers, like 60-90%, or even 100%, to encapsulate (e.g., envelope, cover, hide, enclose, or otherwise conceal) an area (e.g., having dimensions corresponding to the private access information) of the first set of layers.

In some embodiments, a window portion is formed in the second layer or second set of layers, through which a subset of information disposed on a first layer or first set of layers may be visible via the window portion (e.g., whether through a window cutout, cutout window notch, or transparent window or transparent window notch). In some embodiments, the information visible within the window portion corresponds to an identifier (or other public information component) disposed on a portion of the first layer (e.g., within an area having dimensions corresponding to the window) or the first set of layers. However, in some embodiments, the first layer or first set of layers may include a tab-like extension including the public access information that is configured to extend beyond the perimeter of the second layer or second set of layers without any physical windowing of the second layer or second set of layers. Different layers may be comprised of different materials, like different films or disposed materials whether coating or adhesive, and the thickness (or depth normal to a surface) of different layers may vary based on the thickness of the film or disposed coating or adhesive.

In some embodiments, a swatch having dimensions approximate to the dimensions of a sticker 120 may be disposed into a front face of the card 101. For example, a swatch may be laser engraved in a face of a metal or plastic card, or otherwise applied to the face of the card (e.g., by other means to apply the swatch, by material selection, or otherwise) in a location where the sticker 120 is to be applied. The swatch area may have a root-mean-squared surface roughness greater than non-swatch areas to promote adhesion of an adhesive, like an adhesive layer or disposed adhesive glue. For example, a surface roughness as measured by a profilometer within a swatch area may be 50% higher than other parts having a smoother finish. The above configuration of the swatch should not be construed as being limited to a specific area or dimension (e.g., size) of a face of the card 101 may substantially correspond to the dimensions of a swatch (e.g., a face may be wholly or substantially configured like a swatch). For example, a metal card blank 105 may be manufactured with a rough-cut finish, anodized or otherwise chemically etched to include a rough (like a matte finish) rather than a polished finish, or a plastic card blank 105 may be manufactured with a mold having a textured portion in inverse profile to the swatch formed on the card, stamped or embossed into the card, or other suitable method. In other words, there is no requirement for a swatch-like surface to be localized to where the sticker is applied. The swatch may be a pattern (or surface type, like a matte finish whether laser engraved, chemically etched, coated, molded, stamped, embossed, or otherwise so manufactured to include a surface type or pattern other than a smooth or polished surface) of a shallow depth to promote adhesion by an adhesive (e.g., an adhesive layer backing a sticker 120) relative to a smooth surface. For example, a sticker 120 having an adhesive layer backing the sticker may be applied to the card blank 105, and the adhesive of the sticker may substantially contact the swatch. In some embodiments, the depth of the pattern of the swatch relative to the face is less than 0.05 mm, and may be approximately 0.005-0.010 mm in depth.

As described above, information may be disposed on a surface of the card blank 105. Various ones of the methods described above for generating a swatch may be suitable to dispose information on a surface of a card blank 105, among others. For example, information may be printed, laser engraved, stamped or embossed, or otherwise disposed on the surface. Examples of information may include a unique identifier 107A, an encryption key (e.g., covered by mask 140), or other information as described herein. For example, a unique identifier 107A may be engraved or stamped to a depth less than 0.20 mm, like 0.02-0.15 mm, or approximately 0.07-0.08 mm in some embodiments. In some embodiments, the depth of the engraving or stamping of the encryption key may be shallower than the unique identifier, but may be of a larger font, the depth selected to afford readability but mitigate applicability of some scanning or other tampering (e.g., like pressing of the mask 140 into the etching to ascertain the key). In some embodiments, the depth of the encryption key etching is approximately 0.02-0.04 mm, although other embodiments may utilize a same depth as the unique identifier 107A. In other embodiments, the encryption key, among other information, like the unique identifier, may be printed on the card. The mask 140 may encapsulate (e.g., envelope, cover, hide, enclose, or otherwise conceal) the encryption key disposed on the surface of the card and may include one or more tamper-evident features by which a user may determine whether the encryption key is in an accessed state (or not in an accessed state).

In some embodiments, the physical card 101 includes, adhered to the card blank 105, a tamper-evident sticker 120 with at least two physical component layers, and each component layer may include one or more layers. For example, a tamper-evident sticker 120 may include two component layers, or components, and each component may have one or more layers. In some embodiments, at least one component, like a bottom-component, is partially concealed by a top-component. For example, a bottom-component may include private access information printed thereon that is concealed by the top-component. At least the top-component may include one or more tamper-evident features such that by visual inspection a user can easily determine whether private access information disposed on the bottom-component has been accessed (e.g., divulged) or is secure (e.g., has not been divulged). For example, a tamper evident pattern may appear within at least a portion of a component when that component is lifted away (e.g., such as to view concealed information) from a surface it adheres to with a threshold strength, like a swatch area of a card blank 105.

As shown, a sticker 120 is applied to a face of the card blank 105, such as a front or rear face. As described above, in some embodiments, the sticker 120 may be applied in the location of a swatch on a face of a card blank 105. The swatch may promote adhesion of an adhesive of the sticker 120 with the material of a face of the card 101 (e.g., a metal, plastic, composite, etc. as described above). Embodiments of the sticker 120 may comprise one or more tamper-evident features, at least one of which may be activated when a portion of the sticker 120 adhering to a face of the card 101 is lifted from the face of the card. For example, the sticker 120 may include a component 121 within which a tamper-evident pattern appears when the component 121 is lifted 125 from a surface (e.g., a face of the card) to which it adheres, and the configuration of the swatch may promote appearance of the tamper-evident pattern via the adhesive strongly adhering to the swatch. In some embodiments, the tamper-evident pattern is configured such that the appearance of the sticker 120 cannot be returned to an original appearance subsequent to a lifting 125 of a respective area of the component 121 from a face of the card blank 105 to which it was adhered. In some embodiments, the component 121 may be configured such that at least one layer (e.g., an upper layer) remains relatively intact with a tamper-evident pattern being revealed therein by virtue of underlaying destruction promoted by the adhesive in a lower layer of the component when lifted 125 from a surface of the card blank 105. In some embodiments, the component 121 may be configured such that a plurality of layers through a cross section of the component are destroyed in at least some portion of the component when lifted 125 from a surface of the card blank 105. In some embodiments, the above aspects are combined, for example, a first portion of the component 121 may easily tear when lifted 125 and another portion may not easily tear but a tamper-evident pattern is revealed in the another portion when lifted 125.

In some embodiments, as described above, the component 121 is configured to reveal a tamper-evident pattern when a corresponding portion of the component is lifted 125 from a surface to which it adheres to with sufficient strength. For example, in some embodiments, the surface (e.g., the swatch, material of the card blank 105, or combination thereof) to which at least some portions component 121 adhere to causes the revealing of the tamper-evident pattern by promoting adhesion of sufficient strength to reveal the pattern. Note that this does not necessarily mean that the component 121 is difficult to lift from the card blank 105, but rather that the component is difficult to remove without evidence of tampering. For example, an adhesive utilized in the component 121 may be colored (e.g., silver) and pull away from the component lifted, thereby revealing the pattern. Several non-limiting examples of a component 121 of a sticker 120 may include one or more features outlined below:

An example component may include one or more layers, such as one, two, three, four, or more layers. At least one layer of a component, such as a bottom layer, may include an adhesive operable to adhere to at least one surface, like a surface of a card blank. In some embodiments, the adhesive may be an adhesive layer applied to a sticker-roll in a manufacturing process and subsequent layers are added thereto to construct a multi-layer component. In some embodiments, the adhesive may be applied to a layer, which is then applied to a sticker-roll, and other layers are added thereto to construct a multi-layer component. In either instance, at least one layer, like a bottom layer of a component, may include an adhesive, such that the component may be attached to a surface. In some embodiments, the adhesive may be applied to a surface to which the component is attached, such as a surface of a face of a physical card, and one or more layers or components are adhered thereto by the adhesive disposed on the surface. Examples of adhesives may include glues, like an oil-based glue, or other suitable glues, examples of which may include an organic (e.g., oil), water, or other solvent base, which is mixed with a corresponding adhesive to create an adhesive solution for application. For example, a polymer (whether synthetic or natural) or resin adhesive may be dissolved in a corresponding solvent base for a given application. In some embodiments, an adhesive layer comprises a tamper-evident structure, which may be formed in the adhesive layer, or created in the layer by an overlaying film. In some embodiments, the adhesive layer is a film of adhesive, which may have selectively applied a pattern to cause different binding strength to a surface or film layer of a component in contact with the adhesive.

In some embodiments, a layer is polymer film, such as a polypropylene (PP) or polyester (PET) film, like an oriented film, which may be biaxially oriented. Orientation of a film may thin a starting film proportionally to the orientation, which may also be referred to as a stretch ratio. For example, to get to a 1 mil (where 1 mil=1/1000 of an inch, or 0.0254 mm) finished film with 5:1 stretch ratio in a first direction (e.g., lengthwise), a 5 mil film of polymer may be stretched proportionally (e.g., to approximately 5 times the starting length) in the first direction. For a biaxially oriented film, to get to a 1-mil finished film with 5:1 stretch ratio, a 25 mil film may be stretched proportionally in a first direction and a second direction (e.g., both lengthwise and widthwise by approximately 5 times the starting length and width). Thus, for example, in some cases a layer may be a biaxially oriented polypropylene (BOPP) or biaxially oriented polyester (BOPET) film, which may have a width of more than 100 inches, or more than 300 inches, and be many times longer in length, such as at least the length of a roll on which the stickers are manufactured. In some cases, one layer may be a PET or BOPET layer, and another layer may be a PP or BOPP layer. Accordingly, when a layer is described as a PET layer, such as a layer formed by a PET film, it should be understood that the layer may be formed from a PET film (e.g., which may be unstretched or is stretched in one dimension relative to a base PET film) or BOPET film (e.g., which is stretched in two dimensions relative to a base PET film) unless otherwise stated; and when a layer is described as a PP layer, such as a layer formed from a PP film (e.g., which may be unstretched or is stretched in one dimension relative to a base PP film) or BOPP film (e.g., which is stretched in two dimensions relative to a base PP film) unless otherwise stated. Further, in some embodiments, a PP film or PET film may be substituted with a polyethylene (PE) or other applicable film.

In some embodiments, a film is metallized. In some embodiments, multiple layers of film are utilized, some of which may be different films (e.g., a PP film for one layer and a PET film for another layer) to obtain different features or properties in a component. For example, a PP or PET film may be vacuum-metallized (e.g., like vapor deposition) or imbedded with metal flakes. In some embodiments, a vacuum-metallization process may be utilized to increase resistance to moisture intrusion. In some embodiments, a fragrance or other compound may be disposed (e.g., by a vacuum process) in a film, such as within a PP film, whereby scratching that film when it is utilized as a top layer releases (or exposes) at least some of fragrance or compound to increase perception of the scent. In some embodiments, thickness of a film ranges from 0.3-1.5 mils, but other thicknesses may be utilized. In some embodiments, for a same thickness, a PET film is less flexible than a PP film, and as a result, a PET film may afford greater stability than a PP film in printing. Accordingly, in some embodiments, at least one PET film is utilized for a component in at least one layer prior to a printing of information (e.g., an optical code, text, graphics, etc. as described herein), like in a lower layer of a component, on which the information is printed and another layer of film (e.g., PP or PET) is subsequently applied after the printing of the information. Thus, for example, an adhesive layer (which may have an adhesive structure, such as to reveal a pattern) may be formed, or applied to a lower PET layer, on which information is printed, and a subsequent upper layer may be applied to protect the lower PET layer (e.g., to protect the information printed on the lower layer). For example, in some embodiments, an upper layer of a component may be a PET layer, or in some embodiments, an upper layer of a component may be a PP layer.

In some embodiments, such as those that include a multi-component sticker, a bottom-component comprising private access information may include a lower PET layer (e.g., for printing and durability) and an upper PET layer (e.g., for durability), and a top-component comprising public access information may include a lower PET layer (e.g., for printing and durability) and an upper PP layer (e.g., for impregnation of a fragrance or metal for enhanced moisture resistance or resistance to scanning). Thus, as outlined herein, various combinations of films and technologies may be utilized in different layers to obtain different component configurations for the different components of a multi-component sticker. For example, moisture, oxygen, ultraviolet, heat, and other environmental resistance properties of films may be considered to afford a desired configuration of layers in a component. Further, for example, strength and durability of a film or layer of material, whether by virtue of the material or construction of the film or layer (e.g., PP, or PET, or PE, or other compound and whether stretched in a single direction or biaxially stretched), may be considered to afford a desired configuration, such as whether a given layer should peel away cleanly, break apart, or otherwise interact in combination with an adhesive to afford tamper-evidence. Example beneficial properties of a PET film, such as a BOPET film, may include dimensional stability, thickness uniformity, and transparency; and example beneficial properties of a PP film, such as a BOPP film may include transparency and moisture barrier.

Example films and technologies consistent with the disclosure of components and layers thereof for utilization in a multi-component sticker may include, in addition to the examples described above, one or more upper-layer films or substrates (e.g., PET type films and substrates like a chrome polyester or polyethylene terephthalate polyester, PP type films and substrates, vinyl films and substrates, ceramic films and substrates, or other films or substrates, which may be optionally embedded with chrome or a metal (e.g., metallized) to mitigate certain scanning or imaging techniques for determining information of the concealed portion or embedded with a fragrance by which users may ascertain authenticity) and an underlying-layer film or substrate (e.g., one of the above mentioned films or substrates or an adhesive film or substrate) having an adhesive pattern portion (which may be an adhesive layer to which the underlying-layer is applied, or an adhesive applied to the underlying-layer, or inherent to the underlaying-layer or promoted in the underlaying layer or in the adhesive layer whether by laser, cutting, or other applicable process), like a diamond, hexagonal, or square checkerboard-like pattern. In various embodiments, the adhesive pattern portion of an underlaying-layer is such that when a substrate top-coated portion of the substrate is peeled away, the pattern portion underneath remains. In turn, the sticker 120 cannot be resealed or reused to original appearance, thus being evident of tampering should a user attempt to ascertain the information on the concealed layer of the sticker 120.

In some embodiments, a component includes a destructive layer of a PP, PET, or vinyl film or substrate that rips and tears apart easily (e.g., inherent to the substrate or by manufacturing process, such as via perforations or cuts in the substrate to promote tearing), and once adhesively applied to a surface is destructible in the sense that it cannot be removed in one piece. For example, a strong adhesive utilized in conjunction with the destructive layer may cause the substrate to easily-fragment material and means that it is difficult to remove the layer (e.g., from the swatch portion without leaving pieces behind, however it may remove easily without tearing from some other surface, like that of a bottom component). In turn, such a top-component of a sticker 120 cannot be returned to original appearance (e.g., for resale, resealing, or reuse), thus being evident of tampering should a user attempt to ascertain the information on a concealed, bottom-component of the sticker 120 or information that is otherwise concealed by the top-component. In some embodiments, an adhesive layer comprises similar properties, such as a pattern promoted in the layer, and some of the pattern peels up with an underlaying layer and some remains adhered to the surface to which the component was applied. In some embodiments, a component includes a layer of a PP, PET, or vinyl film or substrate that contains a concentration of light-refracting elements to increase difficulty to forge, scan, or reproduce the component. In some embodiments, a component includes a foil film or substrate (which may be a metallized film or a foil), like a holographic foil or film, having a prismatic effect and pattern that deters forgery or duplication.

In some embodiments, a component includes one or more relatively transparent portions of one or more layers such that an adhesive or adhesive residue, which may be colored, and configured to reveal a pattern when the component is lifted from the surface the adhesive adheres the component to that is then visible in corresponding transparent portion. A transparent or relatively transparent portion enables a user to discern at least some information through (e.g., information that underlays) the material, such as by visual identification, like a pattern being visible at 1-3 feet or underlying text of 8-12 pt font being readable at 1-2 ft. For example, a residue of an adhesive layer or adhesive utilized for a layer may cause, within the transparent portions of one or more other layers of a component, a highly visible pattern of shapes (e.g., in a checkerboard-like pattern) to be left behind when the component is lifted from a surface to which it adheres (e.g., with sufficient strength, like to a material of the card, but may adhere to some other surface, like that of a bottom component, within which that portion a pattern may not be revealed—which in some instances may readily convey that a top component was lifted due to some portions including a pattern but not others). Such an adhesive may be colored, such that the shapes are visibly identifiable. As described above, some relatively transparent portions (e.g., with none to minimal printing within those areas) may be utilized in conjunction with an adhesive like that described above such that shapes (or pattern, or in other embodiments, tears in one or more layers, like underlaying layers) are at least partially visible on the component when it is lifted away from a surface. In some embodiments, the portions not corresponding to the shapes (or pattern, or in other embodiments, tears in one or more layers) lifted away with the component remain on the surface to which the component was adhered to such that removal of the component is tamper evident on both the component and the surface to which it was applied. In some embodiments, the adhesive or a layer of the component stretches (e.g., in the pattern or shapes), tears, or otherwise is at least partially altered (e.g., destroyed) visibly in the component or on a surface to which the component adheres when the component is lifted from surface such that an attempt of a matching of tamper-evident features visible in the component (or portion thereof) that was lifted from the surface back to the corresponding tamper-evident features visible on the surface (e.g., in an attempt to reposition and re-lay or adhere the component (or portion thereof) back to the surface) does not return the component to an original state upon visible inspection. For example, there may be gaps or other visible tamper-evident features (compared to a uniform appearance in an unaltered state) that betray an attempt to replace the component subsequent to tampering. Accordingly, in some embodiments, a component of a sticker 120 cannot be returned to original appearance after application to a surface (e.g., like that of disclosed embodiments of a card or other material), thus being evident of tampering should a user attempt to ascertain information, like private access information, concealed by that component.

Further, in some embodiments, a component of a sticker 120 may include, in addition to at least one tamper-evident feature, a EURion constellation, or other pattern configured to cause imaging software to detect the presence of a component of the sticker 120 in a digital image. In some embodiments, where the sticker is a multi-component sticker 120, one or more components (with or without a tamper-evident feature) may include a EURion constellation, or other pattern configured to cause imaging software to detect the presence of a component of the sticker. Such software may block a user from reproducing the sticker 120 or a component thereof. For example, the EURion constellation or other pattern may be printed on the component 121 along with other information when generating the sticker 120. Similarly, the EURion constellation or other pattern may be printed on another component, like an undelaying bottom-component 130 (which may also be a second, underlying sticker), of a multi-component sticker 120 in addition to a top-component 121.

One or more of the above-mentioned configurations may be used alone or in combination to construct a sticker 120. In some embodiments, as mentioned above, the sticker 120 may be a multi-component sticker and one or more of the above-mentioned configurations may be used alone or in combination to construct a given component of a multi-component sticker. The different components may be constructed separately (e.g., as individual stickers) and merged together prior to application or applied in sequence to form a multi-component sticker 120. Alternatively, in some embodiments, a multi-component 120 sticker may be formed by constructing a first underlaying bottom-component and constructing a second overlaying top-component thereupon. Regardless of the specific construction method, embodiments may utilize a different configuration for different ones of the components to construct a multi-component sticker. Thus, generally, as referred to herein, a given component may have a relatively discrete function (e.g., include some component specific information and one or more features selected from tamper-evident features, features to mitigate scanning attacks, or features to prevent reproduction depending on function) compared to another component.

In some embodiments, at least some information disposed on a card blank, such as information corresponding to private access information, may be masked 140. A mask 140, like a component 121 of sicker 120, may include one or more tamper-evident features. For example, a mask 140 may have one or more layers having a similar configuration to a component 121. In some embodiments, the mask 140 is a sticker having dimensions (like a length and width) operable to encapsulate (e.g., envelope, cover, hide, enclose, or otherwise conceal) an area of the card blank 105 on which the information corresponding to private access information is disposed, like an area within which an encryption key or passphrase operable to obtain private access information (e.g., in plaintext) is engraved or otherwise disposed on the card blank. For example, embodiments of a mask 140 may include a layer having a similar construction by which a tamper-evident pattern appears within a component 145 of the mask to provide a tamper-evident masking that conceals an encryption key disposed on the card blank 105. In some embodiments the mask 140 may include both tamper-evident features, such as by a multi-component mask having a top-component which when lifted a pattern is revealed and includes a window to a bottom-component having a scratch-off surface by which the concealed encryption key may be revealed, and the top-component may surround the bottom-component with some overlap (e.g., a first portion of the top-component, such as around the window, overlaps with the bottom-component and a second portion adheres to the card blank 105). In some embodiments, the mask 140 includes a component 145 having a scratch-off surface layer by which a concealed encryption key may be revealed. For example, the component 145 may include multiple layers, like an adhesive layer, an underlaying layer and a scratch-off layer or scratch-off material disposed on the underlying layer. In some cases, the adhesive and underlaying layer may be transparent such that removal of the scratch-off material reveals the information concealed under the mask 140. In some embodiments, the component 145 of the mask comprises a destructive tamper-evident feature in addition to a scratch-off top layer to prevent a bypassing of the act of scratching off the material to reveal the concealed information. For example, one or more layers of the component 145 of the mask 140 may be perforated or cut to promote tearing when lifted.

As described above, in some embodiments, the tamper-evident sticker 120 includes at least two physical components, one of which is partially concealed by the other. A top, exposed component 121 may include an optical code (e.g., a QR code) portion 123. In some embodiments, the optical code portion 123 includes an optical code printed within the portion that encodes an address corresponding to a public key of a public-private key pair of an asymmetric encryption algorithm. In some embodiments, an optical code printed within the portion may encode the public key (e.g., instead of or in addition to a corresponding address). In some embodiments, the optical code portion 123 includes an optical code printed within the portion that encodes an identifier that is associated with an address (e.g., that corresponds to a public key of a public-private key pair) within a database. In some embodiments, the optical code portion 123 includes an optical code printed within the portion that encodes a URL (e.g., web address), which may include a portion of the URL that is based on one or more informational components of the card. For example, an encoded URL may have a form similar to www.website.com/<alphanumeric string>, where the alphanumeric string corresponds to, or is based on, information like a public address, public key, or identifier associated with the card, and in some examples may be based on multiple identifiers. In turn, the webpage to which the URL directs may include information corresponding to the card (e.g., for one or more wallet addresses associated with the card), like a depiction of the card, balance information corresponding to one or more wallet addresses of the card, and (optionally) address information for wallet addresses of the card. A server, for example, may generate or populate graphical and informational components within the webpage responsive to the alphanumeric string, which may be used by the server to identify card record information. In some examples, the public key may be discarded, such as to prevent transfer of digital bearer assets to the account associated with the card without either access to the database or accessing the private access information of the card. In some examples, such a configuration may be desirable to restrict original use of the card to only the purpose for which it was issued. For example, without accessing the private access information of the card, a user may be unable to ascertain an address of an account associated with the card and, as a result, cannot transfer digital bearer assets to the card unless such permissions are afforded to the user within a system having access to the database that stores an association between an identifier of the card and one or more addresses (or the public key).

Printing within the optical code portion 123 may occur on a component 121 of the sticker 120, such as a top-component visible to a user. In some embodiments, the exposed top-component 121 of the sticker 120 may include an alpha-numeric portion 129. The alpha numeric portion 129 may include information printed thereon that corresponds to some or all of the information encoded by an optical code within the optical code portion 123. For example, a QR code printed within the optical code portion 123 may be an encoded version of an alphanumeric string printed within the alphanumeric portion 129. In some examples, the optical code portion 123 may encode a URL comprising an alphanumeric string such that users may use a device, like a mobile phone, to scan the optical code to cause the device to request a webpage corresponding to the URL to view information about the card (or sticker). In some embodiments, both may be an address corresponding to a public key of a public-private key pair. Alternatively, in some embodiments, the optical code portion 123 may be an encoded public key, and the alphanumeric portion 129 an address in plaintext, or the optical code portion 123 may be an encoded address, which in some examples may be an encoding of a URL including address or identifier information, and the alphanumeric portion 129 a public key in plaintext. In some embodiments, the optical code portion 123 may be an encoded unique identifier, which in some examples may be an encoding of a URL including the unique identifier or other informational components (such as a card identifier 107) or combination thereof, that uniquely corresponds to the card but is not a cryptographic hash address operable on a decentralized computing platform that is based on the public key. The unique identifier may be associated, server-side, such as within a database, with one or more cryptographic hash addresses or the public key. Thus, for example, the unique identifier may be an address (or record) identifier and operable within the context of a server-system supporting the card, rather than a cryptographic hash address itself (or a public key from which cryptographic hash addresses may be deterministically generated). In some examples, the unique identifier may be based on the public key, but is not generate in accordance with a protocol of a decentralized computing platform for deterministically generating a cryptographic hash address operable on the platform. In some examples, the unique identifier may be based on information disposed on the card, such as a cryptographic hash of another identifier, or a combination of an identifier and a code, or other values which alone, or in combination, can serve to uniquely identify a card. In other examples, the unique identifier may be a cryptographic hash based on a randomly generated value and not based on any information on the card, the private key, or the public key. In some examples, an encoded unique identifier may be the same or different from the unique identifier 107 by which components of the physical card may be matched. In examples where the optical code portion 123 is the same or corresponds to a unique identifier 107, the alphanumeric portion 129 may be omitted (e.g., as it may be redundant to the unique identifier portion 107B).

The top, exposed component 121 may also include a unique identifier portion 107B. A unique identifier of the top-component of the sticker 120 may be printed within the unique identifier portion 107B. The top, exposed component may also include a window portion 127A through which a portion of a bottom-component 130 of a multi-component sticker 120 may be visible while other information corresponding to one or more other portions of the bottom-component of the sticker 120 remain concealed. The unique identifier may correspond to a serial number within a namespace of an issuer (or manufacturer) of the physical card 101 such that the card issuer may ensure a match of components of multi-component stickers 120 having respective information on different components and a match to card blanks 105 having respective information disposed on them. For example, a unique identifier 107A may be etched or printed on a card blank 105, printed 107B on the top-component 121, and printed 107C on the bottom component 130 within at portion visible from a window portion 127A of the top-component. Accordingly, for a complete card 101, a top-component 121 may include visible public access information and the bottom-component 130 may include concealed private access information, the combination of which when matched by the unique identifier ensuring that the public access information corresponds to the private access information such that digital bearer assets transferred to the card based on the public access information are held by an account to which access is permissioned based on the private access information of a bottom-component 130 (divulging of which is evident via removal of embodiments of a top-component 121 including one or more tamper-evident features). In some embodiments, as an additional layer of security, additional information may be disposed on the card 101 in addition to the sticker components, such as by etching or printing an encryption key or passphrase operable to obtain plaintext private access information from ciphertext private access information on the bottom-component 130 and which may be matched to the corresponding components based on the unique identifier (e.g., that is printed or etched on the card).

In some embodiments, the window portion 127A of the top, exposed layer is aligned with a unique identifier portion 130 of the lower layer of the sticker 120, such that the unique identifier is visible within the window. In assembly of the sticker 120, the top, exposed layer substrate 121 may be aligned with the lower layer and the information printed on the top, exposed layer matched to the information printed on the lower layer based on the unique identifier printed within the unique identifier portion 130 of the lower layer. Thus, for example, the unique identifier printed on the lower layer may correspond to the unique identifier printed on the top, exposed layer of the sticker 120, the correspondence being visually verifiable by a user through a matching of the printed unique IDs by virtue of the window 127A. In turn, the sticker 120 may be applied to a card blank 105, on which the unique identifier is disposed to indicate that the information on the card blank 105 corresponds to the information printed on both layers of the sticker 120.

As described above, a QR code printed within the optical code portion 123 may be an encoded version of an alphanumeric string printed within the alphanumeric portion 129, for example, both may be an address corresponding to a public key or in some cases, the public key. In some embodiments, the public key of a public-private key pair may be utilized to generate an address. In some embodiments, the card issuer may generate, with a server, a plurality of addresses for different decentralized computing platforms based off the public key, like a set of addresses corresponding to a set of decentralized computing platforms for which corresponding addresses are operable to receive digital bearer assets associated with the respective decentralized computing platform. In some examples, a QR code printed within the optical code portion 123 may be an encoded version of an identifier, like a wallet address identifier, which may be associated with one or more of the above-mentioned addresses in a database.

In some embodiments, one address or an identifier may be printed on a sticker 120, such as within the optical code portion 123 of a component 121 of the sticker, and a server (e.g., of the card issuer) may be queried with information based on an optical reading of the QR code. In some examples, the query may return an address, or a set of addresses, based of the public key, or the public key may be retrieved (e.g., without accessing private access information concealed by the component 121). In some examples, the query may return information associated with an identifier based on a relation formed between the identifier and one or more addresses within a database. For example, the query may return information about the one or more addresses, like information about digital bearer assets held by one or more of the addresses, without a requirement to return an address or public key information.

In some embodiments, one or more addresses are printed on the component 121. In some embodiments, the public key is printed on the component 121. In some embodiments, the public key is printed on the component 121 in conjunction with an address. In some embodiments, the public key is disposed on the card, such as under a mask, like a mask 140, such that a user may retrieve the public key if necessary if the component 121 is discarded. Further, in some embodiments, private access information like an encoded private key or the private key may be encapsulated (e.g., enveloped, covered, hidden, enclosed, or otherwise concealed) by the component 121. For example, in various embodiments, the private access information may be included on a portion of a bottom-component 130 of a multi-component sticker 120 that is concealed by an upper, top-component 121 of the sticker which includes the public access information. However, in some embodiments, the private access information (e.g., the private access information included on a bottom-component 130 that is concealed by the top-component 121) may be alternatively disposed on a portion of the card blank 105 and concealed by one or more components of a sticker 120 (e.g., at least a component 121 having tamper-evident features). In some embodiments, the card blank 105 is engraved or printed with private access information in duplicate (e.g., either by optical code or by alphanumeric text) to a bottom-component 130, which, in some embodiments, may provide means of obtaining private access information in instances where a bottom-component of a sticker is destroyed (e.g., by abrasion, moisture, fire, or other environmental exposure that the card but not the sticker survives). The one or more features of components of a sticker to prevent scans or otherwise non-invasive methods of ascertaining private access information printed on a component of a sticker 120 (e.g., on the bottom-component 130) may also mitigate attempts to ascertain information that is printed, engraved or otherwise disposed on the card blank 105. In some embodiments, an engraving or etching or stamping or embossing may be filled or surrounded with a material of similar density, reflectivity, or both such that a scan or other non-invasive method cannot ascertain the information disposed on the card blank 105 (similar precautions may also be implemented for other information disposed on the card blank, like information engraved or etched under mask 140).

As described above, an address, e.g., within portion 123 or portion 129 of a card 101, or otherwise associated with the card (e.g., an address that is associated with an identifier of the card) may be utilized within a decentralized computing platform for receiving transfer of a digital bearer asset of the decentralized computing platform, such as a transfer resulting from a user of the decentralized computing platform submitting a transaction on the corresponding platform. An example transaction, such as from a user by an address generated based on a public key for which that user also holds the corresponding private key may transfer the asset (or assets), like cryptographic currency, tokens, or NFTs, to a specified address (e.g., an address corresponding to the card 101), or a set of specified addresses (e.g., like addresses corresponding to respective cards in a set of cards).

In some embodiments, an address is generated for a given decentralized computing platform based on the public key of a public-private key pair according to an address protocol (or format) specified by the given decentralized computing platform. For example, given a private (secret) key and corresponding public key of a key-pair, an address for a given platform (e.g., bitcoin blockchain in the example below) may be generated, such as by taking the corresponding public key (e.g., 33 bytes, 1 byte 0x02 (y-coordinate is even), and 32 bytes corresponding to x-coordinate) generated with the secret key, hashing on the public key (e.g., SHA256 cryptographic hashing function), hashing on the result of SHA-256 (e.g., truncating by RIPEMD-160 cryptographic hashing function), adding a version byte in front of RIPEMD-160 hash (e.g., 0x00 for Bitcoin on bitcoin blockchain, or other version byte as some blockchains may support different versions or variations of addresses for different digital bearer assets), hashing the result of the now extended truncated hash (e.g., SHA-256 hash), hashing the result (e.g., subsequent SHA-256 hash), taking the first X (e.g., 4) byte checksum of the result of the second hashing, and adding the 4 checksum bytes at the end of extended RIPEMD-160 hash from earlier to generate an address (e.g., a 25-byte binary Bitcoin address). In some embodiments, the 25-byte binary address may be converted into a byte string, such as a base58 byte string, by Base58Check encoding, to generate an alphanumeric bitcoin address. Here, the resulting address may be verified deterministically based on the public key, a specific example for a version 1 BitCoin address is outlined in "Technical background of version 1 Bitcoin addresses," obtained on the filing date of this application and incorporated by reference herein from https://en.bitcoin.it/wiki/Technical_background_of_version_1_Bitcoin_addresses, a copy of which is included in the information disclosure statement filed with the application.

Other platforms may utilize similar steps but in a different sequence, different version bytes, or other variation such as in hashing order, hashing function used, truncation, and the like, but may be similarly deterministic based on the public key of the key pair for the given platform. For example, some decentralized computing platforms may have different address protocols having different checksums, different truncations (e.g., first values or last values), different prefixes, different one-way hashing functions, and the like. Some embodiments may include that generations of a set of addresses by a server or computing system of the issuer (or manufacturer that includes forming one or more addresses based on a public key by deterministically generating one or more of a first address among the set of addresses based on a Keccak-256 hash that is based on the public cryptographic key; a second address among the set of addresses based on a RIPEMD-160 hash of a SHA-256 hash that is based on the public cryptographic key, the second address also being based on a checksum based on the RIPEMD-160 hash, and the second address having a Base58 encoding based on a first dictionary; and a third address among the set of addresses with a Base58 encoding and a checksum that are both based on the public cryptographic key, the Base58 encoding of the third address being based on a second dictionary that is different from the first dictionary.

A server of the card issuer may store a set of one or more of the addresses based on a given public key corresponding to an issued card for respective platforms such that a user in possession of the issued card may query the service to retrieve (or use) addresses for a plurality of platforms to transfer assets to respective addresses based on the public key (and later access those digital bearer assets, such as to original a transfer of held digital bearer assets, by accessing the private access information of the card to obtain the corresponding private key). In some examples, a server may store a set of one or more of the addresses and return, in response to a query, information about digital bearer assets held by one or more of the addresses. One or more addresses or a public key may optionally be returned. In some examples, an address or a public key is not returned to prevent use of the card in its original configuration for purposes other than those intended by the issuer. Thus, for example, a user of the card may be required to access the private information stored on the card to determine that information withheld from the user, where access of that information visually alters the card from its original state.

In some embodiments, when a user wishes to access those digital assets, the user may access private access information concealed by a component 121 by lifting 125 and peeling off the component 121. Peeling off the component 121 reveals the information concealed thereunder, such as the private access information that corresponds to the public access information printed on the component 121 (e.g., within the optical code portion 123 or alphanumeric portion 129 or from another address in a set of addresses generated based on the public key). In some examples, the private access information may correspond to an address stored by a server within a database that is associated with an identifier disposed within the optical code portion 123 (e.g., as an optical code).

Private access information may be printed on a bottom-component 130 and visible once a top-component 121 is removed. In some embodiments, a user may also peel, scratch, or otherwise interact with a mask 140 to reveal an encryption key by which ciphertext private access information may be decrypted to obtain plaintext private access information such as the private key. User experience is drastically simplified over previous implements, a component 121 of a sticker is physically peeled back (or off) to reveal a secret. And, by virtue of disclosed embodiments of a tamper-evident features of the component 121, loss of secrecy is physically apparent by visual inspection with the naked eye. Moreover, there is no need for a user to remember a set of key recovery passphrases, like those often used with electronic approaches.

FIG. 1B illustrates an example 100B of a physical card configured to manage account access information for digital bearer assets, according to various embodiments. Embodiments of the example 100B of a physical card may include a different window 127B and mask 140 configuration over that of the examples in FIG. 1A. The various examples may be combined, such as a mask as described with reference to FIG. 1B with a window as described with FIG. 1A and vice versa.

As shown in FIG. 1B, the example window 127B is a cutout portion of component 121 that extends to the edge of the component 121 of sticker 120. In other words, in contrast to the example window 127A illustrated in FIG. 1A, the example window 127B of FIG. 1B is not fully surrounded by the component 121. Thus, a bottom-component 130 may have an edge or perimeter portion that is not overlapped by the top-component 121, while the top-component 121 extends over another edge(s) or perimeter portion. Other example window configurations may also be used, or in some cases, a bottom-component 130 may extend beyond the border of a top-component 121, like a tab, which may correspond to a unique identifier portion 107C on which a unique identifier is printed and visible upon inspection of the card 101.

Also shown in FIG. 1B, an example mask 140 includes a first portion 140A and a second portion 140B. In some embodiments, the first portion 140A corresponds to a verification code (e.g., a first portion of the underlying encryption key or passphrase) by which the card 101 may be verified without revealing a second portion 140B (e.g., a remainder of the underlying encryption key or passphrase). In some embodiments, the component 145 of the mask 140 is marked to indicate the different portions. For example, the component 145 may be visibly perforated and optionally include printed information indicating that a first portion 140A may be removed to reveal a verification code portion of an encryption key without removing a second portion 140B thereby divulging the remaining second portion of the encryption key. In another example, a scratch-off surface of the component may be printed to the indicate the different portions and include printed information indicating that material corresponding to the first portion 140A may be scratched off to reveal a verification code, but that the second portion 140B need not be scratched off until the user desires to obtained private access information.

FIG. 2 illustrates an example 200 of a card including a verification code component of a cryptographic passphrase and corresponding tamper-evident mask, according to some embodiments. Compared to the examples of FIG. 1B (or FIG. 1A), FIG. 2 illustrates the removal of a portion of a mask 140.

A component 145 of the mask 140 may be tamper evident, such that removal of a portion 140A of the mask (whether by lifting or scratching a surface of the component) is evident upon visual inspection. As shown, a first portion 140A of the mask has been removed to reveal concealed information while a second portion 140B of the mask remains intact. As described above, the first portion 140A of the mask may have been removed by a variety of methods, such as by scratching a surface of the component 145 corresponding to the first portion 140A to reveal information thereunder, by lifting the component 145 (or one or more layers thereof) from a surface of the card blank 105 corresponding to the first portion 140A to reveal information thereunder (in which case a pattern or residue or tear in that portion of the component may be evident), or by other means that activates a tamper-evident feature of the component 145 corresponding to the first portion 140A when a portion of underlying information 247 is revealed. The portion of underlying information 247 concealed by the first portion 140A of the mask may be a verification code operable to verify authenticity of the card 101. For example, the verification code may be a corresponding first portion of an encryption key or passphrase, by which private access information in ciphertext concealed by a component 121 of the sticker 120 can be decrypted to obtain private access information in plaintext. Alternatively, a verification code may be separate from the encryption key or passphrase (e.g., the first portion 140A conceals a verification code which does not correspond to first portion of the encryption key or passphrase), like a cryptographic hash (e.g., truncated to a desired number of characters) based on information corresponding to the card (e.g., the unique identifier, optical code or other visible information) or a PIN by which the card 101 may be verified.

In some embodiments, an issuer (or manufacturer) of physical cards maintains a database associating unique identifiers of components (e.g., 121, 130) of a sticker 120 and of card blanks with verification codes. In some embodiments, the entry may be a hash, like a cryptographic hash, such as a SHA-256 hash of a unique identifier concatenated with the verification code, or other information by which correspondence between a unique identifier and verification code may be maintained. In some embodiments, an issuer of physical cards may publish an algorithm by which issued physical cards may be verified with verification codes. In turn, for example, a user may utilize an application to verify the physical card by imputing the verification code and other information, such as the unique identifier of the card and the public access information (e.g., the public key or address or wallet address identifier encoded by the optical code printed within the optical code portion 123 or the alphanumeric text printed within the alphanumeric text portion 129 of the component 121 of the sticker comprising public access information). In some examples, a wallet address identifier encoded by the optical code within the optical code portion 123 may correspond to the unique identifier 107 on the set of components.

In some embodiments, an application may submit a request to a server to verify the card, such as server of the card issuer, or a decentralized computing platform, such as by requesting execution of specified smart contract on the decentralized computing platform. An example smart contract may be a portion of executable code, like a script. A computing node of the decentralized computing platform on which the script resides (e.g., immutably within a block of a blockchain or blockchain-like immutable data store) may access the script at a specified address, like a cryptographic hash address, and execute the script in response to a request (e.g., a request specifying the address and including input information, like a verification code and unique identifier) and return the results.

In some embodiments, a computing node is a peer node of the decentralized computing platform and stores in memory at least part of a distributed ledger recording transactions in which digital bearer assets, like cryptographic currency, tokens, or NFTs, have been transferred into an account on the decentralized computing platform corresponding to a public key of the public-private cryptographic key-pair including the private key of the card, wherein the decentralized computing platform is operative to transfer the cryptographic tokens out of the account responsive to a party demonstrating possession of the private cryptographic key of the card. The distributed ledger may also store other information by way of a function or transaction (e.g., sstore, sload, etc.), such as information operable to verify a card based on key-value pairs. In some embodiments, the results are returned by publication of the results to the immutable data store of the decentralized computing platform, like a transaction. In some cases, a user may pay a gas (e.g., processing fee) for the processing to verify the physical card, thus minimizing reliance on a card issuer for verification subsequent to purchase. In some embodiments, the card issuer may publish verification results or verification information to the immutable data store, such that users may verify by either method.

In some embodiments, the underlying information 247 concealed by the mask 140 is an encryption key, like a symmetric encryption key, which may be operable to decrypt at least some information concealed on the card, e.g., by the sticker 120 or a top-component 121 of the sticker 120. For example, a bottom-component 130 of the sticker 120 or engraving or printing of the card blank that is concealed by at least component 121 of the sticker may include ciphertext corresponding to a private key which the encryption key is operable to decrypt to obtain the plaintext of the private key. In some embodiments, a subset of the encryption key serves as a verification code, such as the first 4 values of the encryption key, which may have 12-24 (or more) values. In some embodiments, the first 4 values of the encryption key may also deterministically verify at least some concealed information on the card, such that if a user chooses, they may verify the card 101 with an issuer and also deterministically verify a portion of concealed information by revealing that portion (optionally without revealing the entirety of concealed information, although a user may choose to fully verify each aspect of the card deterministically by obtaining the plaintext of the private key, computing the public key, and computing a set of addresses). Here, for such a use case, the user is still guaranteed by the tamper-evident features that they are the only entity in possession of the private access information.

As described above, a component 145 of the mask 140 may be tamper-evident, such as by one or more of the tamper-evident means disclosed herein, like one or more layers having one or more tamper-evident features like a backing adhesive adhering a layer to a card blank 105 that when the layer is lifted reveals a pattern, scratch-off surface layer, and the like. Thus, for example, prior user verification of the card by a verification portion of the concealed information 247 may be evident by removal of a portion 140A of the mask concealing the verification code information.

In some embodiments, uses may also utilize one or other verification measures, such as by inspecting the physical card 101 for features associated with the product. For example, a component 121 may have a top layer of material on which or within which a scent is imbedded (which may be promoted via scratching at the surface). A user may lightly scratch a surface of the component 121 and detect the scent to verify authenticity. In another example, a user may inspect one or more metallic flake emblems, holograms, or other images or imbedded materials in the component 121.

Figure 3A:
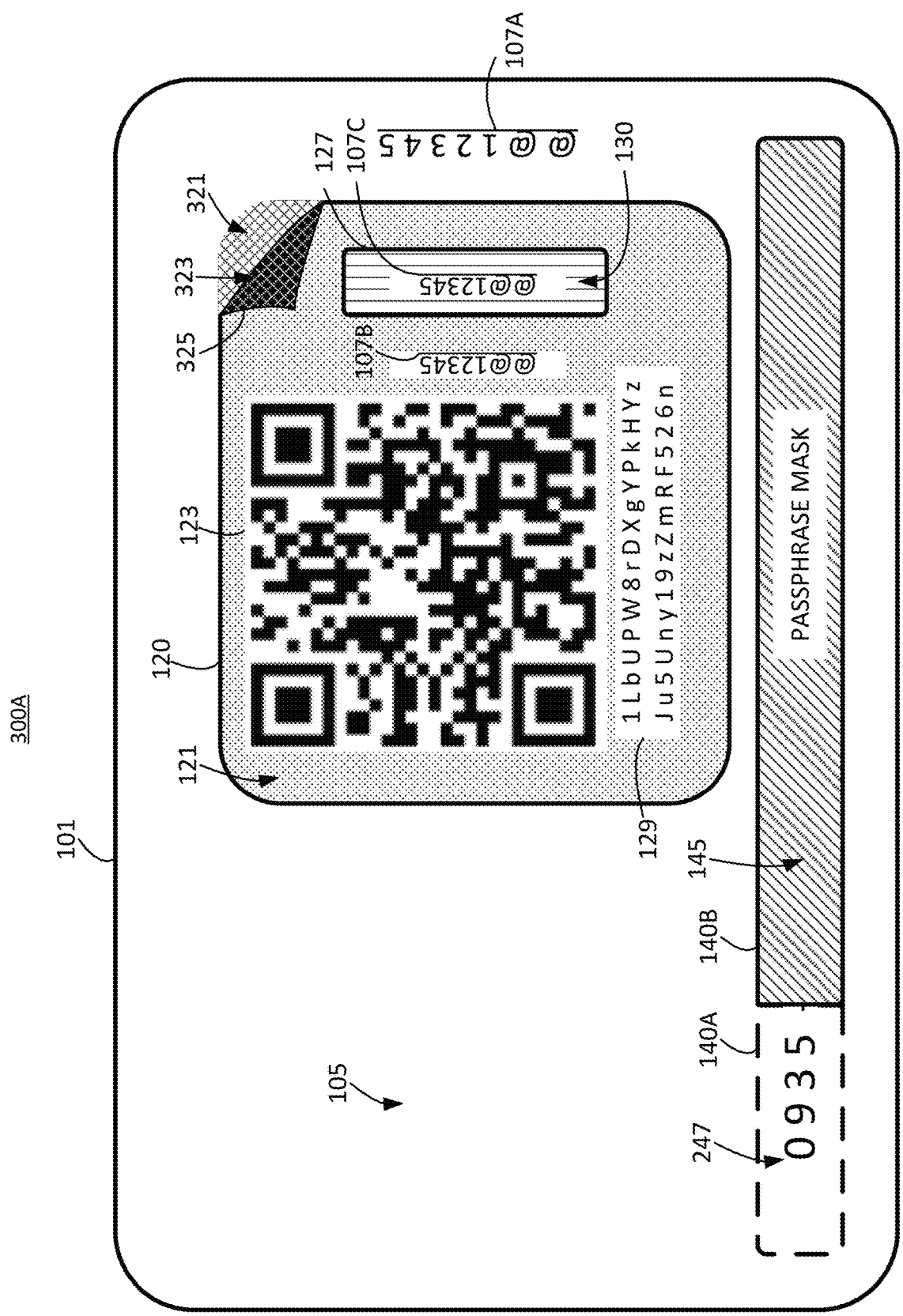
FIG. 3A illustrates an example of a card including a tamper-evident top-component of a multi-component sticker, according to some embodiments.

FIG. 3A illustrates an example 300A of a card including a tamper-evident top-component 121 of a multi-component sticker 120, according to some embodiments. Compared the examples of FIG. 2 (or FIG. 1A or FIG. 1B), FIG. 3A illustrates a lifted 325 portion of a tamper-evident component 121.

As shown, a residue, like a tamper-evident pattern 321 of an adhesive layer or layer having an applied adhesive may remain adhered to a surface of a card blank 105 when a corresponding portion of a tamper-evident component 121 adhered to the surface of the card blank is lifted 325 away. For example, the tamper-evident pattern 321 evident on the surface of the card may be a respective portion of the pattern formed in an adhesive layer or a lower layer of the component 121 that is configured to remain adhered to the surface of the card. Examples may include remaining adhesive, which may form a pattern, or remaining adhesive pattern layer, evident upon visual inspection.

In addition, a tamper-evident pattern 323 may be evident in the component 121, like a respective portion of the pattern formed in an adhesive layer or a lower layer of the component 121 that is configured to remain adhered to (e.g., is retained by) the component 121 when the component 121 lifted 325 from surface of the card blank 105. Thus, in some embodiments, the tamper-evident pattern 323 visible on the component 121 may appear as an inverse of the tamper-evident pattern 321 visible on the surface of the card blank 121. For example, if the pattern is a honeycomb-like pattern of hexagons, residue pattern 321 may be a plurality of hexagons and retained pattern 323 may be plurality of borders surrounding the hexagons, or vice versa. Alternatively, for a checkerboard-like pattern of squares, residue pattern 321 may be a plurality of offset squares (e.g., corresponding to red squares of a checkerboard if the black squares were removed) and retained pattern 323 may be a plurality of opposingly offset squares (e.g., corresponding to the black squares of a checkerboard that were removed). Other patterns or designs, whether randomly generated or having a specific structure, or tearing are equally applicable; the tamper-evidence aspect resulting from a first portion remaining as residue 321 on the surface of the card blank 105 and a second, opposing portion being retained 323 by the component 121 when lifted. In some embodiments, a residue portion 321 of the pattern may be distorted on the surface of the card blank 105 or a retained portion 323 of the pattern may be distorted on the lifted portion of the component 121 due to a lifting 325 away of the component 121. In some embodiments, a swatch disposed in the surface of the card blank 105 promotes the physical stripping away of the portion of the tamper-evident pattern 321 that remains on the surface of the card blank from the component 121.

As described above, the component 121 of the sticker 120 may encapsulate (e.g., envelope, cover, hide, enclose, or otherwise conceal) at least some private access information, whether that private access information is disposed on the surface of the card blank 105, on a bottom-component 130 of a multi-component sticker, or both. Accordingly, a tamper-evident feature of the component 121, like a bifurcation of an adhesive, adhesive layer, or a layer adhered to the surface of the card blank, such that some portion of the component 121 is physically stripped away (e.g., and remains on the surface of the card blank 105) while another portion is physically retained by the component 121 visibly displays evidence of tampering both on the surface of the card blank 105 and on the component 121. Moreover, because some portion of the component 121 is physically removed, a nefarious party cannot return the component 121 to original appearance. As a result, a user can visually inspect a card 101 to determine whether the private access information has been previously accessed.

Figure 3B:
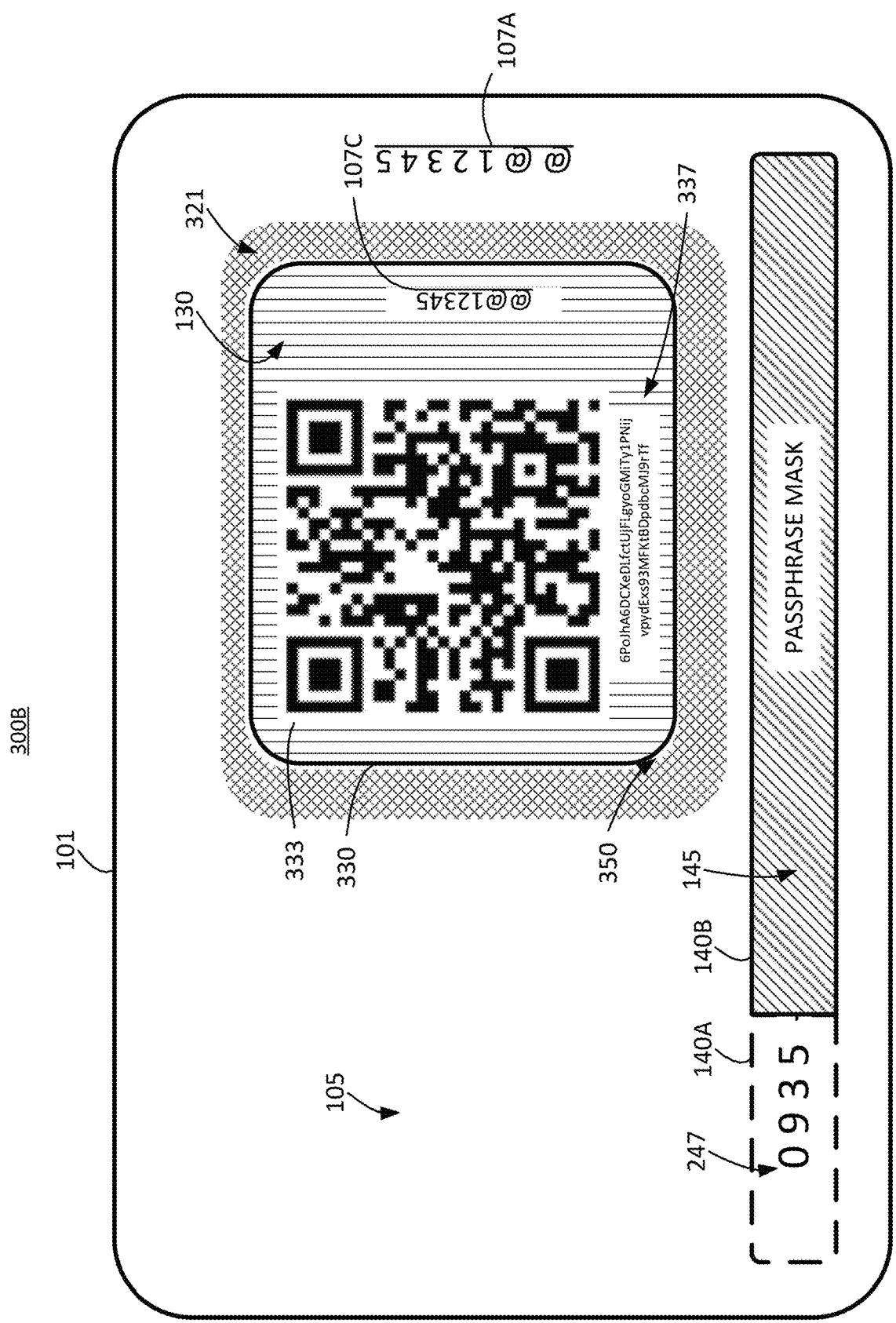
FIG. 3B illustrates an example of a card showing a tamper-evident effect after removal of a tamper-evident top-component of a multi-component sticker to expose a bottom-component of the multi-component sticker, according to some embodiments.

FIG. 3B illustrates an example 300B of a card 101 showing a tamper-evident effect after removal of a tamper-evident top-component of a multi-component sticker 120 to expose a bottom-component 130 of the multi-component sticker, according to some embodiments. Compared the examples of FIG. 3A (or FIG. 1A, FIG. 1B, or FIG. 2), FIG. 3B illustrates a physical card 101 subsequent to removal of a tamper-evident component (e.g., component 121 in FIG. 3A) concealing private access information.

As shown, a residue, like a tamper-evident pattern 321 of an adhesive layer or layer having an applied adhesive may remain adhered to a surface of a card blank 105 when a tamper-evident component (e.g., component 121 in FIG. 3A) previously adhered to the surface of the card blank has been removed. For example, the tamper-evident pattern 321 evident on the surface of the card may correspond to an area on the surface of the card blank 105 to which the tamper-evident component was adhered, the pattern corresponding to a portion of a pattern formed in an adhesive layer or a lower layer of the component and configured to remain adhered to the surface of the card. Examples may include remaining adhesive, which may form a pattern, or remaining adhesive pattern layer, evident upon visual inspection.

As described above, the tamper-evident component (e.g., component 121 in FIG. 3A) may encapsulate (e.g., envelope, cover, hide, enclose, or otherwise conceal) at least some private access information, whether that private access information is disposed on the surface of the card blank 105, on a bottom-component 130 of a multi-component sticker, or both. Here, a bottom-component 130 of a multi-component sticker is shown. In some embodiments, some or all of the information printed on the bottom-component 130 may be disposed on the surface of the card blank 105, such as within an area corresponding to the illustrated bottom-component 130. Some embodiments may include the information in addition to, or instead of, the bottom-component 130 (e.g., such that if the bottom-component 130 is destroyed or unreadable, private access information disposed in the surface of the card blank 105 may be utilized to access digital bearer assets that were transferred to an address associated with the card 101).

As shown, a bottom-component 130 of a multi-component sticker is revealed when a top-component of the multi-component sticker is removed from the card 101. The bottom-component 130, like the top-component, may be a sticker 330. In some embodiments, the bottom-component 130 is formed as a sticker 330 and applied to the surface of the card blank 105 (e.g., within a center of a swatch or within a designated area having a swatch) prior to positioning of a top-component. The top-component (e.g., component 121 in FIG. 3A) having tamper-evident features may also be formed as a sticker (e.g., sticker 120 in FIG. 3A), positioned over the sticker 330, and applied such that it conceals at least some information on sticker 330 and also adheres to at least some portions of the surface of the card blank 105 (e.g., an area surrounding, or at least partially surrounding the sticker 330). In turn, when the tamper-evident top-component is removed, a tamper-evident pattern 321 within areas surrounding the component is revealed when the top-component is removed. Thus, for example, the bottom-component 130 may be a sticker 330 and the top-component may also be a sticker, which are formed separately and applied in sequence to create a multi-component sticker. In some embodiments, the bottom-component 130 may be a sticker 330, and the top-component may also be a sticker, which are formed separately and merged to form a single multi-component sticker prior to application thereof to the surface of the card. In some embodiments, the bottom-component 130 may be formed, and the top-component is formed over the bottom-component to form a single-multi-component sticker prior to application thereof to the surface of the card. Regardless of the specific process, a bottom-component 130 may comprise private access information concealed by the top-component.

In some embodiments, the bottom-component 130 has at least a portion of other information visible while the top-component is positioned to conceal the private access information. In some embodiments, the bottom-component 130 has an upper-layer of material or a coating to which the adhesive of the top-component adheres less strongly to than a surrounding portion of the card (e.g., the surface of the card, which may include a swatch). In some embodiments, the top-component comprises a different adhesive corresponding to a surrounding portion than a center concealed portion. In some embodiments, the bottom-component 130 has an applied a coating, like a UV protective coating, or a sealant, which may be a layer of film or other coating, such that the top-component adheres less strongly to its surface than the surrounding area within which the tamper-evident pattern 321 is promoted and that strength of the adhesion is less than a threshold strength of adhesion sufficient to promote tamper-evidence such that removal of the top-component does not substantially obfuscate the private access information below upon removal. In some embodiments, the bottom-component 130 causes tamper-evidence to appear in a corresponding lifted portion of the top-component but without substantial residue remnants (or affords ease of removal thereof) on the bottom-component. For example, removal of the top-component may cause residue (or a portion of the adhesive layer) to remain on the portion of the card surrounding the bottom-component 130 but not on the bottom-component itself, but which may be adhere within a threshold strength sufficient to cause distortion of a pattern in the lifted top-component.

In some embodiments, the top-component comprises two different adhesives, a center adhesive corresponding to an area of the bottom-component 130 being different than a surrounding adhesive corresponding to the surrounding portion of the card. In some embodiments, the tamper-evident pattern is not promoted (e.g., applied) within the center area of the adhesive layer or layer adjacent to the adhesive but within the surrounding area corresponding to the surrounding portion of the card. In some embodiments, the top-component comprises a first layer of film adjacent to the adhesive corresponding to the center area but not the surrounding area and a subsequent layer overlapping the first layer and having dimensions corresponding to the surround area, the second layer having tamper evident features such that the tamper-evident pattern 321 is promoted in the surrounding area but a first layer corresponding to the area of the bottom-component 130 may be removed (either with the top-component or subsequent thereto) without leaving residue. In some embodiments, that first layer has a scratch-off coating, by which the private access information may be revealed, or in some embodiments, that first layer may be a top-layer of the bottom-component.

In some embodiments, removal of the top-component leaves a gap 350 between the bottom-component 130 and the surrounding tamper-evident portion 321. In some embodiments, the tamper-evident portion 321 corresponds to a swatch etches on the card, which may have a corresponding gap 350 between an outer swatch promoting adhesion of the top-component and an inner swatch promoting adhesion of the bottom-component 130.

As shown, private access information disposed on the bottom-component 130 (or information disposed in corresponding areas of the surface of the card blank) was substantially concealed (e.g., other than a window or cutout corresponding to the unique identifier portion 107C of the bottom-component) by the top-component and is revealed upon removal of the top-component. In some embodiments, the information that was concealed by the top-component comprises private access information. For example, as shown, the concealed portion of the bottom-component 130 may include another optical code portion 333 and an alphanumeric portion 337, which may correspond to a private key by which accounts based on a corresponding public key in the public-private key pair may be accessed. For example, an optical code, like a QR code, disposed within the optical code portion 333 may encode the private key which may be reproduced in alphanumeric text within the alphanumeric text portion 337. Alternatively, and to increase security (such as by forcing a nefarious party to access addition information concealed by a tamper-evident component 145 of a mask 140, and for other purposed discussed in more detail with reference to FIG. 7), the optical code and alphanumeric text, rather than corresponding to the private key directly, may correspond to a cipher text of the private key, the plaintext of which is the private key of the key pair by which the associated accounts may be accessed. To generate the ciphertext, the plaintext of the private key (or other private information) may encrypted with a symmetric encryption protocol utilizing information 247 (e.g., an encryption key, like a passphrase) concealed by at least portion 140B of the mask 140 (and optionally portion 140A in instances where the verification code is a first portion of the encryption key). In some embodiments, the encryption key is operable to decrypt the ciphertext by a corresponding symmetric decryption protocol to reveal the plaintext of the private key of the key-pair. Thus, in some example embodiments, a user must remove the tamper-evident top-component to reveal the ciphertext and remove or scratch off the mask 140 to reveal the encryption key in order to ascertain the plaintext of the private key.

Figure 4:
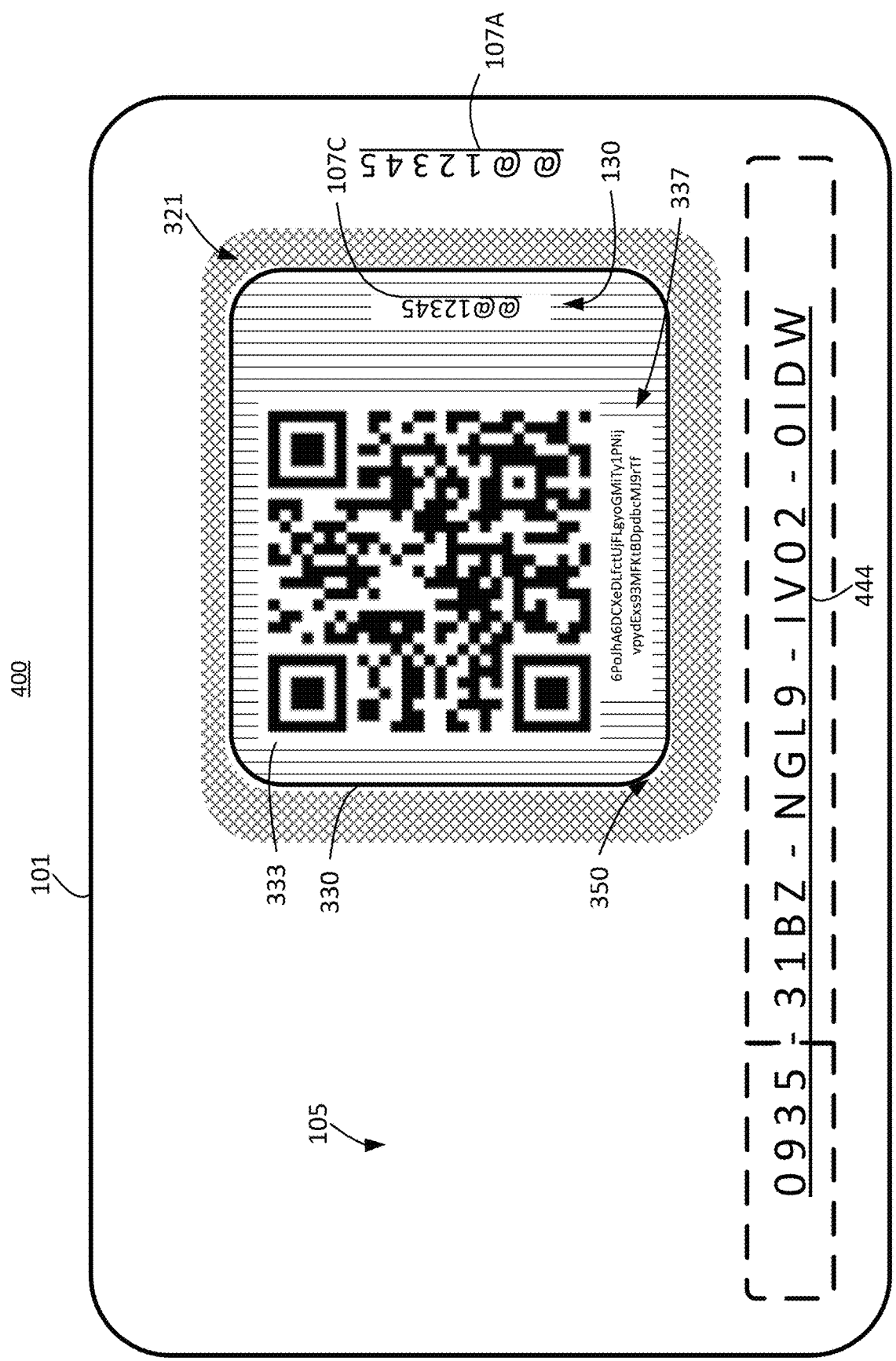
FIG. 4 illustrates an example of a card including an exposed bottom-component of a multi-component sticker and cryptographic passphrase, according to some embodiments.

FIG. 4 illustrates an example 400 of a card including an exposed bottom-component of a multi-component sticker and cryptographic passphrase, according to some embodiments. Compared the examples of FIG. 3B (or FIG. 1A, FIG. 1B, FIG. 2, or FIG. 3A), FIG. 4 illustrates a physical card 101 subsequent to removal of a tamper-evident component (e.g., component 121 in FIG. 3A) concealing private access information in ciphertext and removal (e.g., by peeling away or scratching off a surface) of a mask (e.g., component 145 in FIG. 3B) concealing an encryption key (like a passphrase) by which private access information in plaintext can be obtained from the ciphertext.

As shown, the information that was concealed by the mask may be an encryption key 444 of a symmetric encryption protocol that was utilized to encrypt the private access information (e.g., a private key) of a key pair to produce the ciphertext printed within the alphanumeric ciphertext portion 337 of the bottom-component 130. The optical code, like a QR code, may be an encoding of the ciphertext which is printed within the optical code portion 333 of the bottom-component. Example symmetric encryption protocols include, but are not limited to, AES-128, AES-192, AES-256, and the like. In some embodiments, a protocol corresponding to a decentralized computing platform is utilized. For example, a Bitcoin Improvement Protocol (e.g., BIP38) or other protocol may specify one or more protocols by which a private key may be protected with an encryption key or passphrase. In some embodiments, an encryption function of a protocol takes, as input, a plaintext private key (e.g., in a given format) and an encryption key or passphrase (e.g., in a given format) by which the ciphertext of the private key is generated (or protected by under the protocol) and corresponds (e.g., uniquely) to the ciphertext in the given protocol. In some embodiments, a portion of the encryption key or passphrase may be a checksum, like a verification code, by which a user may verify the ciphertext. A decryption function of the protocol may take, as input, a ciphertext private key (e.g., in a given format) and the corresponding encryption key or passphrase, which may be input by a scanning of the optical code and keying in or optical character recognition or separate optical code of the encryption key or passphrase. In turn, the decryption function of the protocol outputs the plaintext private key backing the accounts corresponding to the card.

Figure 5C:
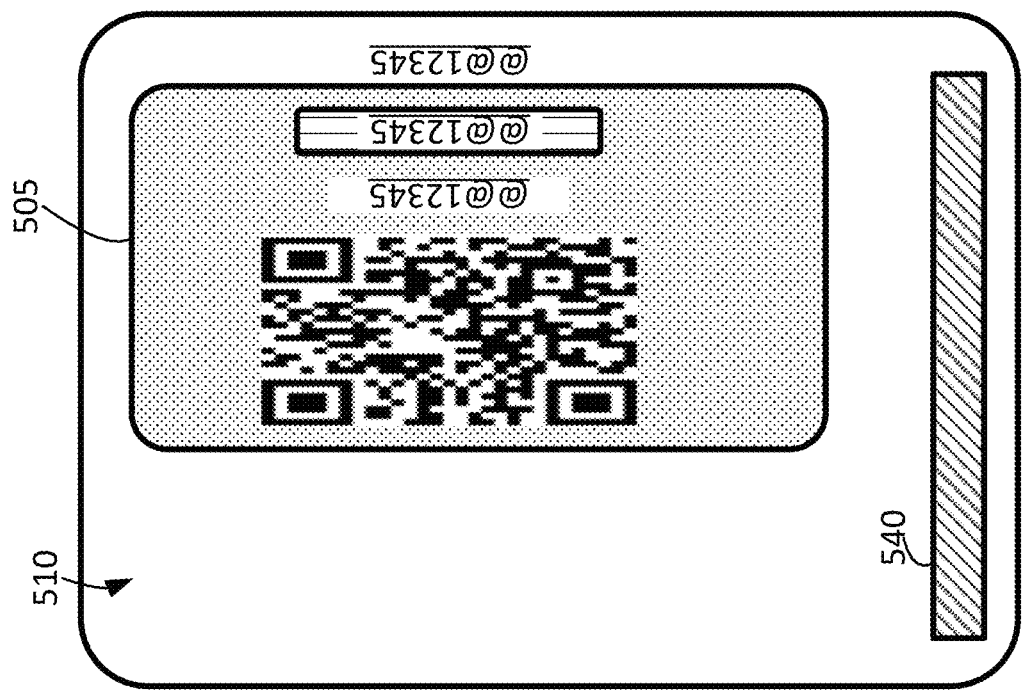
FIG. 5A, FIG. 5B, and FIG. 5C illustrate an example multi-layer sticker construction and application for a physical card, according to at least some embodiments.
Figure 5B:
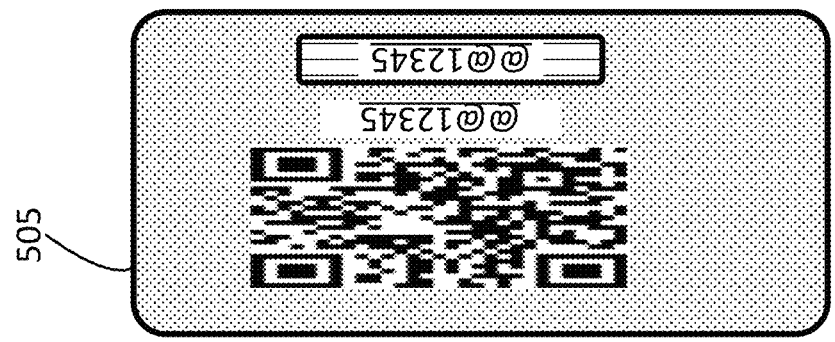
Figure 5A:
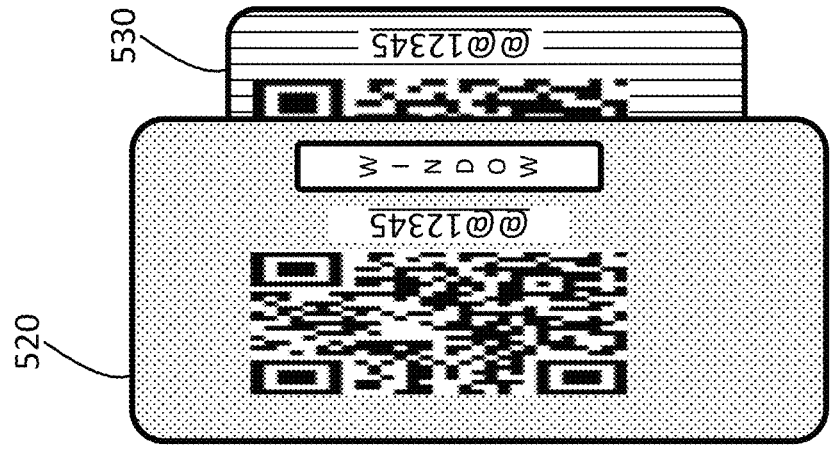

FIGS. 5A, 5B, and 5C illustrate an example sequence of forming a multi-component sticker and card, according to various embodiments described herein.

FIG. 5A illustrates an alignment of a top-component 520 and a bottom-component 530 of a multi-component sticker, according to at least some embodiments. The bottom-component 530 includes a first information portion that is encapsulated (e.g., enveloped, covered, hidden, enclosed, or otherwise concealed) by the top-component 520. The bottom-component 530 includes a second information portion visible through a window of the top-component 520. Thus, for example, the bottom-component 530 and top-component 520 may be aligned to produce a multi-component sticker. In some embodiments, the bottom-component 530, as a result of the alignment, includes a portion concealed by the top-component 520 (e.g., the portion including private access information) and another portion that is visible when the top-component 502 is aligned (e.g., the portion including a unique identifier or other non-concealed information disposed on the bottom-component). For example, the top-component 520 may be placed (or formed) in position over (e.g., above) the bottom-component 530 on a roll of stickers, or they may be applied separately in sequence to a card (e.g., the bottom-component 530 followed by the top-component 520).

FIG. 5B illustrates a multi-component sticker 505, according to at least some embodiments. As shown, the window portion of the top-component of the multi-layer sticker 505 exposes the second information portion of the bottom-component. The second information may be a unique identifier printed on both the top-component and the bottom-component of the multi-layer sticker for inspection. For example, a user may inspect the unique identifiers to verify a match between the top-component and the bottom-component.

FIG. 5C illustrates a multi-component sticker 505 applied to a card 510, according to at least some embodiments. In some embodiments, a portion of the card 510 to which the sticker 505 is applied comprises a swatch to promote adhesion. In some embodiments, the card 510 includes a unique identifier disposed thereupon having correspondence to the unique identifier of the sticker 505. For example, the unique identifier may be visible on a bottom-component of the sticker via a window of the top-component, and the top-component may also include the unique identifier. Accordingly, a matching of the components of the sticker 505 and the card 510 to ensure that the information printed on the different components of the sticker 505 and information disposed on the card 510 (e.g., under a mask 540) are collectively operative.

Figure 6A:
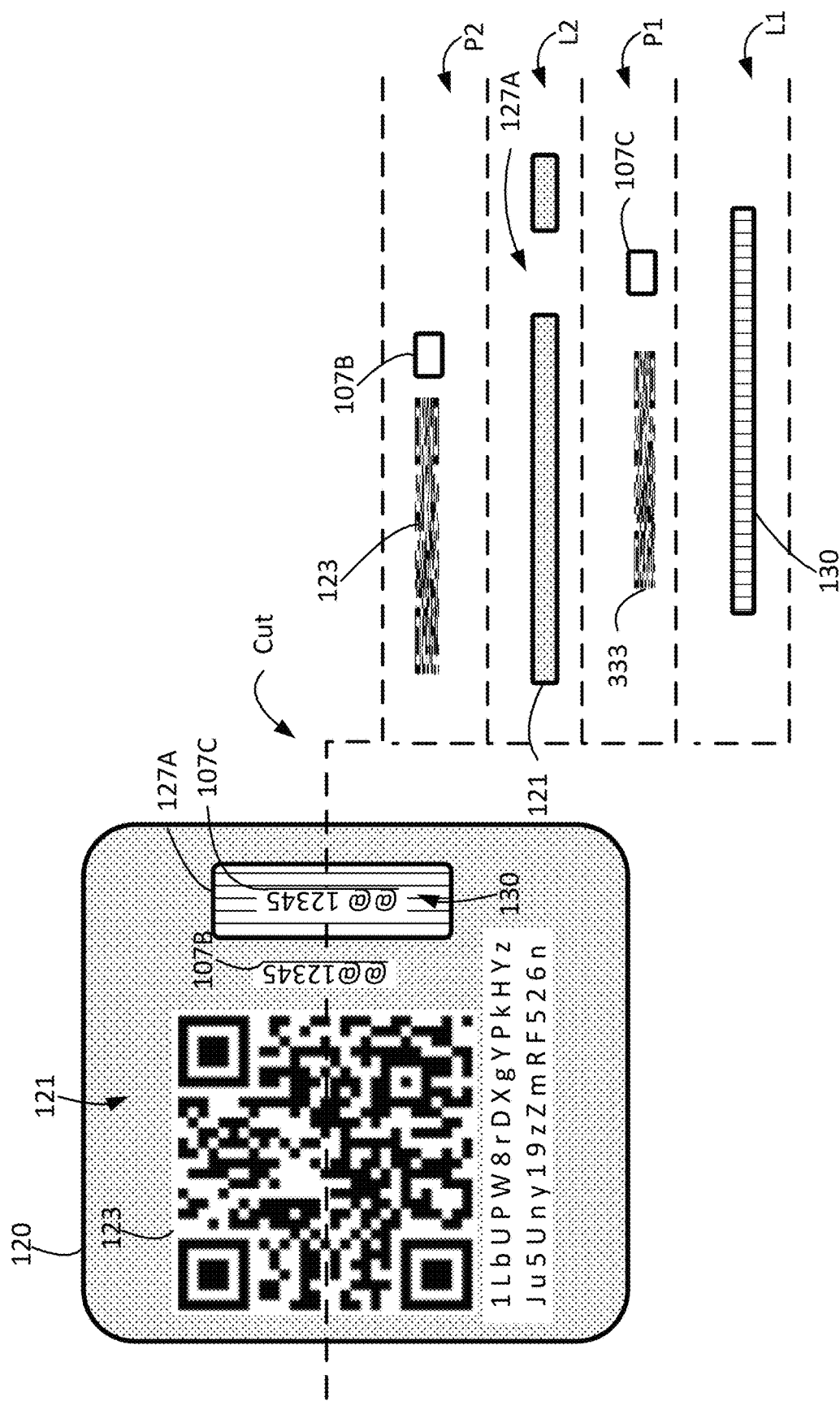
FIG. 6A and FIG. 6B illustrate examples of a multi-component sticker, according to some embodiments.
Figure 6B:
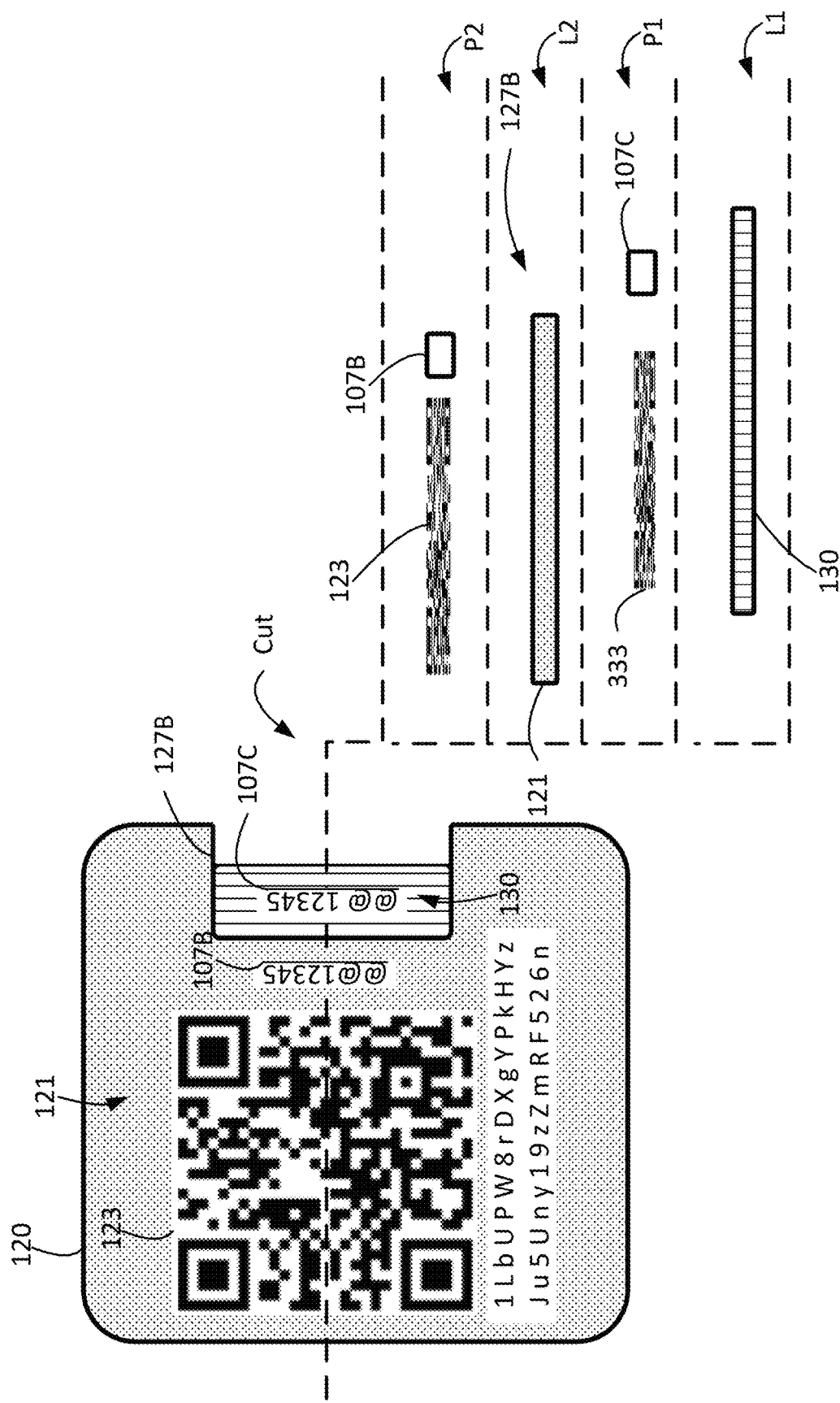

FIG. 6A and FIG. 6B illustrate examples of a multi-component sticker 120, according to some embodiments. In each of FIG. 6A and FIG. 6B, a cut is shown through the multi-component sticker 120 to illustrate the example configurations of the different components.

FIG. 6A illustrates example multi-component sticker 120 having a top-component 121 and a bottom-component 130. As shown, along the cut, the top-component 121 includes an optical code portion 123, a unique identifier portion 107B, and a window 127A. Within the window 127A, a portion of the bottom-component 130 is visible. The visible portion may correspond to a unique identifier portion 107C of the bottom-component 130 such that the multi-component sticker 120 may be visually inspected to ascertain whether the different components 121, 130 having different information printed thereon in optical code portions correspond to each other.

As shown, a bottom-component 130 may correspond to a first layer, L1, of the multi-component sticker 120. Upon the bottom-component 130, information may be printed thereon, such as first printed information, P1. The first printed information may include, along the cut, an optical code portion 333 and a unique identifier portion 107C. Private access information, like a private key of a public-private key-pair, or ciphertext hereof may be encoded as an optical code that is printed within the optical code portion 333 of the bottom-component. Similarly, a unique identifier may be printed within the unique identifier portion 107C, and the unique identifier portion 107C may correspond to an area of the bottom-component that is aligned with a window 127A of a top-component 121.

As shown, a top-component 121 may correspond to a second layer, L2, of the multi-component sticker 120. Upon the top-component 121, information may be printed thereon, such as second printed information, P2. The second printed information may include, along the cut, an optical code portion 123 and a unique identifier portion 107B. Public access information, like a public key (that corresponds to the above noted private key) or an address based on the public key and in a format of a decentralized computing platform or a unique address identifier for identification of an address or public key within a database, may be encoded as an optical code that is printed within the optical code portion 123 of the top-component. Similarly, a unique identifier may be printed within the unique identifier portion 107B. Within the top-component 121, a window 127A may be formed, such as by a removal of that area from the top-component (e.g., punching or cutting out the portion). As shown, the window 127A is aligned with an area (e.g., a unique identifier portion 107C) of the bottom-component 130 within which a unique identifier is printed, such that the unique identifier is visible through the window 127A in the multi-component sticker 120. Notably, at least some other information, like the private access information printed on the bottom-component 130, is encapsulated (e.g., enveloped, covered, hidden, enclosed, or otherwise concealed) by the top-component 121. Accordingly, as shown, the top-component 121 may have edges that extend beyond the edges of the bottom-component 130 in at least three directions (four are shown in the illustrated embodiments) but at least some information, like a unique identifier, that is printed on the bottom-component 130 remains visible when the top-component 121 is so configured and positioned to form the multi-component sticker 120 with the bottom-component 130. In other words, the top-component 121 may extend beyond at least a portion of the perimeter of the bottom component, such as along 60-90% of the perimeter of the bottom-component 130, to conceal at least some information disposed on the bottom-component and ensure that a user must lift away the top-component 121 to ascertain some or all of the concealed information disposed on the bottom-component 130. Thus, for example, while rectangular components are shown, other shapes may be utilized and the components may have different shapes (e.g., a first may be a circle and the other a rectangle).

FIG. 6B illustrates example multi-component sticker 120 having a top-component 121 and a bottom-component 130. As shown, along the cut, the top-component 121 includes an optical code portion 123, a unique identifier portion 107B, and a window 127B. Within the window 127B, a portion of the bottom-component 130 is visible. The visible portion may correspond to a unique identifier portion 107C of the bottom-component 130 such that the multi-component sticker 120 may be visually inspected to ascertain whether the different components 121, 130 having different information printed thereon in optical code portions correspond to each other.

As shown, a bottom-component 130 may correspond to a first layer, L1, of the multi-component sticker 120. Upon the bottom-component 130, information may be printed thereon, such as first printed information, P1. The first printed information may include, along the cut, an optical code portion 333 and a unique identifier portion 107C. Private access information, like a private key of a public-private key-pair, or ciphertext hereof may be encoded as an optical code that is printed within the optical code portion 333 of the bottom-component. Similarly, a unique identifier may be printed within the unique identifier portion 107C, and the unique identifier portion 107C may correspond to an area of the bottom-component that is aligned with a window 127B of a top-component 121.

As shown, a top-component 121 may correspond to a first layer, L1, of the multi-component sticker 120. Upon the top-component 121, information may be printed thereon, such as second printed information, P2. The second printed information may include, along the cut, an optical code portion 123 and a unique identifier portion 107B. Public access information, like a public key (that corresponds to the above noted private key) or an address based on the public key and in a format of a decentralized computing platform or a unique address identifier for identification of an address or public key within a database, may be encoded as an optical code that is printed within the optical code portion 123 of the top-component. Similarly, a unique identifier may be printed within the unique identifier portion 107B. Within the top-component 121, a window 127B may be formed, such as by a removal of that area from the top-component (e.g., punching or cutting out the portion). As shown, the window 127B is aligned with an area (e.g., a unique identifier portion 107C) of the bottom-component 130 within which a unique identifier is printed, such that the unique identifier is visible through the window 127B in the multi-component sticker 120. Notably, at least some other information, like the private access information printed on the bottom-component 130, is concealed by the top-component 121. Accordingly, as shown, the top-component 121 may have edges that extend beyond the edges of the bottom-component 130 in at least three directions (four are shown, but with a partial edge of the bottom-component 130 exposed within the window 127B), but at least some information, like a unique identifier, that is printed on the bottom-component 130 remains visible when the top-component 121 is so configured and positioned to form the multi-component sticker 120 with the bottom-component 130. In other words, the top-component 121 may extend beyond at least a portion of the perimeter of the bottom component, such as along 60-90% of the perimeter of the bottom-component 130, to conceal at least some information disposed on the bottom-component and ensure that a user must lift away the top-component 121 to ascertain some or all of the concealed information disposed on the bottom-component 130. Thus, for example, while rectangular components are shown, other shapes may be utilized and the components may have different shapes (e.g., a first may be a circle and the other a rectangle).

Further, as can be seen, the top-component 121 is disposed (or positioned) above the bottom-component 130 (e.g., normal to a surface of application below layer L1), such as to overlap and concealed some information 333 disposed on the bottom-component 130 while some other information 107C remains visible. In other words, the top-component 121 may encapsulate (e.g., envelope, cover, hide, enclose, or otherwise conceal) information 333 printed on the bottom-component 130. Notably, as the top-component 121 extends beyond the perimeter of the bottom-component 130 along at least some portions, above need not mean physically-above, as those portions of the top-component 121 extending beyond the perimeter of the bottom-component 130 need not be physically above one or more layers of the bottom-component 121 (e.g., in areas other than those in which the top-component 121 and bottom-component 130 overlap). Thus, as referred to herein, above can refer to a sequence of application or position for some portion of a layer but need not apply to all portions of the layer, e.g., layer L2 is physically above layer L1 where layer L2 overlaps with layer L1, and layer L2 is disposed above layer L1, but the extant portions of layer L2 that extend beyond the perimeter of layer L1 need not be physically above layer L1. For example, the extant portions of layer L2 that extend beyond the perimeter of layer L1 may adhere to a surface having a same height as that corresponding to layer L1 (although not required as, for example, a surface area corresponding to layer L1 may be countersunk in relation to a surface area corresponding to the extant portions of layer L2 or the surface area corresponding to the extant portions of layer L2 may be raised).

FIG. 6C, FIG. 6D, FIG. 6E, and FIG. 6F illustrate examples of components of a multi-component sticker, according to some embodiments. As described previously, a component may include multiple layers (e.g., a multi-layer component), these figures illustrate various examples of forming a component with multi-layers.

Figure 6C:
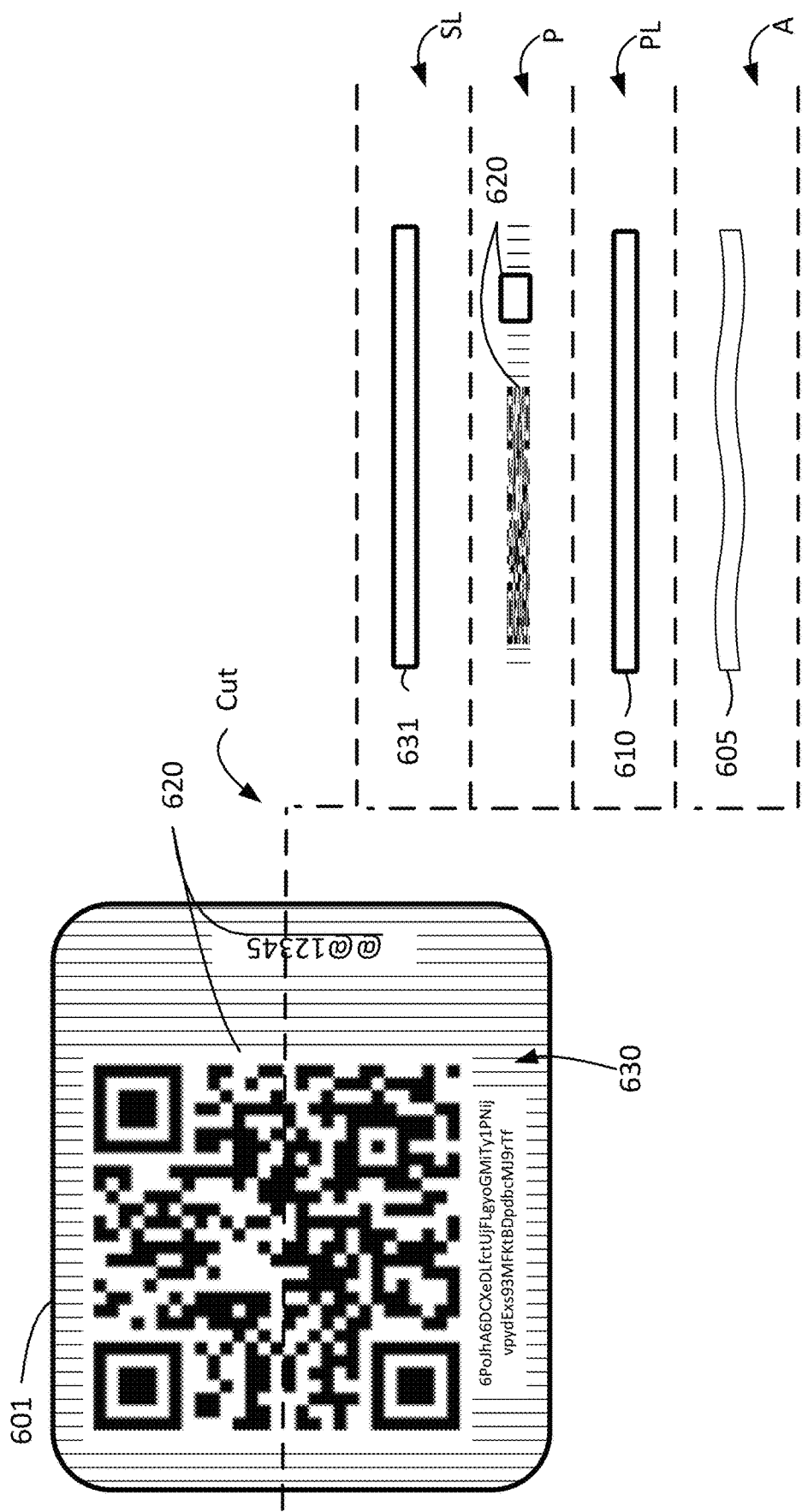
FIG. 6C, FIG. 6D, FIG. 6E, and FIG. 6F illustrate examples of components of a multi-component sticker, according to some embodiments.

FIG. 6C illustrates an example multi-layer component, such as a bottom-component 630 having multiple layers. In some embodiments, the bottom-component 630 is formed as a sticker 601 that is later matched with another component sticker, like a top-component, to form a multi-component sticker. A cut through the component 630, which passes through the various layers is shown.

The example component 630 may include an adhesive layer, A, which includes an adhesive 605. The adhesive 605 may be formed as a layer or otherwise applied to an adjacent layer, PL, in the illustrated example.

The example component 630 may include a print layer, PL, like a layer 610 of PET or PP, on which information 620 is printed. In some embodiments, a layer 610 of PET or BOPET film is utilized for the print layer. The printing, P, of the print layer PL may utilize any applicable printing process. In some embodiments, a charged ink transfer process is utilized, and may transfer the information 620 along with any pattern or design to the print layer, PL. For example, electrically chargeable ink particles corresponding to the information 620 may formed on the print layer. In some embodiments, the transfer printing process comprises heating and melting the ink particles into the print layer, such as by direct transfer of a mirror of the information.

The example component 630 may include a surface layer, SL, like a layer 631 of PET or PP, to protect the printed information 620 (e.g., from elements or abrasion). In some embodiments, a layer 631 of transparent PET, BOPET, or BOPP film is utilized for the surface layer (e.g., such that the printed information 620 remains visible on a surface of the component 630).

Figure 6D:
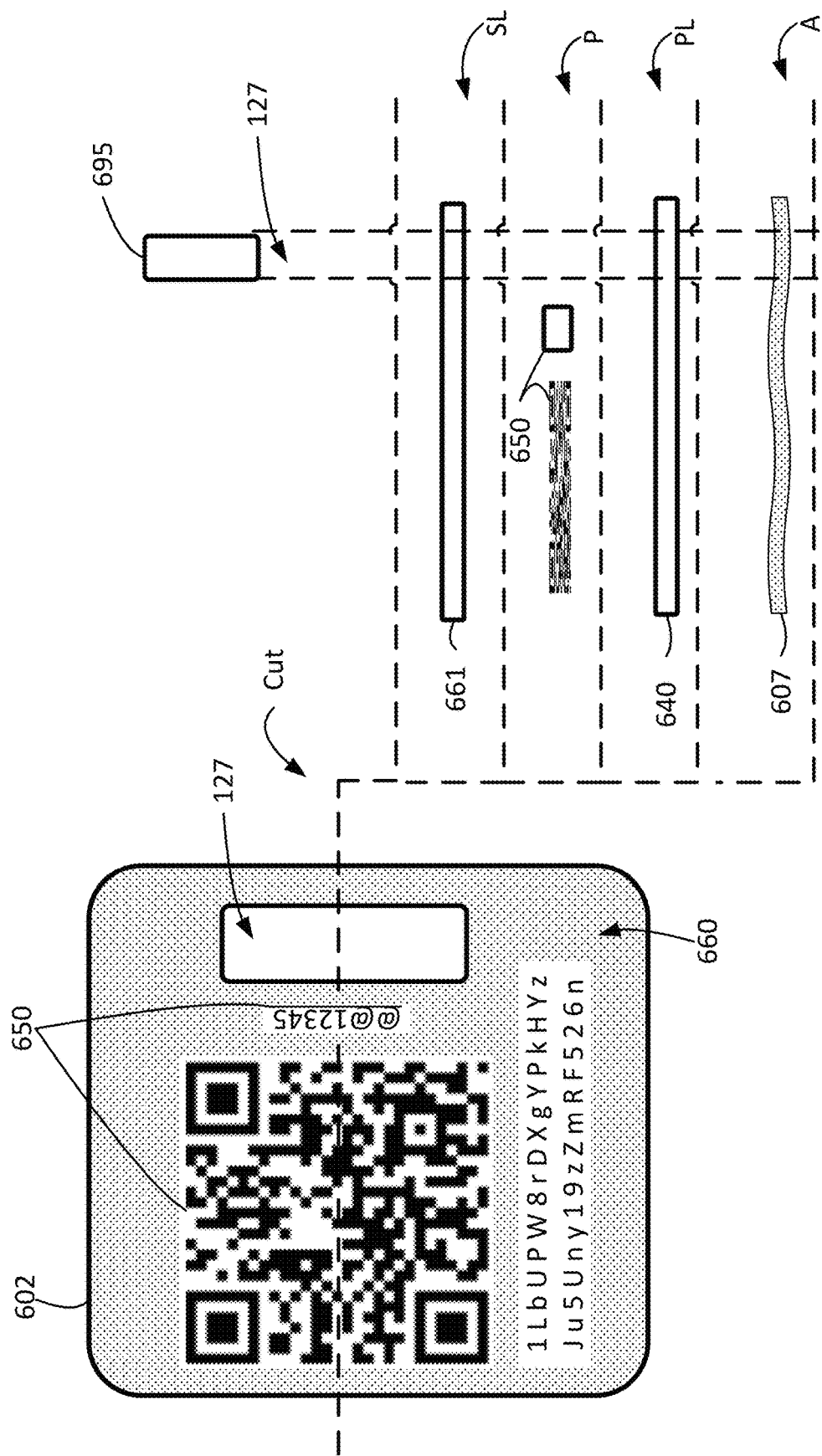
Figure 6E:
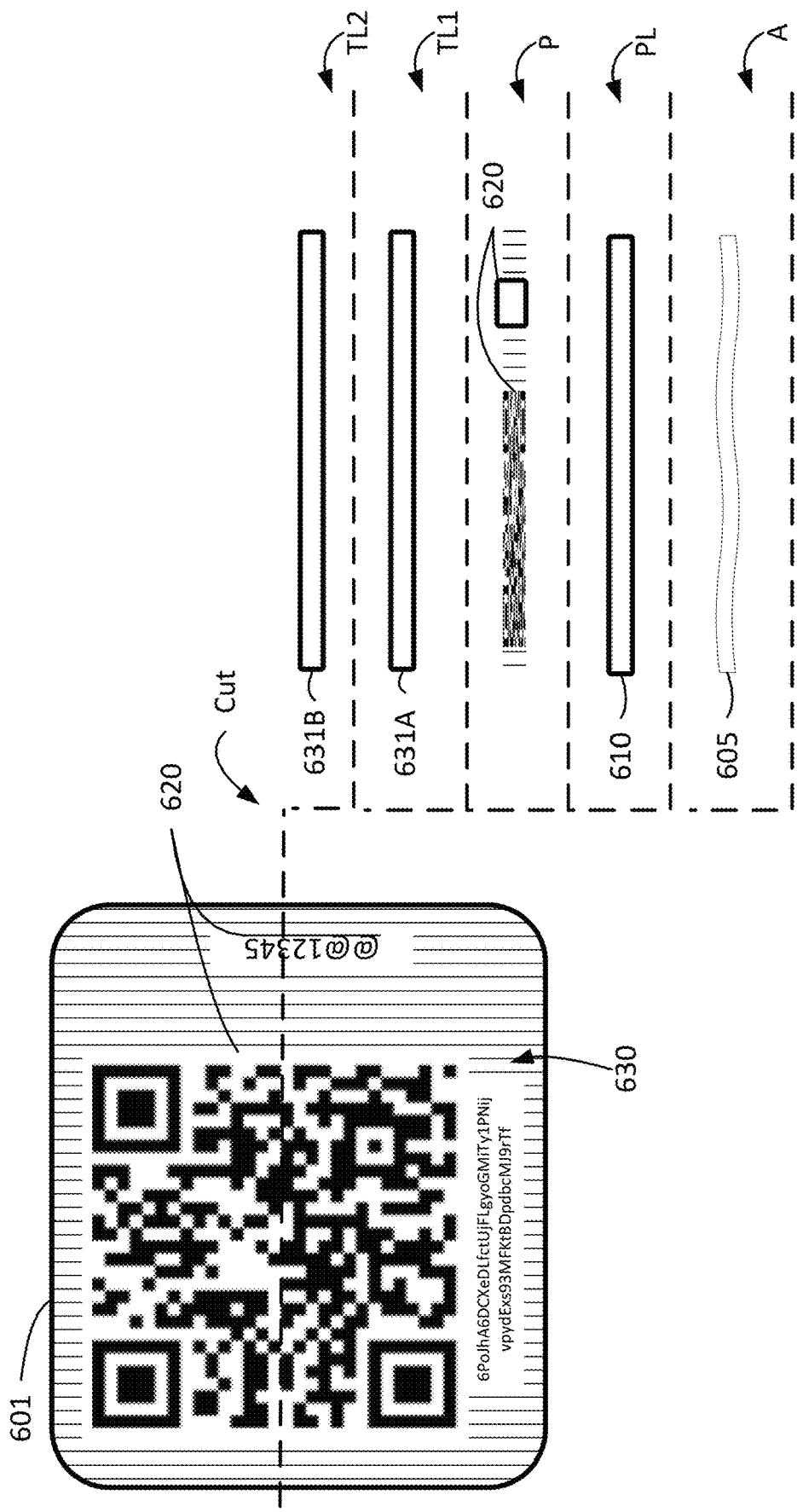

FIG. 6E illustrates an example multi-layer component, such as a bottom-component 630 having multiple layers. In some embodiments, the bottom-component 630 is formed as a sticker 601 that is later matched with another component sticker, like a top-component, to form a multi-component sticker. A cut through the component 630, which passes through the various layers is shown.

Compared to FIG. 6C, FIG. 6E illustrates multiple top layers, TL1, TL2 disposed above the print layer, PL rather than a single surface layer above the print layer. In some embodiments, a lower top layer 631A protects the printed information 620 (e.g., from one or more elements or abrasion). In some embodiments, a first layer 631A of transparent PET, BOPET, or BOPP film is utilized for the lower top layer 631A (e.g., such that the printed information 620 remains visible on a surface of the component 630). In some embodiments, an upper top layer 631B protects and conceals the printed information 620 (e.g., from view) or protects against one or more elements or abrasion, and those protective qualities may differ from the lower top layer 631A. In some embodiments, a second layer 631B of transparent PET, BOPET, or BOPP film is utilized for the lower top layer 631B (e.g., such that the printed information 620 remains visible on a surface of the component 630). In some embodiments, a second layer 613B comprises a scratch of material or metallized film (which in some cases may be foil-like or reflective) which may be removed to view the information 620 on the print layer but while in place prevents a scan from reading private access information printed on the bottom-component 601.

FIG. 6D illustrates an example multi-layer component, such as a top-component 660 having multiple layers. In some embodiments, the top-component 660 is formed as a sticker 602 that is later matched with another component sticker, like a bottom-component, to form a multi-component sticker. In some embodiments, the top-component 660 is formed over a bottom-component, such as by forming the illustrated layers over one or more existing layers. A cut through the component 660, which passes through the various layers is shown.

The example component 660 may include an adhesive layer, A, which includes an adhesive 607. The adhesive 607 may be tamper-evident and formed as a layer or otherwise applied to an adjacent layer, PL, in the illustrated example. In some embodiments, the adhesive 607 is colored and mitigates the passage of light therethrough (e.g., such that a material or information under the adhesive 607 is not visible). In some embodiments, the adhesive 607 may be reflective, such as to mitigate a scan of a material or information not visible under the adhesive 607. In some embodiments, a pattern is formed in the adhesive 607, like between the print layer, PL, and the adhesive, or underneath the adhesive. The pattern is formed such that when the print layer material, such as layer 640, is lifted away from a surface to which the adhesive 607 adheres the layer 640 to, a first portion of the adhesive 607 (e.g., corresponding to a first portion of the pattern) remains adhered to the layer 640 and a second portion of the adhesive 607 (e.g., corresponding to a second, opposing portion of the pattern) remains adhered to the surface to which the layer 640 was adhered. Accordingly, tampering with the component 660 such as by lifting the component (e.g., at least layer 640) away from the surface to which it was adhered to by the adhesive 607 provides indication of tampering.

The example component 660 may include a print layer, PL, like a layer 640 of PET or PP, on which information 650 is printed. In some embodiments, a layer 640 of PET or BOPET film is utilized for the print layer. The printing, P, of the print layer PL may utilize any applicable printing process. In some embodiments, a charged ink transfer process is utilized, and may transfer the information 650 along with any pattern or design to the print layer, PL. For example, electrically chargeable ink particles corresponding to the information 650 may formed on the print layer. In some embodiments, the transfer printing process comprises heating and melting the ink particles into the print layer, such as by direct transfer of a mirror of the information.

The example component 660 may include a surface layer, SL, like a layer 661 of PET or PP, to protect the printed information 650 (e.g., from elements or abrasion). In some embodiments, a layer 661 of transparent PET, BOPET, or BOPP film is utilized for the surface layer (e.g., such that the printed information 650 remains visible on a surface of the component 660). In some embodiments, one or more emblems may be embedded in the layer 661, like a foil emblem, which may be holographic or a foil design indicating authenticity of the component 660. In some embodiments, a scent is applied (e.g., like a coating) or otherwise impregnated into the layer 661, and which may be released when the surface is scratched.

In some embodiments, a window 127 is formed in the component 660. For example, a tool 695 may pass through the layers of the component 660 and remove that portion of the component to form a window. In some embodiments, the tool 695 may cut to a specific depth corresponding to the adhesive such that the adhesive and layers of the component 660 are removed without penetrating through an underlaying material. In some alternate embodiments, a tamper-evident adhesive 607 may not be disposed in an area corresponding to the window 127, for example, a transparent (or no adhesive) may be disposed within the area corresponding to the window 127. Further, within that area, the other layers may have a transparent portion such that an underlaying material or information on that material may be visible through the window 127.

Figure 6F:
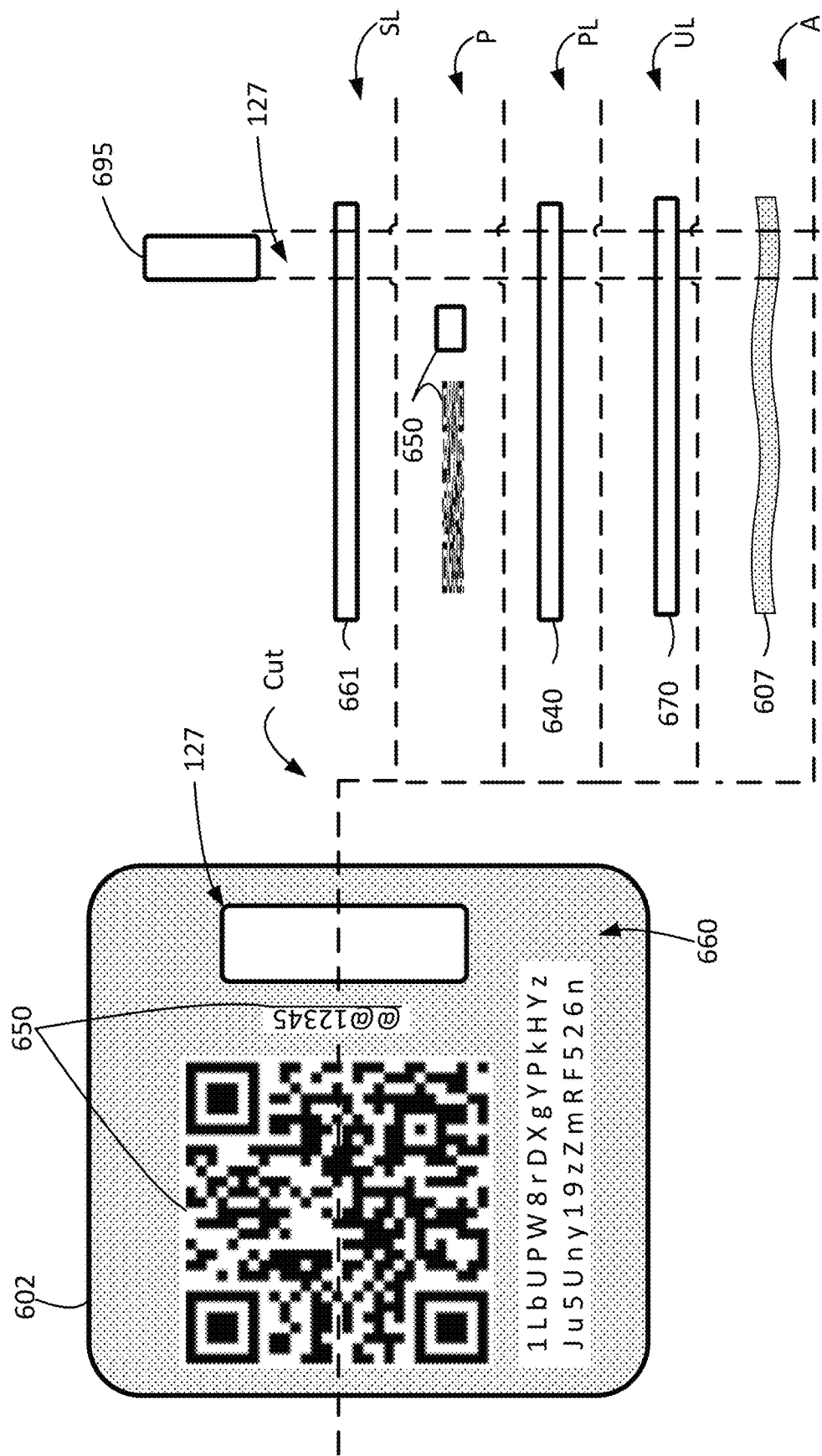

FIG. 6F illustrates an example multi-layer component, such as a top-component 660 having multiple layers. In some embodiments, the top-component 660 is formed as a sticker 602 that is later matched with another component sticker, like a bottom-component, to form a multi-component sticker. In some embodiments, the top-component 660 is formed over a bottom-component, such as by forming the illustrated layers over one or more existing layers. A cut through the component 660, which passes through the various layers is shown.

Compared to FIG. 6D, FIG. 6F illustrates an additional underlaying layer, UL, between the print layer, PL, and the adhesive layer, A. In some embodiments, the underlaying layer 670 includes one or more tamper-evident features or anti-tamper features to prevent a nefarious party from ascertaining information below the layer 670. In some embodiments, the layer 670 is a metalized PET, BOPET, or BOPP film or foil or pattern of foil or film by which underlaying information may be obfuscated. In some embodiments, layer 670 and the adhesive layer 607 both act to obfuscate information under the component 660 and may optionally include different tamper-evident features (e.g., visible in the component 660 or surface to which it adheres when the component 660 is tampered with) or anti-tamper features (e.g., preventing a scan or visual reading through the component 660) to conceal information underlaying the component 660, such as information printed a bottom-component or other surface to which the component 660 is adhered (e.g., information or surface area that is not visible through the window 127).

Figure 7A:
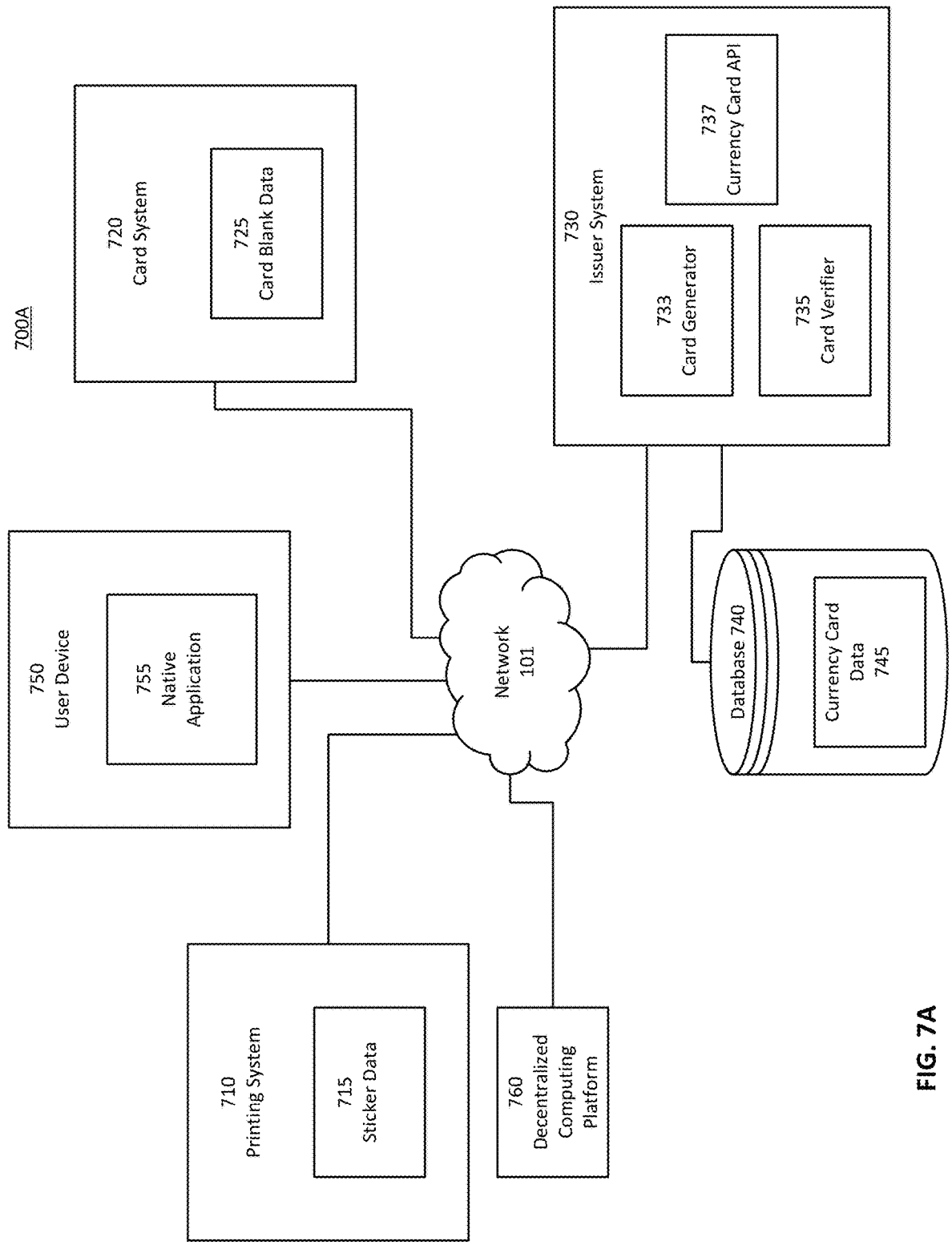
FIG. 7A and FIG. 7B illustrate example computing environments within which disclosed techniques may be implemented, according to some embodiments.

FIG. 7A illustrates an example computing environment 700A within which a card may be implemented, according to some embodiments. In some embodiments, the card is robust to supply chain attacks. In some embodiments, the example computing environment 700A is configured to implement a manufacturing process that enhances the security of digital bearer assets associated with a card held by a user by ensuring personnel involved in producing the card cannot access those digital bearer assets.

Some embodiments of a manufacturing process, which may be implemented within the example computing environment 700A, includes at least two production teams. Some embodiments include at least a first production team that corresponds to an issuer system 730 for issuing and managing physical cards.

In some embodiments, a first portion of an issuer system 730 is coupled to a network 101, such as the internet. The first portion of the issuer system 730 may include a card API 737, such as an API configured to interface with a native application 755 executing on the devices of users of physical cards, like the example user device 750. In some embodiments, the card API 737 services requests received from native applications via user devices and returns responses, which may include results of processing the requests, to the respective user device such that the results may be displayed within the native application 755 of the user device 750 on which a user initiated the request. For example, the issuer system 730 may include, in a database 740, card data 745 operable to service requests received by the card API 737.

In some embodiments, the database 740 includes card data 745 operable to verify issued cards. Received requests to verify a card may be passed to a card verifier 735 which processes the request based on the card data 745 within the database 740 and returns a verification result to the API 737 which is transmitted to the requesting device. Thus, in some embodiments, the card verifier 735 may verify authenticity of a card based on the information provided in the received API request based on local data 745 of the database 740. In some embodiments, the card verifier 735 may store a count of requests to verify the given card within the database 740 and return the count as the verification result (e.g., as indication whether another entity had access to the card). For example, some embodiments uniquely associate, server-side, in the database 740, the unique identifier (or hash thereof) or an address (or hash thereof), and a portion of a symmetric encryption key (or hash thereof) (e.g., the first four digits). In some embodiments, a request to verify a card via the API 737 includes a portion of the encryption key, a unique identifier, or both, as a request to the API from a user device 750. In some embodiments, card verifier 735 performs a first verification based on local card data 745, such as a confirmation that the card is authentic by the correspondence of the received information with stored card data indicative of that card being issued. The card verifier 735 may generate a response to an API request which reports a verification value (or values). For example, a response to the API request may include a value indicative of whether the values match the set on the card (e.g., returning a binary determination where both are submitted, returning the unique identifier if the portion of the key is submitted, or returning the portion of the encryption key if the unique identifier is submitted).

In some embodiments, the card verifier 735 performs a second verification based on a decentralized computing platform data, such as a confirmation that one or more addresses associated with the card have not been previously utilized in an unauthorized transaction (e.g., in some examples, a digital bearer asset may be transferred to a card prior to issue) on corresponding decentralized computing platforms. For example, some embodiments of the card verifier 735 perform one or more verification operations on a platform 760 corresponding to an address (or addresses in a set of addresses) of the card corresponding to the received API request. In some embodiments, the card verifier 735 writes a transaction to the platform indicative that a request to verify a given card was received, and may determine within the platform an associated count of requests processed for the given card, which may be returned with results to an API request for verification. Likewise, the card verifier 735 may determine a balance or amount of assets held (e.g., an amount of coins, an amount of tokens, like ERC-20 tokens, or other digital assets transacted to an address) by one or more address of a card, such as by inspection of a blockchain of a given platform 760, which may be returned in response to a balance request.

In some cases, the card verifier 735 may write the result of a verification to a decentralized computing platform or to a local database 740 for the card and initialize a count. The count for verification of a card may be incremented upon each verification request for the card received via the card API 737. In some embodiments, for a new card, the count indicates that the user is the first to verify the card and, as a result, cannot present the card as new even if a tamper-evident adhesive substrate over the concealed information 247 is replaced after such a verification.

In some embodiments, a second portion of an issuer system 730 includes a card generator 733. In some embodiments, the card generator 733 is a cold computing server or system without access to a network 101, such as the internet (e.g., to increase security, though a configuration having network access is not disclaimed). In some embodiments, the card generator 733 is a secure computing component or system configured to generate card information, such as key-pairs, like a private-public key pair. In some embodiments, the secure component 733 also generates an encryption key for each key pair and encrypts the private key with the corresponding encryption key (e.g., to generate a ciphertext of the private key). In some embodiments, the secure component 733 generates an address, like a cryptographic hash address for a decentralized computing platform, and in some cases may generate a set of address where at least some of the different addresses correspond to different decentralized computing platforms or digital bearer assets on a decentralized computing platform. In some embodiments the card generator 733 assigns a unique identifier to a set of informational components corresponding to a given card. For example, a unique identifier, like a serial number, may be associated with an address or set of addresses (or public key upon which the addresses are based), ciphertext of a private key, and an encryption key.

In some embodiments, the card generator 733 outputs different combinations of informational components for a card in different files (e.g., segments generated information into different files), and those different files may be provided to different systems in a manufacturing process. In some embodiments, the informational components are segmented into at least two parts and those parts are individually inoperable to obtain plaintext of a private key backing a card. For example, a first information component (e.g., a first file) may correspond to a printing system 710 and include sticker data 715 for printing stickers (or components of a multi-component sticker). In some embodiments, the first file includes a unique identifier, address (e.g., public access information for a first component), and ciphertext (e.g., ciphertext of private access information for a second component) for each sticker (or components of a multi-component sticker). A second information component (e.g., a second file) may correspond to a card system 720 and include card blank data 725 for engraving (or otherwise disposing information) card blanks. In some embodiments, the second file includes a unique identifier and an encryption key (e.g., the encryption key utilized to generate ciphertext of private access information corresponding to the unique identifier) for each card blank to be engraved. In an alternative embodiment, the second file may include a unique identifier and ciphertext of private access information (with the card issuer retaining the encryption key for a final engraving step completed by the issuer, such as in a third file comprising a unique identifier or address and a corresponding encryption key). In another alternative embodiment, the card issuer may retain the card blank data 725 and perform each engraving step (although, in some configurations, it may be beneficial to have a separate party with a card system 720 perform at least some of the engraving such that no single group, party, or personnel has access to information operable to obtain private access information, like a private key, in plaintext without physically activating a tamper-evident feature of a card).

In some embodiments, the card generator 733 generates one or more addresses for a public-private key-pair based on the public key of the key pair. In some embodiments, a set of addresses is generated, each address in the set generated according to a protocol of a given decentralized computing platform 760, such as for a corresponding set of different decentralized computing platforms. In some embodiments, the set of addresses and a unique identifier or hash of information corresponding to the card (e.g., unique identifier concatenated with a portion of an encryption key) are stored within a database 740 for supporting utilization of cards via a user device 750. A primary address for a given platform, such as platform 760, on which the primary address is operable may be selected for printing as public access information on a sticker for a card and included in sticker data 715 provided to a printing system 710. The other addresses in the set of addressed may be stored in association with the primary address or other identifier or combination thereof. For example, the card generator 733 may store in the database 740, or within a file utilized to populate the database, associations based on the generated data. Further, with a set of addresses generated, the card generator 733 may discard the public key utilized to generate the addresses, and further, may also discard any plaintext private keys during the segmenting of data. An address need only be considered primary in the sense that it is an address selected for inclusion with an issued card. In addition, in some embodiments, a primary address may be selected by generating that address for a given platform and other addresses for other platforms (e.g., those not selected) may be generated later and optionally separately. That is to say, the full set of addresses need to be generated to select a primary address as each address may be deterministically generated based on a public key in a different sequence or by different systems (e.g., prior to discarding information operable to obtain a public key that corresponds to the private key).

In some embodiments, the associations stored within the database 740 or elsewhere are in-themselves inoperable to obtain a private key in plaintext. Thus, for example, once the printing system 710, card system 720, or issuer system 730 complete an associated operation and discard an encryption key (e.g., after engraving of a card and concealing of the encryption key with a tamper-evident component) or ciphertext of a private key (e.g., after creation or application of a sticker or otherwise concealing of the ciphertext by a tamper-evident component), attempts to ascertain the private key in plaintext will be evident and only the card itself will include disposed thereon the set of information operable to obtain the private key in plaintext. Thus, for example, the database 740 may store in card data 745, a record for each card that contains the unique identifier or verification code (e.g., a portion of the encryption key), or a cryptographic hash thereof or other representation, and the set of addresses without storing either the public or the private key. In other words, public keys and private keys may be discarded for security (although some embodiments may retain a public key, but the public key may be optionally encrypted based on information or a combination of information that is discarded by the systems but resident on the card such that public key may be obtained by the user without accessing the private key). As such, a card API 737 may respond to API requests for verification of a card and balance of addresses associated with the card in addition to the primary address. The API 737 may pass verification request to the card verifier 735 component to receive a result and provide the result to the user device. For example, the card API 737 may response to requests received from a native application 755 executing on the user device 750 of a user having obtained a card.

Figure 7B:
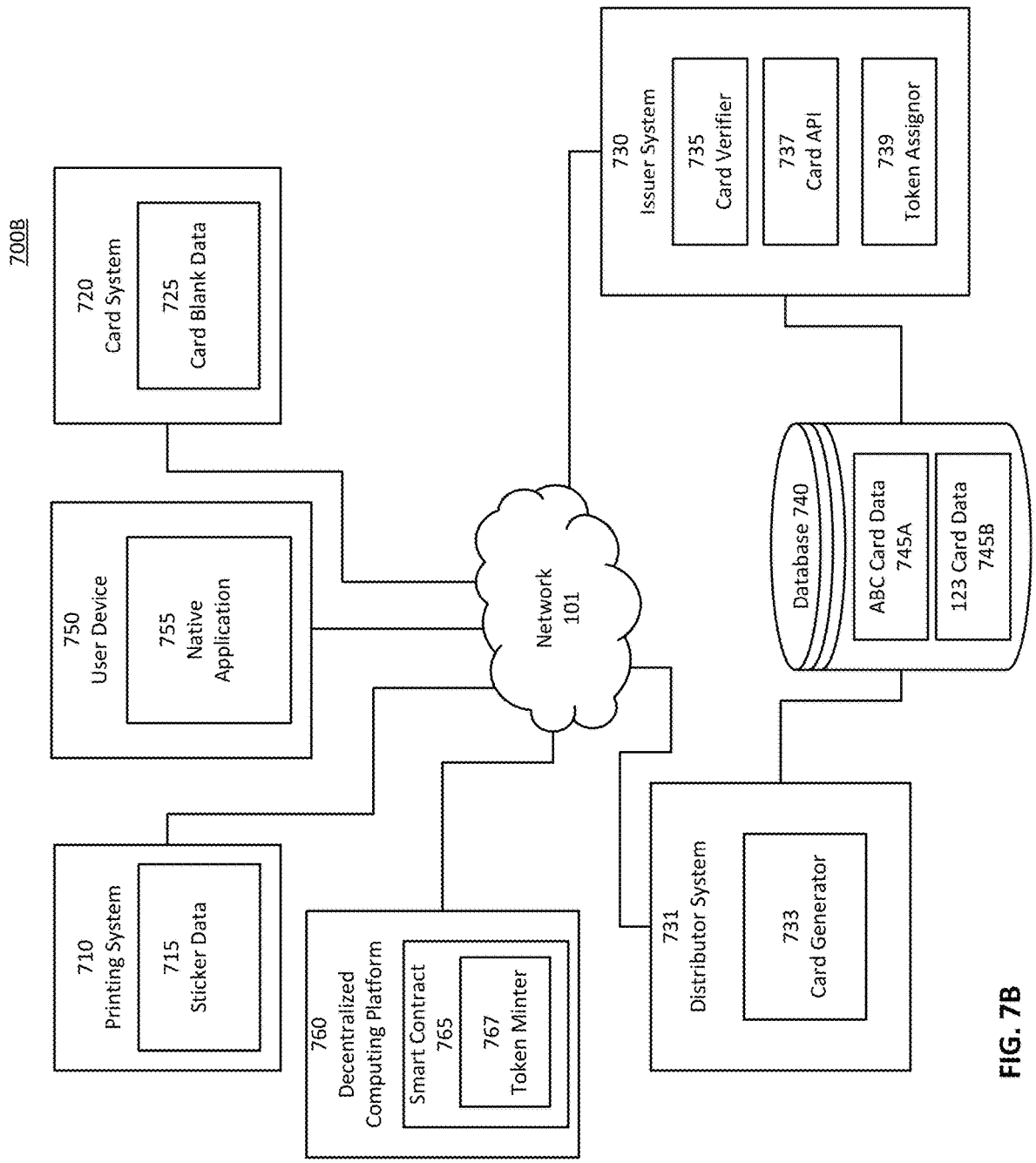

FIG. 7B illustrates an example computing environment 700B within which a customized card may be implemented, according to some embodiments. In some embodiments, the card is robust to supply chain attacks and may be customized by (or for) an issuing entity. In some embodiments, the example computing environment 700B is configured to implement a manufacturing process that enhances the security of digital bearer assets associated with a card held by a user by ensuring personnel involved in producing the card cannot access those digital bearer assets.

Some embodiments of a manufacturing process, which may be implemented within the example computing environment 700B, includes at least two production teams. Some embodiments include at least a first production team that corresponds to a distributor system 731 for creating physical cards. In some examples, the distributor system 731 may create physical cards which may be customized by another entity, like an issuer, or customized for an issuer. An issuer system 730 may receive, and in some examples customize cards, for issue and manage the issued physical cards.

In some embodiments, a distributor system 730 includes a card generator 733. In some embodiments, the card generator 733 is a cold computing server or system without access to a network 101, such as the internet (e.g., to increase security, though a configuration having network access is not disclaimed). In some embodiments, the card generator 733 is a secure computing component or system configured to generate card information, such as key-pairs, like a private-public key pair. In some embodiments, the card generator 733 also generates an encryption key for each key pair and encrypts the private key with the corresponding encryption key (e.g., to generate a ciphertext of the private key). In some embodiments, the secure component 733 generates an address, like a cryptographic hash address for a decentralized computing platform, and in some cases may generate a set of address where at least some of the different addresses correspond to different decentralized computing platforms or digital bearer assets on a decentralized computing platform. In some embodiments, the card generator 733 generates an address identifier, like a unique address identifier, for association with a public key or set of addresses within a database, from which an issuer may select from to support issued cards. In some embodiments, the card generator 733 assigns a unique identifier to a set of informational components corresponding to a given card. For example, a unique identifier, like a serial number, may be associated with an address or set of addresses (or public key upon which the addresses are based), ciphertext of a private key, and an encryption key. In some examples, the unique identifier may be, correspond to, or is based on the address identifier, but may also be a different independent value. For example, the unique identifier may be unique within a namespace of a set of cards created for issue, and the address identifier may be unique within a different namespace (e.g., all generated cards).

In some embodiments, the card generator 733 outputs different combinations of informational components for a card in different files (e.g., segments generated information into different files). Some of those different files may be provided to different systems in a manufacturing process as described above, and some other ones of those different files may be retained or proved to an issuer (or access thereto granted to an issuer) as described below. In some embodiments, the informational components are segmented into at least three parts and those parts are individually inoperable to obtain plaintext of a private key backing a card.

A first information component (e.g., a first file) may correspond to a printing system 710 and include sticker data 715 for printing stickers (or components of a multi-component sticker). In some embodiments, the first file includes a unique identifier, address identifier (e.g., public access information identifier for a first component), and ciphertext (e.g., ciphertext of private access information for a second component) for each sticker (or components of a multi-component sticker).

A second information component (e.g., a second file) may correspond to a card system 720 and include card blank data 725 for engraving or printing (or otherwise disposing information on) card blanks. In some embodiments, the second file includes a unique identifier and an encryption key (e.g., the encryption key utilized to generate ciphertext of private access information corresponding to the unique identifier) for each card blank to be engraved or printed. In an alternative embodiment, the second file may include a unique identifier and ciphertext of private access information (with the card issuer retaining the encryption key for a final engraving or printing step to be completed by the distributor or issuer (which in some examples may be sent back to the card system 720 after mating of the other components), such as in a third file comprising a unique identifier or address identifier and a corresponding encryption key). In another alternative embodiment, the card distributor 731 may retain the card blank data 725 and perform one or more engraving or printing steps (although, in some configurations, it may be beneficial to have a separate party with a card system 720 perform at least some of the engraving such that no single group, party, or personnel has access to information operable to obtain private access information, like a private key, in plaintext without physically activating a tamper-evident feature of a card).

A third information component (e.g., a third file) may correspond to the distributor system 731 or an issuer system 730 and include an association between one or more identifiers of each card and public key or address set information for each card. Thus, for example, a distributor system 731 may create a batch of cards and provide different subsets of the batch of cards to one or more issuer systems 730. Thus, for example, an issuer may configure a subset of cards for use differently from another subset obtained by another issuer. The distributor system 731 or the issuer system 730 may segment the third file and purge (or restrict access to) informational components not supported or specify new information for association with a card based on information contained within the third file. For example, an issuer system 730 may selectively permit user access to one or more addresses within a set of address based on a public key, generate a different address based on the public key, and elect whether to expose a user to information like the public key or an address (e.g., the issuer may restrict use of a card in its original state to operations supported by the issuer system).

In some embodiments, the card generator 733 generates one or more addresses for a public-private key-pair based on the public key of the key pair. In some embodiments, a set of addresses is generated, each address in the set generated according to a protocol of a given decentralized computing platform 760, such as for a corresponding set of different decentralized computing platforms. In some embodiments, the set of addresses and a unique identifier or hash of information corresponding to the card (e.g., unique identifier concatenated with a portion of an encryption key) may be stored within a database 740 for supporting utilization of cards via a user device 750. In some examples, public keys may be stored such that addresses of a new or different decentralized computing platform may be generated later, such as by the distributor or issuer.

In some examples, an address identifier may be associated within the database 740 with a public key, address or set of address. Thus, for example, based on the address identifier, a corresponding address for a given platform, such as platform 760, on the address is operable may be identified. The address identifier may be selected for printing as public access information on a sticker for a card and included in sticker data 715 provided to a printing system 710 while the public key or one or more addresses or both may be stored in association with the address identifier or other identifier or combination thereof. For example, the card generator 733 may store in the database 740, or within a file utilized to populate a database 740, associations based on the generated data. In some examples, with a set of addresses generated, the card generator 733 may discard a public key utilized to generate the addresses, other examples may retain the public key to provide issuer systems 730 with flexibility to support other addresses. Thus, a full set of addresses (or even any address) need not be generated as each address may be deterministically generated based on a public key in a different sequence or by different systems (e.g., prior to discarding information operable to obtain a public key that corresponds to the private key).

In some embodiments, for example, an optical code associated with a card may encode a URL (e.g., web address), and a portion of the URL may be based on one or more informational components of the card, such one or more of an address identifier and unique identifier of the card, by which card record information stored within the database 740 may be identified. A user may use a user device 750 to read the optical code (e.g., like a QR code), such as using a camera application or other application with access to obtain image data from an image sensor of the user device, to cause the user device to request a webpage corresponding to the URL via a web browser of the user device or via another native application 755. The distributor system 731, issuer system 730, or other server, like a web server, with access to card data 745 within a database, such as example database 740, may respond to a request for a webpage (e.g., like www.website.com/<alphanumeric string>, where the alphanumeric string corresponds to, or is based on, information like a public address, public key, or identifier associated with the card) received from the user device 750 with information corresponding to the card based on card data stored within the database 740 (or based on information corresponding to one or more addresses associated with the card determined from records of transactions on the decentralized computing platform 760). For example, the webpage to which the URL directs may include information corresponding to the card (e.g., for one or more wallet addresses associated with the card), like a depiction of the card, balance information corresponding to one or more wallet addresses of the card, and (optionally) address information for wallet addresses of the card. One of the aforementioned servers, for example, or another server, like a web server, may generate or populate graphical and informational components within the webpage responsive to the alphanumeric string, which may be used to obtain card record information (and some of that card record information may be used to obtain information about one or more addresses associated with the card from the decentralized computing platform 706, like a balance of fungible cryptographic tokens or one or more non-fungible tokens held by a wallet address of the card).

The card generator 733 may discard any plaintext private keys during the segmenting of data. Accordingly, in some embodiments, the associations stored within the database 740 or elsewhere are in-themselves inoperable to obtain a private key in plaintext. Only the combination of the informational components disposed on a complete card may afford an entity the ability to obtain a private key in plaintext, and those informational components may be protected by tamper-evident features that render access of information to obtain the private key in plaintext visually evident to inspection of the card. Thus, for example, once the printing system 710, card system 720, or distributor system 731 complete an associated operation and discard an encryption key (e.g., after engraving of a card and concealing of the encryption key with a tamper-evident component) or ciphertext of a private key (e.g., after creation or application of a sticker or otherwise concealing of the ciphertext by a tamper-evident component), attempts to ascertain the private key in plaintext will be evident and only the card itself will include disposed thereon the set of information operable to obtain the private key in plaintext.

The database 740 may store as card data 745, a record for each created card that associates an address identifier, a unique identifier or verification code (e.g., a portion of the encryption key), or a cryptographic hash thereof or other representation, and one or more addresses without storing the private key (and optionally without storing the public key). In other words, private keys (and public keys in some use cases, such as where an address or set of addresses for use with a card are desired to be fixed) may be discarded for security. Although some embodiments may retain a public key, the public key may be optionally encrypted based on information or a combination of information that is discarded by the systems but resident on the card such that public key may be obtained by the user without accessing the private key. For example, the unique address identifier or other identifier may be used to encrypt the public key such that a public key in plaintext may be discarded. Scanning of the unique address identifier (or another identifier), for example, by a user device and obtaining the ciphertext of the public key may permit the user to decrypt the ciphertext of the public key to obtain the public key in plaintext—and release of the ciphertext of the public key to the user device may be permitted or denied by the issuer system 730. In some embodiments, the user device may transmit the unique address identifier (or another identifier) to the issuer system 730 by which the issuer system 730 decrypts the ciphertext of the public key to return the public key in plaintext to the user device or otherwise utilize the public key in plaintext (e.g., to generate a new address).

In some embodiments, an issuer system 730 is coupled to a network 101, such as the internet, and include an API 737 for servicing requests related to issued card. The API (i.e., an application programming interface) may be configured to interface with a native application 755 executing on the devices of users that possesses one or more physical cards, like the example user device 750, or a web application accessed via a native application 755. In some embodiments, the card API 737 services requests received from an application, like a native application 755 (or a web application), based on user inputs provided via user devices and returns responses, which may include results of processing the requests, to the respective user device such that the results may be displayed within the native application 755 of the user device 750 on which a user initiated the request. The issuer system 730 may include, in a database 740, card data 745 operable to service requests received via the card API 737. In some examples, the database 740 may include card data stored by a distributor system 731. In such examples, the issuer system 730 may be granted access to a subset of card data, like ABC card data 745A, corresponding to cards obtained from the distributor and configured for or by the issuer. Other card data, such as 123 card data 745B, may correspond to another subset of card data of cards obtained by another issuer. Access to different subsets of card data may be segmented by issuer, such as by cryptographic isolation or other techniques (e.g., like tenant access to a cloud data store including database 740 data). In other examples, an issuer system 730 may be provided with (e.g., the distributor system 731 may transmit) a subset of card data (e.g., ABC card data 745A) correspond to cards provisioned from the distributor 731, and the issuer may store the received card data 745A within a local, networked, or cloud storage database accessible by the issuer system. The distributor system 731, in turn, may purge data upon confirmation of receipt by the issuer, e.g., based on a checksum or hash of received data.

The card API 737 may respond to API requests for verification of a card and information about digital bearer assets held by one or more addresses associated with a card. For example, the API 737 may pass verification request to the card verifier 735 component to receive a result and provide the result to the user device. In some embodiments, the card verifier 735 receives data from requests to verify a card, obtains data based the request from within a database 740, and determines a verification result. The result may be passed back to the API 737 which generates a response that is transmitted to device having requested the verification. The database 740 may include card data 745 (e.g., ABC card data 745A) operable to verify cards provided to users by the issuer. Thus, in some embodiments, the card verifier 735 may verify authenticity of a card based on the information provided in a received API request based on card data 745A of the database 740 that corresponds to cards provided to users by the issuer.

In some embodiments, the card verifier 735 may store a count of requests to verify a given card and return the count as the verification result (e.g., as indication whether another entity had access to the card). For example, some embodiments uniquely associate, server-side, in the database 740, the unique identifier (or hash thereof) or the address identifier (or the hash thereof) or an address (or hash thereof), or a combination of one or more of those values, and a portion of a symmetric encryption key (or hash thereof) (e.g., the first four digits). In some embodiments, a request to verify a card via the API 737 includes a portion of the encryption key, an identifier, or both, as a request to the API received from a user device 750. In some embodiments, card verifier 735 performs a first verification based on card data 745 stored within the database 740, such as a confirmation that the card is authentic based on a correspondence of the received information with stored card data indicative of that card being issued. The card verifier 735 may generate a response to an API request which reports a result, like a verification value (or values). The verification value (or values) may include a value indicative of whether stored values match the set on the card (e.g., returning a binary determination where both are submitted, returning the unique identifier if the portion of the key is submitted, or returning the portion of the encryption key if the unique identifier is submitted).

In some embodiments, the card verifier 735 performs a second verification based on a decentralized computing platform data, such as a confirmation that one or more addresses associated with the card have not been previously utilized in an unauthorized transaction (e.g., in some examples, a digital bearer asset may be transferred to a card prior to issue) on corresponding decentralized computing platforms. For example, some embodiments of the card verifier 735 perform one or more verification operations on a platform 760 corresponding to an address (or addresses in a set of addresses) of the card corresponding to the received API request. In some embodiments, the card verifier 735 writes a transaction to the platform indicative that a request to verify a given card was received, and may determine within the platform an associated count of requests processed for the given card, which may be returned with results to an API request for verification. Likewise, the card verifier 735 may determine a balance or amount of assets held (e.g., an amount of coins, an amount of tokens, like ERC-20 tokens, or NFT tokens, like ERC-721 tokens, or other digital assets transacted to an address) by one or more address of a card, such as by inspection of a blockchain of a given platform 760, which may be returned in response to a request for an indication of digital bearer assets held by a card.

In some cases, the card verifier 735 may write the result of a verification to a decentralized computing platform or to a local database 740 for the card and initialize a count. The count for verification of a card may be incremented upon each verification request for the card received via the card API 737. In some embodiments, for a new card, the count indicates that the user is the first to verify the card and, as a result, cannot present the card as new even if a tamper-evident adhesive substrate over the concealed information is replaced after such a verification.

In some embodiments, example computing environments 700A or 700B are configured to implement a manufacturing process like that disclosed below using one or more of the above-described components. As mentioned above, various ones of the functions of the printer system 710, card system 720, issuer system 730 or distributor system 731 may be further subdivided and decentralized amongst different parties to mitigate supply chain attacks. For example, a team responsible for card generation 733 may be geographically remote or otherwise isolated from another team responsible for generating some other card information based on output of the card generator 733, and those respective teams may interact with a respective system (e.g., printing system or card system) in the manufacturing process. Further, the printer system and card system, and the team (or teams) responsible for card information generation may be further divided into sub-teams for key generation (e.g., a team may be responsible for passphrases and encryption keys by which an intermediate code may be provided to another team for generating a ciphertext private key or other information, and the like, and may communicate with a respective component, e.g., printer component 710 or card component 720, but not each other).

In some embodiments, the printing system 710 of the tamper-evident sticker never has access to the plaintext of the secret key because an encrypted representation is utilized. Thus, for example, information for sticker 715 printing may include, for each sticker, a unique identifier like a serial number, address/address optical code or address identifier/address identifier optical code, and ciphertext private key/ciphertext private key optical code. As the sticker manufacturer need not take possession of an encryption key operable to decrypt the ciphertext private key or the card blanks marked with the encryption key, the sticker manufacturer cannot ascertain the secret information backing the account corresponding to the addresses or public key.

In some embodiments, the card system 720 of the card blanks never has access to the ciphertext of the private key (physically or without tamper-evidence in the sticker concealing the ciphertext of the private key). Thus, for example, card blank information 725 may include, for each card, a unique identifier and an encryption key. As the card blank manufacturer does not take possession of the ciphertext of the private key, the manufacturer 720 is prevented from using the encryption key in a nefarious manner.

In some embodiments, security may be increased by a final engraving or printing step performed by a card issuer system 730 or distributor system 731 rather than the card blank manufacturer. For example, the card issuer system 730 or the distributor system 731 may detect a given instance of a card and append a remaining portion of an encryption key to a verification code portion or otherwise identify the card (e.g., based on the primary address or address identifier or unique identifier) and engrave, print, or otherwise dispose the encryption key on the card instance based on identification. Thus, for example, even collusion between both the sticker manufacturer and card blank manufacturer is insufficient to nefariously gain access to a secret key generated by a card issuer or distributor system.

An example manufacturing process may include, in accordance with the above-described embodiments, a first production team (e.g., at a first facility) that generates private key information (or seeds for private keys) and another, geographically independent, team (e.g., at a second facility) that generates encryption key information (or passphrases) for encrypting private keys. In some embodiments, a card generator 733 may receive as input private key information and encryption key information, and output, in separate files, on separate storage media, the information described above. For example, in some embodiments, the card generator 733 selects private key information and encryption key information, operates on the private key information to generate a private key and operates on the encryption key information to generate an encryption key, neither of which as a result of the operations directly match the input information to prevent any value of a nefarious party attempting to retain the input information. The card generator 733 may segments the outputs into different files, such as a first file corresponding to sticker data 715 (e.g., a primary address or address identifier, ciphertext private key, and unique identifier), a second file corresponding to card blank data 725 (e.g., a unique identifier and encryption key), and a third file corresponding to card data 745 (e.g., unique identifier, verification code portion of the encryption key, and address or address set or public key, such as for user verification, obtaining additional addresses, or transfer of digital bearer assets to the card) for the respective systems.

In some examples, the card data 745 may be further subdivided, such as into a file corresponding to card data for the transfer of digital bearer assets and another file corresponding to card data for user verification or other functions. The different files may be generated on different storage media, such that those different media may be provided to the corresponding systems.

An example manufacturing process may include, in accordance with the above-described embodiments, a first production team (e.g., at a first facility) that generates sticker components with a printing system 710 based on sticker data 715 and another, geographically independent, team (e.g., at a second facility) that generates card blanks with a card system 720 based on card blank data 725. In some embodiments, a third production team (e.g., at a third facility) is utilized. For example, the third production team may receive stickers generated with sticker data 715, apply the stickers to card blanks prior to an engraving or printing step, and subsequently provide the card blanks having the sticker applied thereon to a card system 720 for engraving or printing based on card blank data 725. Alternatively, the third production team may apply stickers to corresponding cards based on a matching of unique identifiers between stickers and engraved card blanks. In other words, embodiments of the manufacturing process may be implemented such that no production teams gains access to both encryption keys and ciphertext private key (e.g., physically or by visual inspection without tripping a tamper evident indicator).

Some embodiments of the card generator 733 and other aspects of the manufacturing process implement key generation and encryption processes like those set out in the BIP38 standard in the making of a physical cryptocurrency wallet such that multiple informational components (e.g., ciphertext of a private key and corresponding encryption key) are required to access a private key. In some embodiments, the encryption key may include a verification code portion and a remaining portion, which may optionally be separated and one or the other (or both) engraved in a final step prior to packaging to further prevent a nefarious party gaining access to the information components operable to obtain a plaintext private key. Some embodiments afford a cryptocurrency storage solution that makes use of a key generation and encryption process that reduces security leaks in the manufacturing process by having different steps in the process take place across two geographically isolated manufacturing locations, and the sequence with which tamper-evident components are disposed on the product prevent a given party from obtaining access to informational components operable to obtain a plaintext private key without activating a tamper-evident feature.

In some embodiments, a first production team in the United States or other locations generates an encryption key or passphrase for decrypting a particular cryptocurrency private key. The first team then utilizes the encryption key to generate an intermediate code, which can be used by another party to generate an encrypted private key, a public key, and a public address. For example, the card generator 733 may be utilized to generate the encryption key and the intermediate code (e.g., like a proxy re-encryption code). The encryption key is retained for card blank data 725, and the proxy re-encryption code may be utilized by a separate, second, production team to generate a ciphertext private key, addresses that resolve to a public key based on a plaintext private key (e.g., when the ciphertext private key is decrypted by the encryption key). In some embodiments, the intermediate code cannot, however, be used to gain access to the encryption key needed to decrypt the ciphertext private key, or otherwise gain access to the private key in plaintext. In some embodiments, the first team then gives the intermediate code to a second team in Asia or other locations, or the intermedia code may be utilized in a second process to generate and store the information on a separate storage medium. The first team and second team need not necessarily be geographically remote, as other isolation techniques may be utilized. For example, a first team may be walled off from a second team during a manufacturing cycle (e.g., of a batch of a component for digital bearer asset cards), and respective terminals or computing systems may purge data for a batch of a component, such as to prevent any cross-referencing of secret passphrases, private keys, or intermediate codes. A batch of a component, like a batch of stickers, may be manufactured over a set timeframe (e.g., over a shift, like 4 or 8 hours), after which the team responsible for the batch may purge the corresponding data (e.g., to receive data for manufacturing the next batch).

In some embodiments the encrypted private key, which may be printed on bottom-component of a multi-component sticker, is encased by a top-component of the multi-component sticker on which the primary address or address identifier is printed. The top-component may include one or more tamper-evident features such that, once the bottom-component is so encased by the top-component, a party cannot access the ciphertext of the private key without activating one or more of the features. Once the multi-component sticker that has the encrypted private key printed on the bottom-component and the primary address printed on the top-component is adhered to the card, with the top-component positionally encasing the bottom-component (e.g., which may be visually evident based on a window in the top-component revealing an area of the bottom-component that corresponds to the window), a party in possession of the card cannot ascertain the ciphertext of the private key without activating one or more tamper-evident features. In other words, the bottom-component containing the ciphertext of the private key cannot be accessed or viewed without shifting or removing the top-component. If the top-component is removed or shifted, even slightly, in an attempt to access the ciphertext of the private key, a clearly visible honeycomb-like or other pattern (e.g., in a three-dimensional relief pattern) may be revealed on the card, and the top-component cannot be re-adhered to a surface with its original appearance.

When generating the ciphertext private key, the public key, an address (or set of addresses) or unique address identifier with an intermedia code, in some embodiments, the second production team also generates a confirmation code that is returned to the first team. The first team may use the confirmation code to verify that the primary address (or set of addresses) the second production team generated depends on the encryption key or passphrase the first team generated (and, therefore, is operable to decrypt the ciphertext private key the second team generated with the intermediate code). In some embodiments, although the first team receives a confirmation code from the second team, the first team need not receive or access the ciphertext private key at any point and therefore cannot access the plaintext private key without removing the tamper-evident top-component of a multi-component sticker once the sticker data 715 is discarded. Likewise, the reverse holds true once the card blank data 725 including the encryption key is discarded (e.g., after confirmation and engraving or printing of card blanks with corresponding information to sticker information).

Although the second team may generate the encrypted private key, the public key and an address (or set of addresses), it does not have the ability to decrypt the encrypted private key because it only has access to an intermediate code in this example. The second team never has access to the secret passphrase needed to decrypt the private key in some embodiments. In some embodiments, after attaching a ciphertext private key and public address or address identifier onto a card via a multi-component sticker, the second team sends the card to the first team. The first team then disposes the encryption key (that is needed to decrypt the ciphertext private key) onto the card and may then distribute or issue the cards. In this way, in these embodiments, the second team never gains access to the encryption key needed to decrypt the ciphertext private key and access funds on the card. The first team also cannot access the ciphertext private key for decryption without moving or removing a sticker component concealing the ciphertext private in a tamper evident manner.

Provided the tamper-evident sticker component encasing the private key has not been tampered with (which the customer can easily see), and the tamper-evident component masking the encryption key has not been tampered with, the user of the physical card can be assured that no one in the whole manufacturing and supply chain process accessed both the encryption key and the ciphertext private key to obtain the plaintext private key of the card. This is expected to guarantee the integrity of the card and enhances the security of digital bearer assets a user transfers to the card.

Thus, for example, various ones of the printer system 710, card system 720, issuer system 730 or distributor system 731, may be operated by different teams, and a system may be further subdivided into two or more components or systems operated by two or more teams, such as in accordance with the manufacturing process techniques to enhance security in physical cards for storing digital bearer assets as described above. Moreover, one or more of the systems 710, 720, 730, 731 may be a cold system or include one or more cold components not accessible from a network 101 (although exchange of data over a network 101 between the different system in a secure manner is not disclaimed, such as by asymmetric cryptography by which only a given party can access a corresponding portion of encrypted data which itself may be encrypted).

Customizable Cards

With reference to FIG. 7B, example techniques for implementing customizable cards are described below. Various ones of these techniques may be implemented within the context of FIG. 7A, such as by inclusion of example components discussed with reference to FIG. 7B. For example, the functions of the distributor and issuer systems may be combined or allocated among these (or different) systems in different ways. At least some operations of example native applications 755 may be implemented within either computing environment 700A, 700B. In some example use cases, a native application may be compatible with aspects of both computing environments. For example, a native application may be used with both cryptocurrency cards and customizable cards.

Customizable cards, which are described in more detail below, may differ from cryptocurrency cards one or more ways. Examples of customizable cards may omit inclusion of an address, like a cryptographic hash address, of a wallet on a computing platform from public access information printed on the card. Instead, customizable cards may include a unique address identifier or other identifier that uniquely identifies the card for association with a public key or wallet address information in a database. The association of this information in a database may permit different entities to configure cards in different ways, without a requirement for specific access information to be disposed on a card itself. The association, in contrast to printing an address or public key on a card itself, enables configurable access controls governing use of a card in its original state (e.g., as issued). For example, a user may be unable to use a customizable card (e.g., to receive digital bearer assets) without compliance with the access controls, unless the user activates a tamper-evident feature of the card, thus altering the card from its original state (e.g., as issued). Accordingly, use of a card in ways other than those permitted by the access controls may be require altering the card from its original state, thus indicating to other users or entities that the card is not longer in its original state.

In some example embodiments, an issuer system 730 may include a token assignor 739. The token assignor 739 may interface with a decentralized computing platform 760 to generate tokens for allocation to cards prior to issue, or cards after issue. In some examples, a card may be selected for token allocation subsequent to a user verifying the card (e.g., with the issuer system 730). The decentralized computing platform 760 may be an existing decentralized computing platform in which the issuer participates, such as by configuration of a smart contract 765 to perform operations within the context of the existing decentralized computing platform or may be a decentralized computing platform configured to perform the operations and over which the issuer may maintain some degree of control. In some cases, a computing platform utilized by an issuer may be distributed and implement blockchain, blockchain-like, or similar protocols, but limited in participation to computing nodes controlled by the issuer (e.g., control is not decentralized), like a private blockchain.

The token assignor 739 may receive or obtain a selection of cards, such as a subset of cards within a database, for initialization with digital bearer assets. For example, the token assignor 739 may obtain card data, like ABC card data 745, from database 740. The card data may include an address, or a public key by which an address may be generated, that corresponds to the computing platform 760 for the selection of cards. The token assignor 739 may submit one or more transactions to the computing platform 760 to effectuate the transfer of digital bearer assets to the addresses of some or all of the selected cards. For example, the token assignor 739 may submit one or more transactions to the computing platform 760 to effectuate the transfer (or allocation) of one or more digital bearer assets to one or more addresses.

In some examples, the token assignor 739 may submit transactions to transfer digital bearer assets held by an address associated with the issuer to the one or more addresses. The token assignor 739 may determine an allocation of an amount of a digital bearer asset to one or more addresses of the cards and submit the transaction to the computing platform 760 for processing.

In some examples, the token assignor 739 may determine an allocation of NFTs held by a wallet of the issuer. NFTs, which may be unique tokens, may be allocated individually to different ones of cards by their respective addresses. The token assignor 739 may determine an allocation of a set of NFTs to a set of addresses, like a mapping of an NFT to an address. An address may receive multiple different NFTs, but no address may receive the same NFT, nor can a same card receive the same NFT in duplicate. None of which is to suggest that all of the different NFTs need represent different things. Indeed, multiple individually identifiable NFTs may represent a similar (or the same) thing, but the tokens themselves may be uniquely identifiable. For example, a French fry token A may be uniquely identifiable from a French fry token B yet both tokens may correspond to a same thing (e.g., a French fry), and other NFTs may correspond to other things (e.g., Burger, Drink, etc., as an example). The uniqueness of NFTs may be beneficial to tracking redemption, use, or transfer thereof within the context of issued cards.

Fungible tokens may also be allocated, such as based on an amount thereof, which may be a fractional or whole value. In some examples, whole value transfers may be enforced by a protocol governing use of the token. In some examples, multiple different types of tokens may be allocated, such as French fry tokens, Burger tokens, and Drink tokens, and each may be governed by a respective rule set (e.g., in a smart contract or by respective smart contracts). Accordingly, the token assigner 737 may determine an amount of fungible tokens and a type of fungible token to allocate to one or more addresses or different amounts to allocate to different ones of the addresses. Different amounts may be allocated based on a random draw allocation. For example, the token assigner 739 may determine a random value within a range, or which may be normalized with a range, for association with each address or different subsets of addresses which may be randomly selected for assignment. In turn, an amount of fungible tokens to allocate to an address may be based on the random value (or normalized random value) associated with the address by the token assigner. In some examples, a smart contract 765 may perform the operations like those ascribed above to the token assigner, such as by receiving a set of addresses and determining allocation amounts.

In some examples, the token assignor 739 may submit a transaction to cause the creation and subsequent transfer of digital bearer assets from a smart contract 765 to the one or more addresses. A transaction may be submitted to a smart contract 765, like a script, or other body of logic (or code) to be executed by computing nodes participant in the computing platform 760. The smart contract 765 may be referenced by an address, like a cryptographic hash address, of the smart contract or by location (e.g., cryptographic hash pointer) of the smart contract on the computing platform 760. A smart contact 765 may be stored within a tamper-evident data structure, like a blockchain-based data structure, of the computing platform and thus codify a body of logic for execution of one or more operations by computing nodes of the computing platform. In other examples, a smart contract 765 may be stored off chain, and an entry within the tamper-evident data structure may include a resource locator corresponding to the smart contract and a cryptographic hash or checksum may validate whether the body of code is authentic (e.g., has not been tampered with). The smart contract 765 may specify a schema for inputs and respective computing nodes may process those inputs in accordance with the body of logic to respectively determine a result (or results), upon which a majority of the nodes may agree upon via a consensus algorithm like Raft, Paxos, or other consensus protocol of the computing platform 760, that is recorded within the data structure (e.g., subject to agreement of a majority of nodes on the determined result (or results) of execution of the smart contract based on the inputs).

In some examples, the smart contract 765 may include a token minter 767. As described above, the smart contract 765 may be called for execution, such as by an issuer system 730, which may be a computing node of the computing platform 760. The smart contact 765 may take a set of inputs, and the token minter 767 may mint tokens (e.g., NFTs or fungible tokens) based on the inputs. In some examples, the inputs may specify a set of NFTs to mint, or an amount of fungible tokens to mint. In an NFT minting example, the inputs may include a set of unique inputs, and an NFT is minted with respect to each unique input. In some examples, such as where an address of a card is allocated only a single NFT by the issuer, an identifier of a NFT may be based on the address. In some examples, the inputs may also specify a set of address to which minted NFTs or fungible tokens are to be transferred to, or an address, such as the address of the issuer system, to which the tokens are to be transferred to for subsequent allocation.

In an example use case, an address corresponding to the computing platform 760 of each card in the ABC card data 745A may be obtained by the issuer system 730. The token assignor 739 may determine an allocation of NFTs or tokens to each card address and call (e.g., submit a transaction that references) the smart contract 765 for execution based on input including the address and NFT or amount of token pairings. Computing nodes may verify the authenticity of the call to execute the smart contract 765 based on a signature or certificate corresponding to the issuer system 730, such as based on a public key associated with the issuer system 730, or other protocol of the computing platform or verification operation encoded within the smart contract. Upon verification of the call to execute the smart contract, a computing node may execute logic corresponding to the token minter 767 upon received inputs (either included with the submitted transaction or referenced by the transaction from another location) to mint and allocate tokens based on the allocation determined by the token assignor 739.

In some examples, different subsets of the cards within the set of ABC cards may be allocated with different types of NFTs. For example, a first subset may be allocated with a first type of NFT, a second subset with a second type of NFT, and a third subset with a third type of NFT. Different types of NFT may be indicated by the issuer system 730 or hard coded within the smart contract. In some examples, a type of NFT may correspond to a particular product or service associated with the token or card, and the card may be customized based on the type (either prior to, or after, allocation). In some examples, an NFT may be associated with a particular product or service represented by the card. For example, purses with a given print and color scheme may correspond to a type of NFT, and a serial number of a given purse may correspond to a given NFT of the type (e.g., an identifier of the given NFT may uniquely correspond to the serial number of the given purse). The card may be supplied to a consumer in association with the purse, like a certificate of authenticity. In another example, a type of NFT may correspond to a product which the owner of the token may redeem based on the token. For example, a user may redeem a Burger NFT at a restaurant of an issuer having issued cards with Burger NFTs based on transfer of the Burger NFT held by the card of the user to an address specified by the issuer. Other types of NFTs may also be issued, like French fry NFTs and Drink NFTs. Issuance of the card holding the Burger NFT as a promotional item at a certain event may be recorded by the issuer system 730 and metrics associated with the subsequent redemption may be tracked, such as by location of redemption relative to the location of issuance or duration between issuance of the card and redemption. In some examples, finer grained metrics may be obtained, such as based on a user verifying the card holding the NFT, whether a specific user was provided with the card, or whether the issuance of the card holding the NFT corresponded to a particular promotion. As mentioned above, a card may be customized by or customized for the issuer. For example, a card may be printed on one side to indicate the type of token (e.g., depiction of the specific purse to which it corresponds or a Burger or Fries or Drink) or branding of the issuer (e.g., ABC company). In some examples, printing of only branding information may be provided, and users may determine what type (or types) of NFTs are held by a card by scanning the card, such as with a user device or with a device at a physical issuer location.

Examples of a user device 750 include computing devices like mobile computing devices such as smartphones, tablets, or laptop computers, but may also include desktop computers. In many cases, the user device 750 is a smartphone or tablet computing device having a touchscreen or other interface by which a user may view or input data, an image sensor, a wireless interface for network 101 connectivity, and optionally, a trusted execution environment. In some embodiments, a trusted execution environment is a logically or physically isolated execution environment of a user device 750 which offers increased data security, such as by cryptographic isolation, a secure co-processor or memory, or other logical or physical structure that isolates data or processes from applications or processes executed within an untrusted environment. The native application 755 may be obtained on a computer-readable medium of the user device 750 from an application repository, like an application store, or from the issuer system 730, via the network 101. Executable code of the native application 755 may be obtained in a memory of the user device 750 and executed by one or more processors of the user device 750 to perform one or more of the functions described herein.

Some embodiments of a native application 755, like a card scanning application, may manage or display information about one or more physical cards obtained by a user. In some embodiments, a user may utilize a user device 750 to execute a native application 755 to manage the one or more cards within a wallet, or to display information about the physical cards. In some embodiments, the native application 755 generates a user interface by which the user interacts with the application. For example, the native application 755 may generate a user interface for display by retrieving an extant UI from memory, evolving an extant UI, or composing a new UI having the corresponding features. In some embodiments, the native application 755 may generate a user interface by retrieving data for one or more user interface elements from a server, such as by requesting user interface elements or populating user interface elements based on data received from an API, such as a card API 737 of an issuer system 730. In some embodiments, the native application 755 generates a sequence of discrete user interfaces, or evolves a user interface to present a sequence of user interface views to displays different data or options for user selections, and may generate a different user interface or evolve a user interface or otherwise update a user interface view or information displayed within a generated user interface based on a selection of a user or received response from a server.

The native application 755 may interface with an image sensor of the user device to scan an optical code. The scanned optical code may be an optical code corresponding to a top component of a physical card. The optical code may encode an address (e.g., an address for receiving the transfer of ownership of a digital asset within a decentralized computing platform, like a cryptographic currency platform or token platform, or combination thereof) based on a corresponding public key or an address identifier or other identifier by which an address based on a corresponding public key or the public key (e.g., for determining an address) may be identified within a database. In some embodiments, the corresponding public key resolves to various wallet addresses on various decentralized computing platforms, an example of which may correspond to decentralized computing platform 760.

The native application 755 may be configured to query an API 737 of a server, like an issuer system 730, based on the information obtained from scanning the optical code of a given card to query for information about one or more wallet addresses, such as an address or digital bearer assets held by an address. Each wallet address may have an associated balance as indicated by transactions recorded in a blockchain or blockchain-like data structure (e.g., a tamper-evident data store) of a corresponding decentralized computing platform 760. In some embodiments, the native application 755 may display a user interface including one or more representations of cards a user has added to the wallet and one or more values indicative of digital bearer assets or indications of NFTs corresponding to one or more addresses associated with a given representation of a card. In some embodiments, the user interface may display information about one or more cards without the cards being added to a wallet, such as digital bearer assets held by a card. In some embodiments, an image corresponding to an NFT may be displayed in association with a card, such as based on a type of the NFT, image data indicated by the NFT, or external image referenced by the NFT. Thus, for example, the API 737 may return information about digital bearer assets associated with a card based on an optical code depicted on the card that is scanned by the user.

In some embodiments, the native application 755 includes a wallet for managing physical cards obtained by the user. The native application 755, in example embodiments where the user device 750 includes a trusted execution environment, may interface with the trusted execution environment for the storage and processing of wallet data, like physical card information. Additionally, in such embodiments, the native application 755 may interface with the trusted execution environment, such as via an API of the trusted execution environment, to request that a trusted application obtain and process data corresponding to a physical card such that other (e.g., untrusted) applications executing on user device 750 are unable to access the data. For example, the native application 755 may request, via the API, that a trusted application within the trusted execution environment securely obtain input (e.g., via a keyboard interface or imaging interface) and process the input. In other embodiments, the native application 755 may maintain wallet data. In either instance, a user may input information corresponding to a given card into the native application 755 to configure the card within the wallet, such as by reading an optical code encoding the information, with the user device 755, or inputting the information manually. The native application 755 may display a visual representation of the physical card within an interface and present a user interface option that the user may select to verify the card. Accordingly, in some embodiments, the native application 755 may present a user interface by which a user may elect to read an optical code corresponding to a physical card. The native application 755 may interface with an imaging device, like an image sensor, of the user device 750 to capture an image of the optical code. In turn, the native application 755 may process the image to obtain (e.g., read) the information that was encoded in the optical code. Alternatively, a user may manually input the information.

The native application 755 may prompt a user to input or obtain via an image sensor additional associated information in response to reading a given optical code or selection of a function, such as a verification code, encryption key, etc., depending on the optical code or the activity the user desires to effect. For example, an optical code may be read to obtain an address or public key corresponding to a physical card, and the native application 755 may display a representation of the physical card with the address, public key, or one or more other addresses (e.g., corresponding to different decentralized computing platforms or different cryptographic currencies). In another example, an optical code may be read to obtain an address identifier or other identifier of the card, which the native application 755 may include in a request transmitted to an API, like API 737, and receive, in response, information about digital bearer assets held by the card, in some cases without receiving information about the address holding the digital bearer assets or the public key by which the address was generated. In some examples, the user may elect to add a card to their wallet, which may cause at least some information about the card to persist within a memory of the device or in association with an account of the user with an issuer (e.g., until the user elects to remove the card), such as for tracking digital bearer assets held by different cards added to their wallet without a requirement to re-scan public access information of the card in each case. In some examples, addition of a card to a wallet may require a user to verify a card, such as by activating at least one tamper-evident feature of the card. In some examples, such action may be enforced by virtue of successful verification of a card with an issuer system 737 to receive one or more addresses on a computing platform 760 based on an address identifier or identifier of the card.

In some examples, the user may elect to verify the card by selecting a user interface element within the native application 755 to verify the card. In response to the selection, the native application 755 may prompt the user for a verification code (or other information, like a unique identifier of the card) and, after obtaining verification code input, transmit a request to the API 737 of the issuer system 730. In some embodiments, the request includes one or more of a verification code (e.g., a portion of an encryption key) of a card, address or address identifier encoded by the optical code on the card, and unique identifier of the card. Access to the verification code may be dependent upon access of information protected by a tamper-evident feature of the card, thus indicating to other users that the card may have been previously verified and optionally added to a wallet of a user. In some embodiments, the native application 755 cryptographically hashes a combination of the above-described data and transmits the cryptographic hash rather than the data itself. For example, the native application 755 may concatenate the verification code and other information, like an address or address identifier or identifier of the card, into an alphanumeric string, cryptographically hash the string, and transmit the cryptographic hash of the string or portion thereof for verification. In turn, the native application 755 may receive a response from the issuer system 730 indicating a result of the verification, such as verified, and optionally whether a prior verification request has been serviced for the card. In some embodiments, the native application 755 may additionally request information from one or more decentralized computing platforms 760, such as a request for transactions associated with a given address corresponding to the card, and provide the results to the user (e.g., whether the address was previously utilized in a transaction, thereby indicating a possible collision or that another user has utilized at least the same address or public key corresponding to the card). Based on the results of the one or more verifications, a user can easily determine whether to utilize the physical card (e.g., by the access information disposed thereon) to manage (or hold) digital bearer assets on a decentralized computing platform 760.

In some examples, a user may desire to receive a transfer of digital bearer assets to an address associated with a card. The user may select a corresponding user interface option within the native application 755. In turn, an optical code may be read to obtain an address or public key to which the user desires to receive a transfer of digital bearer assets or the user may manually input the address or public key. The address may be transmitted by the native application 755 to the API 737 or another user by which a transaction to transfer digital bearer assets to the address may be effectuated. Alternatively, the user may provide the address to another user. In examples that include an address identifier or other identifier associated with one or more addresses or a public key in a database, the native application 737 may receive a set of options based on privileges permitted to users of the card by an issuer system 730. For example, the native application 737 may restrict transfers of digital bearer assets or permit only certain transfers to a card in an original or verified state (e.g., without the user having accesses the private key). In some examples, the API 737 may facilitate receipt of digital bearer assets in a limited fashion through an intermediate address or smart contract without divulging an address of the card to the recipient user or the sending user.

In some examples, a user may desire to transfer digital bearer assets from an address associated with a card to another address. The user may select a corresponding user interface option within the native application 755. In turn, an optical code may be read to obtain an address or public key to which the user desires to transfer digital bearer assets to or the user may manually input the address or public key. In some examples, the native application 755 may display a set of options for transfer of digital bearer assets, such as address associated with the issuer or a burn address (e.g., destruction of the digital bearer assets by virtue of no known private key corresponding to the address, such as to remove the transferred digital bearer assets from circulation) or to another user. The native application 755 may display a representation of one or more physical cards within the wallet of the user that are operable to effect the transfer. For example, the native application 755 may display a subset of the physical cards within the wallet that have digital bearer assets of the desired type (or types) for the transfer. In turn, a user may elect to effect a transfer with one or more of the physical cards. For example, the user may select a given representation of a card having a sufficient amount of digital bearer assets, like a sufficient balance of tokens, to effect the transfer. In another example, the user may select a given representation of a card having one or more NFTs of the appropriate type, or a combination of NFTs of different types. In response, the native application 755 may prompt the user to provide private access information corresponding to that physical card (or multiple physical cards, if needed, sequentially).

In some embodiments, the native application 755 may prompt the user to utilize the image sensor to read an optical code encoding private access information of a card. Alternatively, the user may manually input the private access information. In some embodiments, the private access information encoded in an optical code or otherwise printed on a physical card is a ciphertext of private access information which must be decrypted to obtain plaintext of private access information for effecting the transfer. Accordingly, the native application 755 may detect that input private access information is ciphertext (e.g., based on a format of encoded ciphertext, like a prefix, or the format differing from a format of a private key operable to effect a transfer) and request input of an encryption key or passphrase by which the ciphertext private access information can be decrypted to obtain plaintext private access information. For example, the native application 755 may prompt the user to scan another optical code encoding the encryption key or area of the card on the which the encryption key is disposed (e.g., to obtain image data that the native application may process to determine one or more letters, numbers, or symbols of the encryption key within the scanned area) or manually input the encryption key such that the ciphertext can be decrypted and the private key obtained. If the user elects to commit the transfer, the native application 755 may generate transaction information according to a protocol of a decentralized computing platform 760 corresponding to the digital bearer asset. Generally, the process includes a signature over the transaction information with the private key (e.g., obtained by decrypting the ciphertext private access information with the encryption key or passphrase) that corresponds to the public key backing an address to which the digital bearer assets are being transferred from. For example, data, like the amount of a digital bearer asset or which NFTs are being transferred and the recipient address(es) (among other information), may be digitally signed with a signature algorithm utilizing the private key, and the signature over the data may be verifiable with a signature verification algorithm utilizing the public key. Thus, for example, the transaction information may include the data that was signed, the signature, and the public key by which the signature can be verified and that resolves to an address holding at least the amount of digital bearer assets being transferred.

Figure 8:
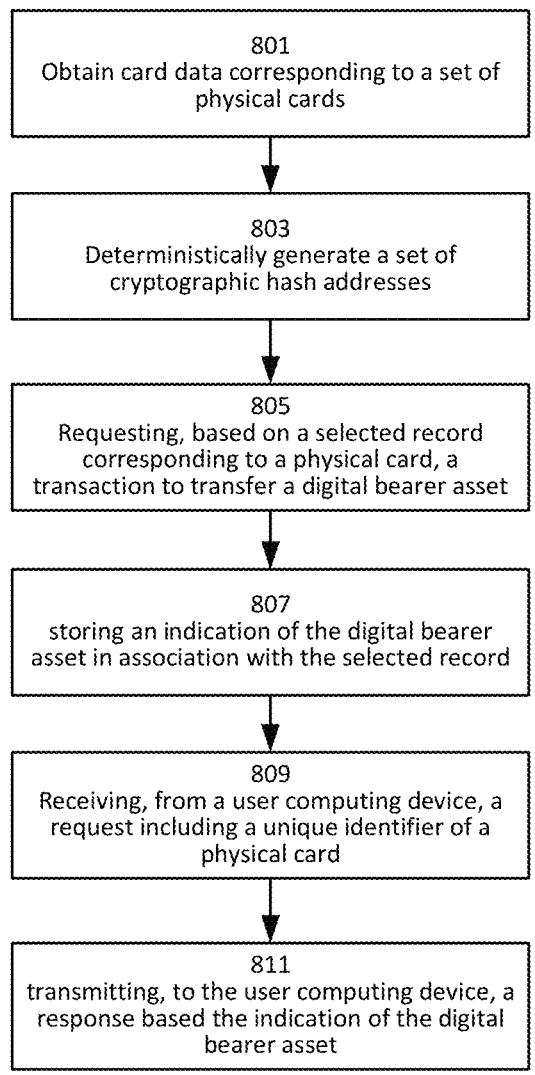
FIG. 8 is a flowchart of an example process for customization of a physical card, in accordance with some example embodiments.

FIG. 8 is a flowchart of an example process 800 for customization of a physical card, in accordance with some example embodiments. Embodiments of the process may be used to implement customizable cards, such as for third party branding and allocation of digital bearer assets (which in some examples may be NFTs), which may omit inclusion of an address, like a cryptographic hash address, from public access information printed on the card to prohibit the transfer of digital bearer assets to the address from an unauthorized party—unless that party activates a tamper-evident feature to access the private access information on the card. In various examples, the private access information may still be solely maintained on the physical card after manufacture to prohibit any party from transferring a digital bearer asset that has been allocated to the address associated with the card—unless that party activates a tamper-evident features to access the private access information on the card. Thus, for example, a customer issuing customizable cards may be assured that no other party can allocate digital bearer assets to the cards without physically tampering with the cards and a user obtaining one of the cards may be assured that a digital bearer asset allocated to the address associated with the card cannot be transferred to another address unless the card is physically tampered with, and in either case, physical tampering may be visually evident upon inspection of a card.

Embodiments of the example process 800 may be implemented within the context of computing environments like those described with reference to FIGS. 7A and 7B, using computing devices that those described with reference to FIG. 10. In some example embodiments, the operations described with reference to process 800 may correspond to steps of a method, like a computer-implemented method, or computer program instructions that may be stored on a tangible, non-transitory, machine-readable medium and when executed by one or more processors cause the one or more processors to effectuate the operations. Steps of the process 800 may be implemented by one or more entities described with reference to FIGS. 7A and 7B, and in some embodiments, may be distributed among different ones of those entities.

In some embodiments, the process 800 may begin by obtaining 801 card data corresponding to a set of physical cards. For example, a computing system may obtain card data that associates, for each of the physical cards, a respective public cryptographic key with a respective unique identifier. Each physical card in the set may have (e.g., physically present on the card, like the card itself, or attached to the card, such as via a sticker or one or more stickers, or otherwise associated therewith) an optical code encoding a respective unique identifier and concealed information. The concealed information may be accessible to a user possessing the card, however, accessing of that concealed information may render the act of accessing visually evident upon inspection of the card. For example, accessing of the concealed information may comprise activation of one or more tamper-evident features that visually indicates to an inspector of the card that the concealed information has been accessed. The concealed information may correspond to a private cryptographic key of a private-public cryptographic key pairing of which a respective public cryptographic key is a member. Thus, for example, obtained card data may include an association of a public cryptographic key and unique identifier for each physical card in the set, where each physical card in the set may include as concealed information a respective private cryptographic key of a respective public-private cryptographic key-pair of which a respective public cryptographic key is a member. A unique identifier of a physical card may be included with the physical card. For example, an optical code may encode the unique identifier. In some examples, this optical code may be concealed, such as by a tamper-evident feature, such that a user needs to activate the tamper-evident feature to access the optical code. In some cases, packaging of the card, may conceal the optical code, a user having to open the packaging (which may be a form a tamper-evidence, such as via single use-packaging that is rendered inoperable to repackage the card) to be able to visibly inspect the optical code. Thus, some example use cases envision digital bearer assets that are allocated to the card being unavailable for inspection without the user interacting with a tamper-evident feature (e.g., such that a user cannot readily determine what digital bearer assets have been allocated to the card in a preliminary un-accessed state, with a secondary un-accessed state corresponding to a user not being able to readily access a private cryptographic key corresponding to the card or information by which a private cryptographic key corresponding to the card may be determined).

As described herein, customizable cards, examples of which may correspond to the aforementioned set of physical cards, may each include a unique address identifier or other identifier that uniquely identifies the card for association with a public key or wallet address information in a database. Thus, for example, the public key or wallet address may, in some cases, not be provided in connection with a physical card, e.g., the public key or wallet address may be maintained separately in association with a unique address identifier of the card. The association of this information in a database may permit different entities to configure cards in different ways, without a requirement for specific access information to be disposed on a card itself. The association, in contrast to printing an address or public key on a card itself, enables configurable access controls governing use of a card in its original state (e.g., as issued). In some examples, the public key may be discarded after a digital bearer asset (or assets) are allocated to a physical card, which is not to suggest that the wallet address need be discarded. In some examples of decentralized computing platforms, like blockchain based computing platforms, a wallet address is deterministically derived from a public key, like via a one-way function (which is not to suggest that such a function may not have multiple operations, some of which may not be one-way), such that a wallet address is not operable to determine the public key upon which the address is based. Thus, for example, an entity may not generate new (or additional) wallet addresses after a public key is discarded without accessing the private key of a physical card. As noted previously, the private keys may be discarded and a private key or combination of information by which a private key may be obtained may reside only on a physical card—and the private key or the combination of information may be concealed by one or more tamper-evident features such that accessing of information by which the private key may be obtained in plaintext is visibly evident on the physical card. As such, access controls may be guaranteed for physical cards in an un-accessed state (e.g., until a possessor accesses concealed private information by which a private key may obtained in plaintext). In some examples, a computing system may monitor wallet addresses associated with such cards to determine whether digital bearer assets are transferred from the card or to the card. For example, a user may be unable to use a customizable card (e.g., to receive digital bearer assets) without compliance with the access controls, unless the user activates a tamper-evident feature of the card, thus altering the card from its original state (e.g., as issued). Accordingly, use of a card in ways other than those permitted by the access controls may be require altering the card from its original state, thus indicating to other users or entities that the card is no longer in its original state.

A database (e.g., of a computing system or which a computing system accesses) may store as card data, a record for each created card that associates an address identifier, a unique identifier or verification code (e.g., a portion of the encryption key), or a cryptographic hash thereof or other representation, and one or more addresses without storing the private key (and optionally without storing the public key). The address identifier, unique identifier, verification code, or other identifier value for a card may be used to identify a record of a card, and information associated with the card (e.g., digital bearer assets that have been allocated to the card). In other words, private keys (and public keys in some use cases, such as where an address or set of addresses for use with a card are desired to be fixed) may be discarded for security. Although some embodiments may retain a public key, the public key may be optionally encrypted based on information or a combination of information that is discarded by a computing system but resident on a physical card such that public key may be obtained by the user without accessing the private key. For example, the unique address identifier or other identifier may be used to encrypt the public key such that a public key in plaintext may be discarded. Scanning of the unique address identifier (or another identifier), for example, by a user device and obtaining the ciphertext of the public key may permit the user to decrypt the ciphertext of the public key to obtain the public key in plaintext—and release of the ciphertext of the public key to the user device may be permitted or denied by a computing system having access to card data for supporting issued physical cards.

In step 803, embodiments may deterministically generate a set of cryptographic hash addresses corresponding to the set of physical cards, such as based on public key of the public-private key-pair corresponding to respective ones of the physical cards in the set of physical cards prior to discarding of the public keys. For example, a computer system may deterministically generate a cryptographic hash address based on a public key corresponding to a physical card with a protocol corresponding to a selected decentralized computing platform. The computer system need not be the same computer system by which the card data is determined. For example, a $3^{rd}$ party may receive the public keys of a set of cards and generate addresses.

Some example operations of step 803 may generate a set of cryptographic hash addresses for each physical card, such as where it is desired to provide the option to utilize the card with different decentralized computing platforms using different protocols for generating an address on a respective platform. Embodiments of the process may store, with the computer system, within a database, for each of the physical cards, a record (in some examples using the aforementioned records containing card data or new records, which may be stored in a different database) that associates a respective unique identifier (e.g., value by which a record can be identified that is included with a respective physical card) with a respective cryptographic hash address (or set of addresses) generated from the respective public key corresponding to the physical card. Thus, for example, a record of a physical card may be identified based on a unique identifier (or other value by which records are identified), such as responsive to a request including the unique identifier, and that record may include one or more cryptographic hash addresses corresponding to the physical card (e.g., corresponding to the public key associated with the physical card, the physical card including private access information by which the private key of the public-private key-pair can be obtained).

In step 805, embodiments may request, based on a selected record corresponding to a physical card, a transaction to transfer a digital bearer asset. For example, a computer system may request a transaction on a selected decentralized computing platform based on a selected record. An example transaction may specify a transfer of a digital bearer asset to a cryptographic hash address of the selected record. The computer system need not be the same computer system (or one of the computer systems) utilized in prior steps. For example, a $3^{rd}$ party computer system may receive records corresponding to a set of physical cards, those records comprising, for a physical card, an association of a wallet address (like the aforementioned cryptographic hash address) and a unique identifier for the physical card. Accordingly, a $3^{rd}$ party system, in some examples, may not receive (and need not receive) a public key corresponding to a card, but a cryptographic hash address for the card which is operable on a selected decentralized computing platform. Under either use case, the same or a different (e.g., $3^{rd}$ party) computer system may generate a request for the effectuation of a transaction that transfers a digital bearer asset to a cryptographic hash address (e.g., wallet address) associated with a physical card.

In some examples, a smart contract may be called for execution, such as by a computing system of an issuer of the physical cards, to mint and allocate or otherwise transfer digital bearer assets to the physical cards (e.g., by effectuating a transaction or transactions to cryptographic hash addresses corresponding to one or more of the cards). In other examples, a computing system may request transactions of digital bearer assets held by a wallet of an issuer to cryptographic hash addresses corresponding to the physical cards. In some examples, a smart contact may take a set of inputs, like input indicating a set of NFTs to mint, or an amount of fungible tokens to mint, and addresses to which NFTs or tokens are to be allocated. In an NFT minting example, the inputs may include a set of unique inputs, and an NFT is minted with respect to each unique input. In some examples, such as where an address of a card is allocated only a single NFT by the issuer, an identifier of a NFT may be based on the address. In some examples, the inputs may also specify a set of address to which minted NFTs or fungible tokens are to be transferred to, or an address, such as the address of the issuer system, to which the tokens are to be transferred to for subsequent allocation. Different subsets of the addresses of the physical cards may be allocated with different types of NFTs. For example, a first subset may be allocated with a first type of NFT, a second subset with a second type of NFT, and a third subset with a third type of NFT. Different types of NFT may be indicated by a computer system or hard coded within a smart contract. In some examples, a type of NFT may correspond to a particular product or service associated with a token or card, and the card may be customized based on the type (either prior to, or after, allocation). For example, based on the records, which may indicate branding information, one type of NFT may be allocated vs another which is allocated to other cards having different branding information. Thus, for example, the physical cards may be customed via allocation of different types of NFTs, which in some examples, may corresponding to branding information depicted on different subsets of physical cards. Moreover, examples processes may allocate digital bearer assets, which may include NFTs, in batch to a set of a physical cards, such as via a smart contract.

In step 807, a computer system may store in association with respective records, like within a database, an indication of the digital bearer asset (or assets) that were transferred to respective physical cards. Accordingly, in example embodiments where public access information, like a public key or cryptographic hash address of a distributed computing system is omitted from a physical card, a user must access the private access information of the card to receive or transfer digital bearer assets to the wallet address associated with the card. In some examples, a computer system may facilitate transfers of digital bearer assets to the wallet address associated with the physical card, such as in examples where information about the cryptographic hash address on a protocol of a blockchain-based distributed computing platform, or a public key by which the cryptographic hash address can be generated, is retained for issued physical cards (e.g., to facilitate transfers of digital bearer assets to a physical card after issue via the computer system). For example, in some use cases it may be desirable to transfer additional digital bearer assets to a wallet address (e.g., cryptographic hash address) corresponding to a physical card responsive to criteria, such as user interactions with a user-facing application supported by the computer system (or other computer system), whether the user has accessed the private access information to transfer digital bearer assets from the wallet address, or other objectives. In some examples, a user may register a physical card to an account of the user and rewards (e.g., digital bearer assets) may be transferred to the wallet address corresponding to the physical card (e.g., until a determination is made that the user has transferred digital bearer assets from the wallet address). The records may store information like that described above, among other information described herein, and which may be periodically updated (e.g., by identifying transactions on the distributed computing platform corresponding to wallet addresses used for physical cards, etc.) such that the records reflect a state of assets held by a wallet address on a distributed computing platform. As described herein, a record corresponding to a physical card may be identified based on a unique identifier corresponding to the physical card, such as by a computer system storing the records corresponding to the physical cards.

In step 809, a computer system may receive, from a user computing device, a request including a unique identifier of a physical card. For example, the process may include receiving, with the computer system, a request from a user computing device, the request including a unique identifier of a physical card in the set of physical cards. In turn, the computer system may select a record based on the unique identifier included with the request matching the unique identifier of the selected record. In some examples, the user computer device may execute a native application or access a website or web application comprising a user interface by which the user may input the unique identifier of the physical card. In some embodiments, the user interface of the application may comprise a user selectable option or otherwise cause the user device to access an image sensor of the user device for capturing image data, like an image of the physical card or information depicted on the physical card. For example, the user computing device may read an optical code encoding the unique identifier, or read alphanumeric text corresponding to the unique identifier, to obtain the unique identifier from the physical card. In other examples, a user may manually input information corresponding to the unique identifier for the request via the user interface. In some embodiments, the user device may transmit a unique address identifier (or another identifier) to an issuer system (e.g., a computer system) by which the issuer system decrypts the ciphertext of the public key to return the public key in plaintext to the user device or otherwise utilize the public key in plaintext (e.g., to generate a new address).

In step 811, a computer system may transmit, to a user computing device, a response based on information corresponding to the record of the physical card that is identified (or selected) responsive to the request (e.g., based on the unique identifier indicated with the request). For example, a response may comprise an indication of digital bearer assets held by the wallet address (or addresses) corresponding to the physical card associated with the unique identifier. In another example, a response may comprise an indication of a wallet address (or addresses) of one or more distributed computing platforms to which the user requested (and is permitted) access by the computer system (e.g., the computer system may restrict use of a public key corresponding to the physical card to one or more select distributed computing platforms until a possessor of the physical card opts to access the private access information that is concealed and protected by one or more tamper-evident features).

In some example embodiments, a computer system is an issuer system that is coupled to a network and exposes an API to service requests related to issued physical cards. For example, user computing devices may use a native application, website, or web application that is configured to interface with the API, such as by generating a request to the API. In turn, the computer system may receive the request via the API for servicing and cause the API to return a response. Thus, for example, users may utilize user computing devices to request information corresponding to physical cards in their possession from the issuer computer system, request execution of functions corresponding to physical cards in their possession from the issuer computer system, or request other information or operations supported by the computer system for issued physical cards that are described herein.

Figure 9:
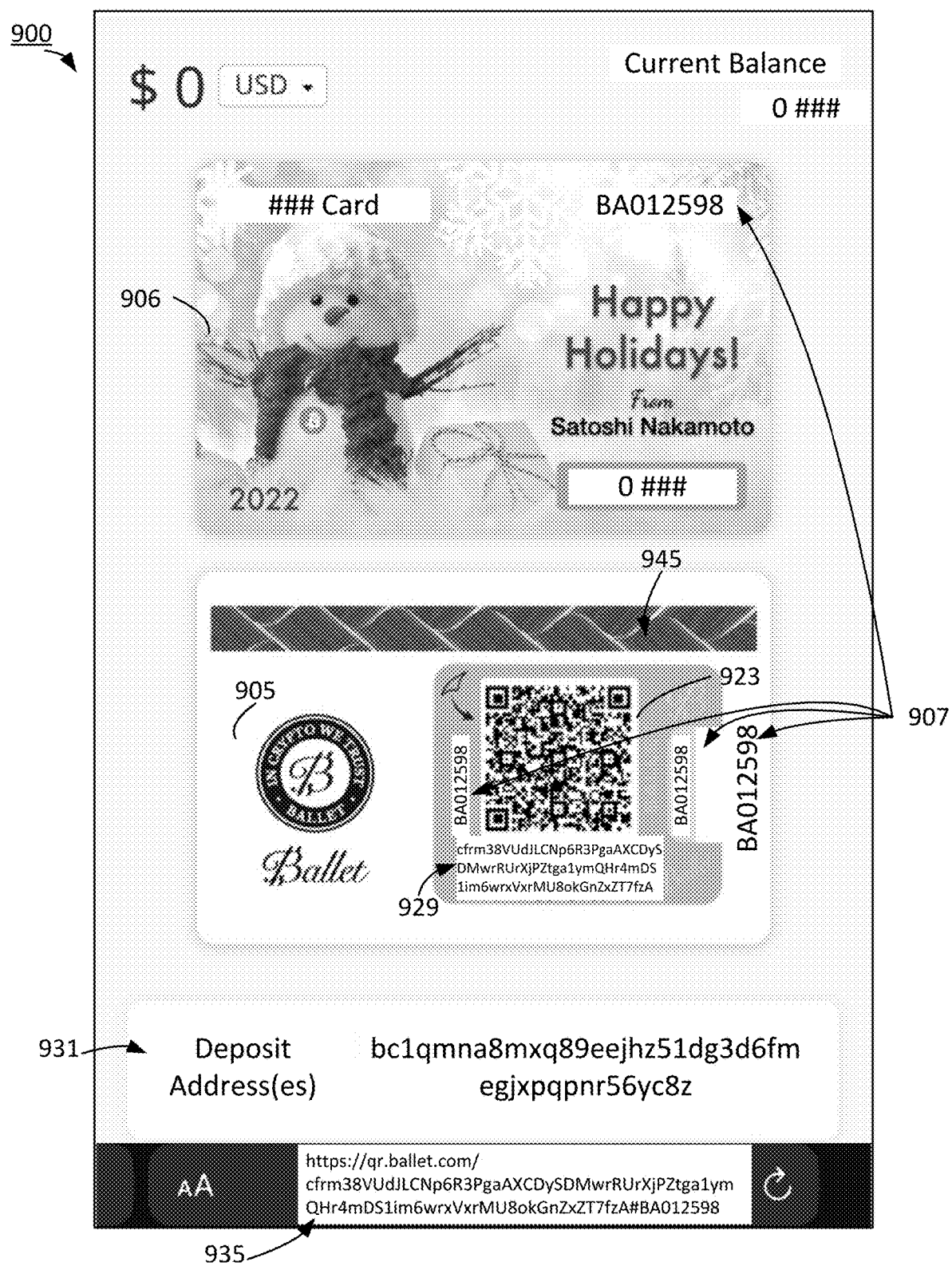
FIG. 9 illustrates an example visualization corresponding to an embodiment of a physical card, in accordance with some example embodiments.

FIG. 9 illustrates an example visualization corresponding to an embodiment of a physical card, in accordance with some example embodiments. In some example embodiments, a card visualization interface 900 is generated, such as by a server, responsive to a request for a URL including card identifying information, like a cryptographic address, an address identifier, unique card identifier, combination thereof (e.g., address or address identifier and card identifier, or other combination), or other informational components by which an instance of an issued physical card (or sticker) may be identified. In the illustrated example, the card visualization interface 900 may be displayed within a webpage accessed at the URL. For example, a QR code 923 disposed on a physical card may encode URL 935. When URL 935 is requested, interface 900 may be generated with a correspondence to the physical card instance, which may be identified based on an alphanumeric string in the URL that contains card identifying information (such as an address identifier 929 and unique identifier 907, by <website>/<address identifier>#<unique identifier>, which is not to suggest the other combinations of identifiers or information described herein cannot be used). The card visualization interface 900 may depict visualization of the faces 905, 906 of the issued card, which may each include the respective information depicted on the issued card. For example, an image of a customized branded face 906 of the card may be generated along with an image of the other face 905, which in the depicted example, may show the sticker component and associated information (e.g., QR code 923 and associated address identifier 929), unique identifiers 907, verification code/mask 945, etc. on the corresponding faces. Additionally, the visualization interface 900 generated for the URL 935 may display other information associated with the card, which may be determined from records of card information, like one or more deposit addresses 931 in some examples, or determined from records on one or more distributed computing platforms for respective addresses, like a balance of fungible tokens or indications of NFTs associated with the respective addresses.

Figure 10:
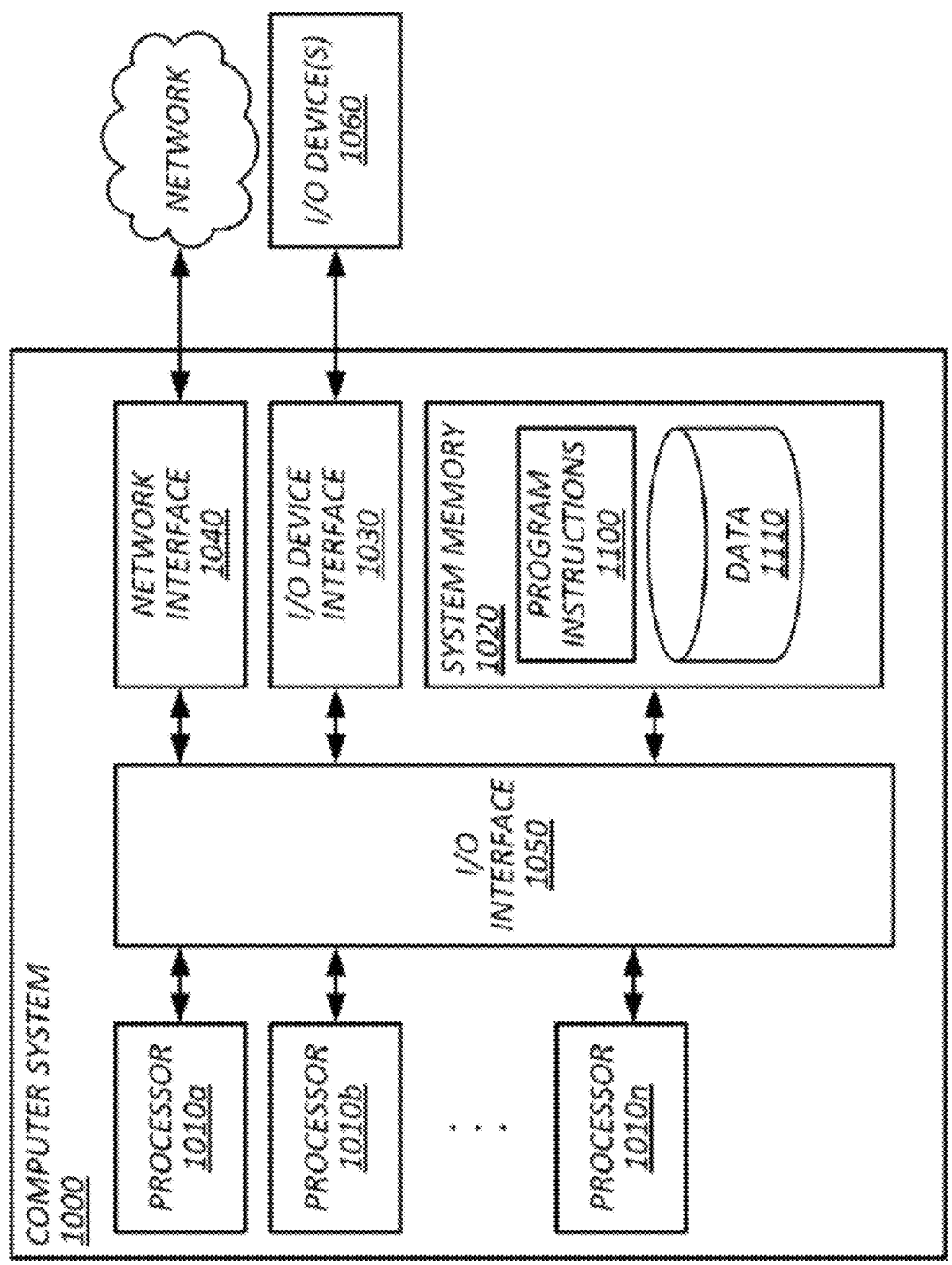
FIG. 10 illustrates an example computing system in accordance with embodiments of the present techniques.

FIG. 10 illustrates an example computing system 1000 in accordance with embodiments of the present techniques. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems, which may also be decentralized) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010*a*-1010*n*) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010*a*-1010*n*, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010*a*-1010*n*). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically or among different parties (e.g., decentralized)), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call, and arguments (e.g., in a request) or corresponding result (e.g., in a response) may be wholly or partially communicated (e.g., arguments may be communicated over one or more requests and results may be communicated in one or more responses, which need not have direct correspondence). Similarly, reference to "a computer system" performing step A and "the computer system" performing step B can include the same computing device within the computer system performing both steps or different computing devices within the computer system performing steps A and B.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

What is claimed is:

1. A tangible, non-transitory, machine-readable medium storing instructions that when executed by one or more processors effectuate operations for customization of a physical card, the operations comprising:
   obtaining, with a computing system, card data corresponding to a set of physical cards, the card data associating, for each of the physical cards, a respective public cryptographic key with a respective unique identifier, each physical card comprising:
      an optical code encoding a respective unique identifier; and
      concealed information corresponding to a respective private cryptographic key of a private-public cryptographic key pairing of which a respective public cryptographic key is a member;
   deterministically generating, with the computer system, a set of cryptographic hash addresses based on a protocol corresponding to a selected decentralized computing platform from the public cryptographic keys;
   storing, with the computer system, within a database, for each of the physical cards, a record associating the respective unique identifier with a respective cryptographic hash address generated from the respective public cryptographic key;
   requesting, with the computer system, based on a selected record, a transaction on the selected decentralized computing platform, the transaction specifying a transfer of a digital bearer asset to a cryptographic hash address of the selected record, wherein requesting, with the computer system, based on a selected record, a transaction on the selected decentralized computing platform, the transaction specifying a transfer of a digital bearer asset to a cryptographic hash address of the selected record comprises:
      calling a smart contract for execution on the selected decentralized computing platform based on the cryptographic hash address and information corresponding to the digital bearer asset;
   storing, with the computer system, within the database, an indication of the digital bearer asset in association with the selected record;
   receiving, with the computer system, a request from a user computing device, the request including a unique identifier of a physical card in the set of physical cards;
   identifying, with the computer system, the selected record based on the unique identifier included with the request matching the unique identifier of the selected record; and
   transmitting, with the computer system, to the user computing device, a response based on the indication of the digital bearer asset.

2. The medium of claim 1, wherein:
   each physical card does not comprise unconcealed information indicative of the respective public cryptographic key.

3. The medium of claim 2, wherein:
   each physical card does not comprise unconcealed information indicative of the respective cryptographic hash address generated from the respective public cryptographic key.

4. The medium of claim 1, wherein:
   for each physical card, the respective public cryptographic key is only derivable from the respective private cryptographic key.

5. The medium of claim 1, wherein:
   the computer system is a peer node on the selected decentralized computing platform, and
   the computer system executes the smart contract to mint and allocate the digital bearer asset to the cryptographic hash address of the selected record.

6. The medium of claim 1, wherein storing an indication of the digital bearer asset in association with the selected record within the database comprises:
   storing an identifier of the digital bearer asset, the identifier uniquely identifying the digital bearer asset from other instances of digital bearer assets on the decentralized computing platform; and
   wherein the indication of the digital bearer asset comprises information about a type of the digital bearer asset.

7. The medium of claim 6, wherein requesting, with the computer system, based on a selected record, a transaction on the selected decentralized computing platform, the transaction specifying a transfer of a digital bearer asset to a cryptographic hash address of the selected record comprises:
   selecting a plurality of records;
   determining to allocate a unique instance of a type of digital bearer asset to each of the plurality of selected records; and
   requesting, by the transaction, or a set of transactions, transfer of the unique instances of digital bearer assets to the respective cryptographic hash addresses associated with the plurality of selected records.

8. The medium of claim 1, wherein receiving, with the computer system, a request from a user computing device, the request including a unique identifier of a physical card in the set of physical cards comprises:
   receiving an application programing interface request comprising a value of the unique identifier of the physical card.

9. The medium of claim 8, wherein transmitting, with the computer system, to the user computing device, a response based on the indication of the digital bearer asset comprises:
   generating an application programing interface response comprising information corresponding to the digital bearer asset for display on the user computing device.

10. A tangible, non-transitory, machine-readable medium storing instructions that when executed by one or more processors effectuate operations for customization of a physical card, the operations comprising:
- obtaining, with a computer system, records corresponding to a set of physical cards, the records associating, for each of the physical cards, a unique identifier with a cryptographic hash address based on a public cryptographic key and a protocol corresponding to a selected decentralized computing platform, wherein each physical card comprises:
  - an optical code encoding a respective unique identifier; and
  - concealed information corresponding to a respective private cryptographic key of a private-public cryptographic key pairing of which a respective public cryptographic key is a member;
- requesting, with the computer system, based on a selected record, a transaction on the selected decentralized computing platform, the transaction specifying a transfer of a non-fungible token to a cryptographic hash address of the selected record;
- storing, with the computer system, within a database, an indication of the non-fungible token in association with the selected record;
- receiving, with the computer system, a request from a user computing device, the request including a unique identifier of a physical card in the set of physical cards;
- identifying, with the computer system, the selected record based on the unique identifier included with the request matching the unique identifier of the selected record; and
- transmitting, with the computer system, to the user computing device, a response comprising an indication of the non-fungible token.

11. The medium of claim 10, wherein:
each physical card does not comprise unconcealed information indicative of the respective public cryptographic key.

12. The medium of claim 11, wherein:
each physical card does not comprise unconcealed information indicative of the respective cryptographic hash address based on the respective public cryptographic key.

13. The medium of claim 1, wherein:
the computer system, or another computer system, having access to the public cryptographic keys by which the cryptographic hash addresses are generated in accordance with the protocol of the selected decentralized computing platform discards the public cryptographic keys after generation of the cryptographic hash addresses.

14. The medium of claim 13, wherein for each physical card:
- the respective public cryptographic key is only derivable from the respective private cryptographic key, and
- the concealed information corresponding to the respective private cryptographic key is only accessible after activating one or more tamper-evident features that indicate access of the concealed information.

15. The medium of claim 10, wherein storing an indication of the non-fungible token in association with the selected record comprises:
- storing an identifier of the non-fungible token, the identifier uniquely identifying the non-fungible token from other non-fungible tokens on the decentralized computing platform; and
- storing information about a type of the non-fungible token.

16. The medium of claim 15, further comprising:
- selecting a subset of records corresponding to a subset of physical cards based on a type of non-fungible token indicated by the subset of records;
- obtaining, from the subset of records, a subset of unique identifiers corresponding to the subset of physical cards; and
- transmitting the subset of unique identifiers in association with an indication of graphical information to print on a surface of the subset of physical cards.

17. The medium of claim 16, wherein:
- other subsets of physical cards correspond to other subsets of records indicating respective types of non-fungible tokens, and
- indications of other graphical information to print on a surface of the other subsets of physical cards are based on the respective types of non-fungible tokens.

18. The medium of claim 10, wherein receiving, with the computer system, a request from a user computing device, the request including a unique identifier of a physical card in the set of physical cards comprises:
- receiving an application programing interface request comprising a value of the unique identifier of the physical card.

19. The medium of claim 18, wherein transmitting, with the computer system, to the user computing device, a response comprising an indication of the non-fungible token comprises:
- generating an application programing interface response comprising information indicative of a type and unique instance of the non-fungible token for display on the user computing device.

* * * * *